United States Patent [19]

Kuboki et al.

[11] Patent Number: 5,790,165
[45] Date of Patent: Aug. 4, 1998

[54] IMAGE PROCESSING APPARATUS AND PROVIDING CONTROLLING ADDITION OF PREDETERMINED DATA IN A BORDER PORTION

[75] Inventors: Keiju Kuboki; Yasuhiro Yamada, both of Yokohama; Yutaka Udagawa, Machida; Toshihiko Otsubo, Tama; Eiichi Nishikawa, Kawasaki, all of Japan

[73] Assignee: Canon Kabushiki Kaisha, Tokyo, Japan

[21] Appl. No.: 753,468

[22] Filed: Nov. 26, 1996

Related U.S. Application Data

[63] Continuation of Ser. No. 111,374, Aug. 24, 1993, abandoned.

[30] Foreign Application Priority Data

| Aug. 24, 1992 | [JP] | Japan | 4-223752 |
| Sep. 18, 1992 | [JP] | Japan | 4-249439 |
| Sep. 18, 1992 | [JP] | Japan | 4-249440 |
| Jan. 19, 1993 | [JP] | Japan | 5-006974 |

[51] Int. Cl.[6] .................. B41J 2/47; G01D 15/14; H04N 1/21
[52] U.S. Cl. .................. 347/251; 358/296
[58] Field of Search .................. 347/251; 358/501, 358/296

[56] References Cited

U.S. PATENT DOCUMENTS

| 4,739,377 | 4/1988 | Allen | 355/133 |
| 5,216,724 | 6/1993 | Suzuki et al. | 382/7 |
| 5,227,871 | 7/1993 | Funada et al. | 358/75 |
| 5,363,454 | 11/1994 | Udagawa et al. | 358/501 |

FOREIGN PATENT DOCUMENTS

| 0079153 | 5/1983 | European Pat. Off. . |
| 0342060 | 11/1989 | European Pat. Off. . |
| 3229616 | 9/1984 | Germany . |

*Primary Examiner*—Benjamin R. Fuller
*Assistant Examiner*—Raquel Yvette Gordon
*Attorney, Agent, or Firm*—Fitzpatrick, Cella, Harper & Scinto

[57] ABSTRACT

In an image determination unit, a possibility that a read image is a predetermined image which is prohibited from an image formation is determined. If the possibility exists, an operation of the image formation is interrupted and whether or not the pertinent image is a predetermined image is determined based on the image information which is continuously inputted. If it is determined that the input image is a specific original, the image formation is suspended, while if not, the image formation processing is restarted.

10 Claims, 51 Drawing Sheets

FIG. 52

|  | D1 | D2 | D3 | D4 | D5 | |
|---|---|---|---|---|---|---|
|  | 5305 | 5310 | 5315 | 5320 | 5325 | |
|  | 5304 | 5309 | 5314 | 5319 | 5324 | T1 |
|  | 5303 | 5308 | 5313 | 5318 | 5323 | T2 |
| BORDER PORTION → | 5302 | 5307 | 5312 | 5317 | 5322 | |
|  | 5301 | 5306 | 5311 | 5316 | 5321 | |

IMAGE PROCESSING APPARATUS AND PROVIDING CONTROLLING ADDITION OF PREDETERMINED DATA IN A BORDER PORTION

This application is a continuation of application Ser. No. 08/111,374 filed Aug. 24, 1993 now abandoned.

BACKGROUND OF THE INVENTION

The present invention relates to an image processing apparatus and method thereof capable of detecting a specific image or a predetermined image from an original image in a color printer, color copier, color facsimile and so on, which outputs a color image, performing an output control of the original image based on the result of detection.

Along the recent improvement of image quality, colorization, popularization of an image processing apparatus, a specific original which is not supposed to be duplicated (for example, securities/bank notes/confidential documents) can be duplicated at such a high quality which is not distinguishable from the original, resulting in fear of improper usage. In order to prevent such duplication, in a copying machine such as a full-color copier which outputs an image signal obtained by reading the original at real time, the image data read once in several scanning operations is compared with the image data of the specific originals, and a particular pattern is added during latent image formation at the next scanning of the original.

However, in an apparatus which performs full-color image processing and outputs a read image at real time on one scanning, if control of the image processing is modified at the end of scanning, it is impossible to prevent the specific original, which has been already duplicated, from being misused.

Furthermore, in an image forming apparatus which applies ink-jet technique among color image forming apparatuses such as a color copier having high image reproducibility, an image is formed by repeating the process such that an ink-jet type recording head having a predetermined width to a sub-scanning direction scans toward a main scanning direction, while a recording medium is moved toward the sub-scanning direction. In comparison with an electronic photography type apparatus, the image forming apparatus having the above structure has an advantage when a large size original is duplicated or it is constructed as a light-weight compact size.

However, as described above, along the improvement of quality of a formed image, the problem arises in that the originals which should not be duplicated are reproduced by using the above image forming apparatus. These apparatuses are required to have a function to prevent the specific originals from being forged from the social responsibility standpoint.

In order to prevent forming the specific originals, determination means for determining the specific originals are needed. As such determination means, there are techniques which are applied to a cash dispenser used in financial institutions and applicable to the color image forming apparatus.

In an image forming apparatus using electronic photography, the image can be determined by prescanning an entire original image. However, in the color image forming apparatus having a construction such that a recording head scans to form the image, a general process is such that the reading head having a predetermined width to the sub-scanning direction scans toward the main scanning direction is repeated to read the entire image. Accordingly, it takes a considerable amount of time for prescanning to determine whether or not the original image is a specific original and the throughput of image formation is much deteriorated.

In order to solve the above problems, there is a method to determine whether or not the original image is a specific original successively.

The width of the recording head in the image forming apparatus having the above arrangement is approximately 16 mm. Theoretically, it is possible to have a wider head, however, this level is practical because of the cost of production.

In this case, the image is read in the width of the recording head. In order to determine a specific original accurately, the image of the width approximately 100 mm is needed. Accordingly, when the specific original is determined, several bands of the image (assumed the image formed by one main scanning operation as one band) has already been formed. Conventionally, a technique such that, in the case of the specific original, a recording paper is rewound for a predetermined width and the portion where the specific original has been recorded is printed in solid color at the completion of the discrimination of the specific original.

However, in such a technique, when the power is shut down before the recording paper is rewound, but after the determination has been completed, a considerable amount of width of the specific original may remain in the apparatus. Accordingly, a part of the duplication of the specific original can be obtained by taking the recording paper out of the apparatus.

Other methods for recognizing a specific original are as following:

When an image is formed by a frame sequential method, for example, the original is read for one frame, and color separation is performed and cyan component is first printed. Subsequently, the same original is read for one frame and magenta component is printed over the same copying paper. This operation is repeated for yellow and black components and a full-color image is formed. Accordingly, when the specific original is detected while the image is read for three frames, the black component which is printed last of the four colors can be printed all over the copying paper, thus, forgery can be prevented.

Furthermore, in a dot sequential type such that an image of four colors such as Y, M, C, K is printed in every pixel and a full-color image is formed in pixel sequence. When the original of being the specific original is detected, a part of the specific original has been already duplicated. Conventionally, counterfeit is prevented by printing over the partially duplicated image.

However, in the dot sequential type, if copying operation is suspended before the original is completely detected as being the specific original, a part of the specific original may be duplicated and outputted.

Furthermore, in order to solve the above problems, the method such that particular information such as a type of copying machine, serial number, and manufacture date is coded and added to the image output in order to trace and identify the used apparatus from the output image. More particularly, in a binary recording method using the ink-jet type, it is suggested that when recording is performed by similar tone reproduction, a print dot is shifted in accordance with a code added at a predetermined density and a print-dot space is adjusted.

However, in this method, when an image is formed by performing a plurality of scanning operations using a print head having a plurality of nozzles, a seam between the scanning operations appears when a code number is added by shifting the print dot. This becomes outstanding where the dot starts to shift because the print-dot space is adjusted within one band.

The detail is described with reference to FIGS. 54A and 54B. FIG. 54A shows an example of the image when a code number is not added and a circle denotes a print dot. FIG. 54B is an example of the image when the code number is added to the image shown in FIG. 54A and the dot is shifted backward. As shown in FIG. 54B, there is a defect such that the image is seen as lacking a part of the image depending upon image.

SUMMARY OF THE INVENTION

Accordingly, it is an object of the present invention to provide an image processing apparatus and method thereof capable of suppressing the formation of a specific original which is prohibited from image formation and minimizing the effect of the discrimination processing such that whether or not an objective image is a specific original upon the throughput of the image forming sequence.

According to the present invention, the foregoing object is attained by an image processing apparatus having reading means for reading an original by performing a scanning operation on the original in a predetermined direction, and image formation means for forming an image onto a recording medium, based on image information obtained by the scanning operations by the reading means, by performing a scanning operation in the predetermined direction, comprising: first image determination means for determining a possibility that an image represented by the image information is a predetermined image; means for interrupting an image formation by the image formation means in a case where the first image determination means determines that the image represented by the image information has the possibility of being a predetermined image; and second image determination means for determining whether or not the image represented by the image information is a predetermined image based on the image information obtained by successively scanning the original by the reading means, after that the image represented by the image information has the possibility of being a predetermined image is determined by the first image determination means, wherein, in a case where the second image determination means determines that the image represented by the image information is a predetermined image, the image formation by the image formation means is suspended, while in a case where the second image determination means determines that the image represented by the image information is not a predetermined image, the image formation by the image formation means is restarted.

It is another object of the present invention to provide an image processing apparatus capable of preventing improper usage of the copying machine by coping with counterfeit of the specific originals.

According to the present invention, the foregoing object is attained by an image processing apparatus which reads an original image, and sequentially outputs image information based on the original image, comprising: first image determination means for determining that an image represented by the image information has a possibility of being a predetermined image; means for interrupting an output of the image information, in a case where the first image determination means has determined that an image represented by the image information has the possibility of being a predetermined image; and second image determination means for determining whether or not the image represented by the image information is a predetermined image based on the successively read image information, after it is determined that the image represented by the image information has the possibility of being a predetermined image by the first image determination means, wherein, in a case where the second image determination means determines that the image represented by the image information is a predetermined image, the output of the image information is suspended, while in a case where the second image determination means determines that the image represented by the image information is not a predetermined image, the output of the image information is restarted.

Furthermore, it is another object of the present invention to provide an image processing apparatus capable of preventing generation of a seam on the duplicated image by holding the border of dots between the scanning operations when a code number to identify the apparatus is added.

According to the present invention, the foregoing object is attained by an image processing apparatus which records an image for a single frame by performing a plurality of scanning operations in a predetermined direction, comprising: means for inputting predetermined data; addition means for adding predetermined information to the image based on the predetermined data; and control means for controlling an addition of the predetermined information by the addition means in a border portion formed by the plurality of scanning operations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 52 is a diagram illustrating area information which is written in a holder RAM 5106 for joint retaining according to the fifth embodiment;

DESCRIPTION OF THE PREFERRED EMBODIMENTS

Preferred embodiments of the present invention will now be described in detail in accordance with the accompanying drawings.

Copying machines will be described as embodiments of the present invention, however, this does not impose a limitation upon the present invention, for the present invention is applicable also to any other kind of apparatus such as a simple image scanner and a printer. In the present invention, the possible counterfeits include bank notes, securities, and originals of confidential documents.

<The First Embodiment>

Figure 1:
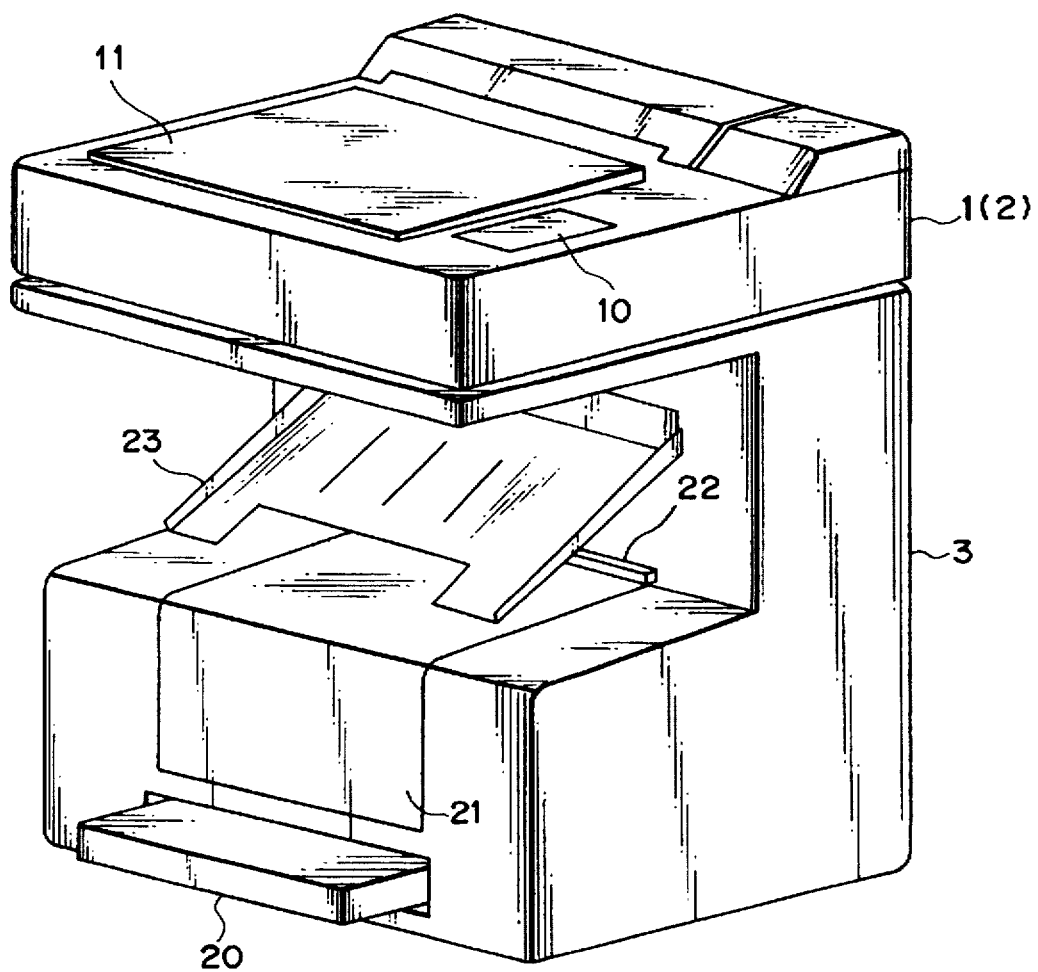
FIG. 1 is a perspective diagram illustrating a digital color copier according to a first embodiment of the present invention.

FIG. 1 is a perspective diagram illustrating a digital color copying machine according to a first embodiment of the present invention.

The digital color copying machine is composed of two major portions. The upper portion of the copying machine shown in FIG. 1 is comprised of a color image scanner 1 (hereinafter referred to as "scanner") for reading an image of original document and outputting digital color image data and a controller 2 for performing various image processing operations of the digital color image data stored in the scanner 1 and having a processing function such as an interface function with external apparatus.

The lower portion of the copying machine shown in FIG. 1 is a printer 3 for recording the color digital image signal outputted from the controller 2 to a recording paper.

The above two portions can be separated from each other and they can be set remotely by extending a connection cable.

Figure 2:
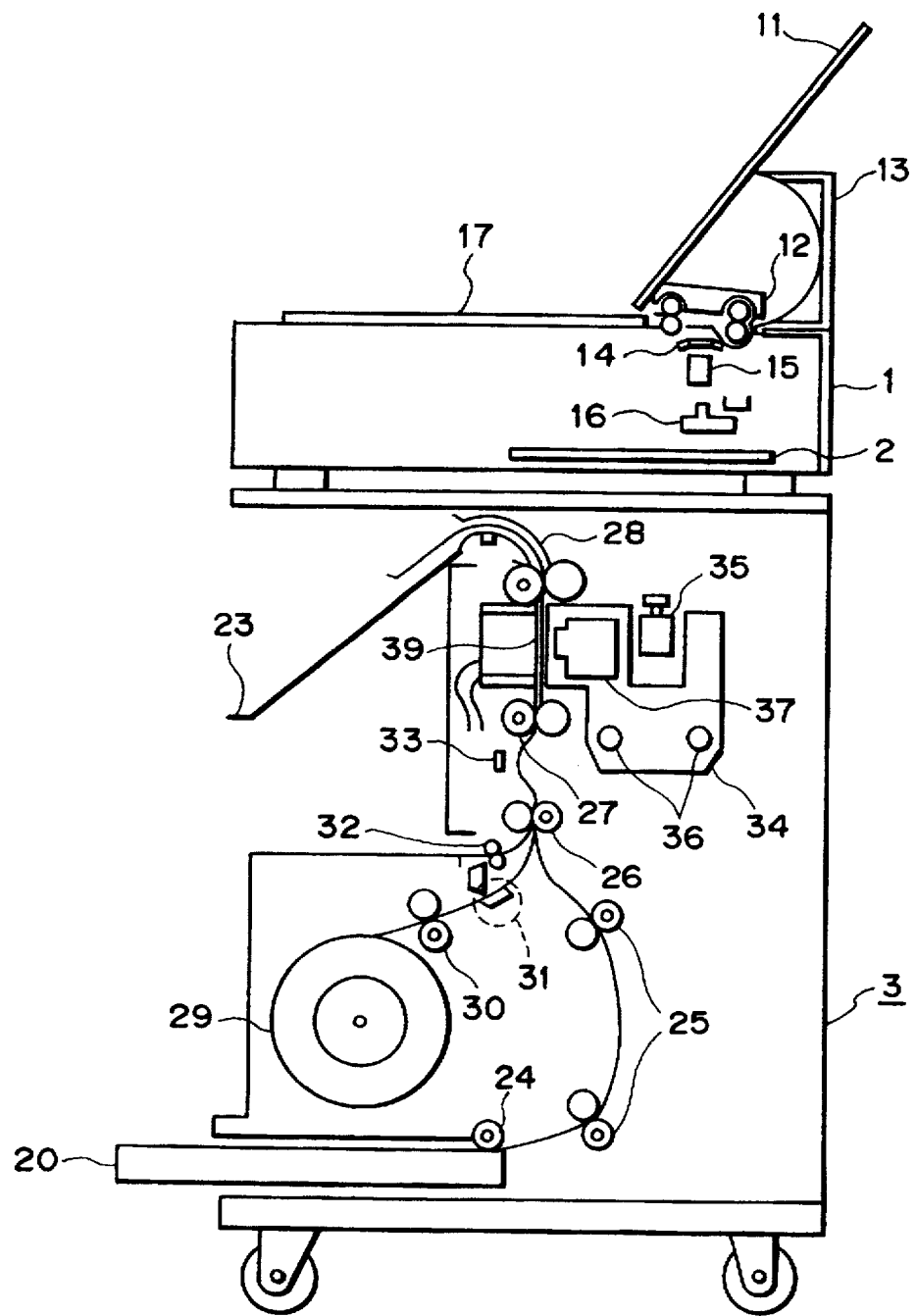
FIG. 2 is a cross sectional view schematically illustrating the internal construction of the digital color copying machine of FIG. 1.

FIG. 2 is a cross sectional view schematically illustrating the internal construction of the digital color copying machine of FIG. 1.

An image of original placed on an original glass table 17, a projected image formed by a projector, or the image of a sheet-like original document fed by a feeding mechanism 12 is read by an exposure lamp 14, lens 15, and image sensor 16 by CCD capable of full-color reading of a line image. The scanner 1 and controller 2 perform various image processing operations, and a printer 3 records the image to a recording paper.

In FIG. 2, the recording paper is selectively supplied from a paper feeding cassette 20 containing small-regular-size (A4 to A3 size according to the embodiment) cut-sheets or a roll paper 29 for recording information to large size (A2 to A1) recording paper.

Furthermore, paper feeding from outside of the apparatus (manual paper feeding) is enabled by feeding cut-papers one by one from an manual feeding port 22 along a paper feeding cover 21. Pick-up rollers 24 are rollers for feeding cut-papers one by one from the paper feeding cassette 20, and the fed cut-paper is conveyed to first paper feeding rollers (first roller) 26 via cut-paper feeding rollers 25. The roll paper 29 is conveyed by roll-paper feeding rollers 30, cut by a cutter 31 into a predetermined length, and further conveyed to the first rollers 26 by a manual feeding rollers 32. Similarly, the recording paper inserted from the manual feeding port 22 is conveyed to the first rollers 26 by the manual feeding rollers 32.

The pick-up rollers 24, cut-paper feeding rollers 25, roll-paper feeding rollers 30, first rollers 26, and manual feeding rollers 32 are driven by a paper feeding motor (e.g. a CD servo motor, but not shown) and their rotations can be turned on/off by electromagnetic clutches provided for the rollers.

When the printing operation is started by the instruction from the controller 2, the recording paper selected and fed through either of the above paper feeding passages is conveyed to the first rollers 26. In order to prevent a skew of the recording paper, a paper loop of the recording paper is formed by a predetermined quantity and the first rollers 26 are turned on to rotate. Then, the recording paper is conveyed to second paper feeding rollers (second rollers) 27.

Between the first rollers 26 and second rollers 27, in order to accurately perform paper feeding between these rollers, the recording paper is slackened for a predetermined quantity to form a so-called buffer. A buffer quantity detection sensor 33 serves as a sensor to detect quantity of the buffer. Since the buffer of the recording paper is always formed during its conveyance, the load which acts on the paper feeding rollers 28 and second rollers 27, when large size recording paper is conveyed, can be reduced so that an accurate paper feeding operation can be performed.

When printing is performed by the recording head 37, a scanning carriage 34 on which the recording head 37 is mounted is reciprocated by a scanning motor 35 on a carriage rail 36. In the returning scanning operation, the recording paper is conveyed for the predetermined quantity by the paper feeding rollers 28. During this operation, it is controlled so that a predetermined quantity of the buffer is always maintained by the paper feeding motor, while the upper drive system is controlled by the buffer quantity detection sensor 33.

The printed recording paper is received by a copy receiving tray 23 and the sequential printing operation ends.

Figure 3:
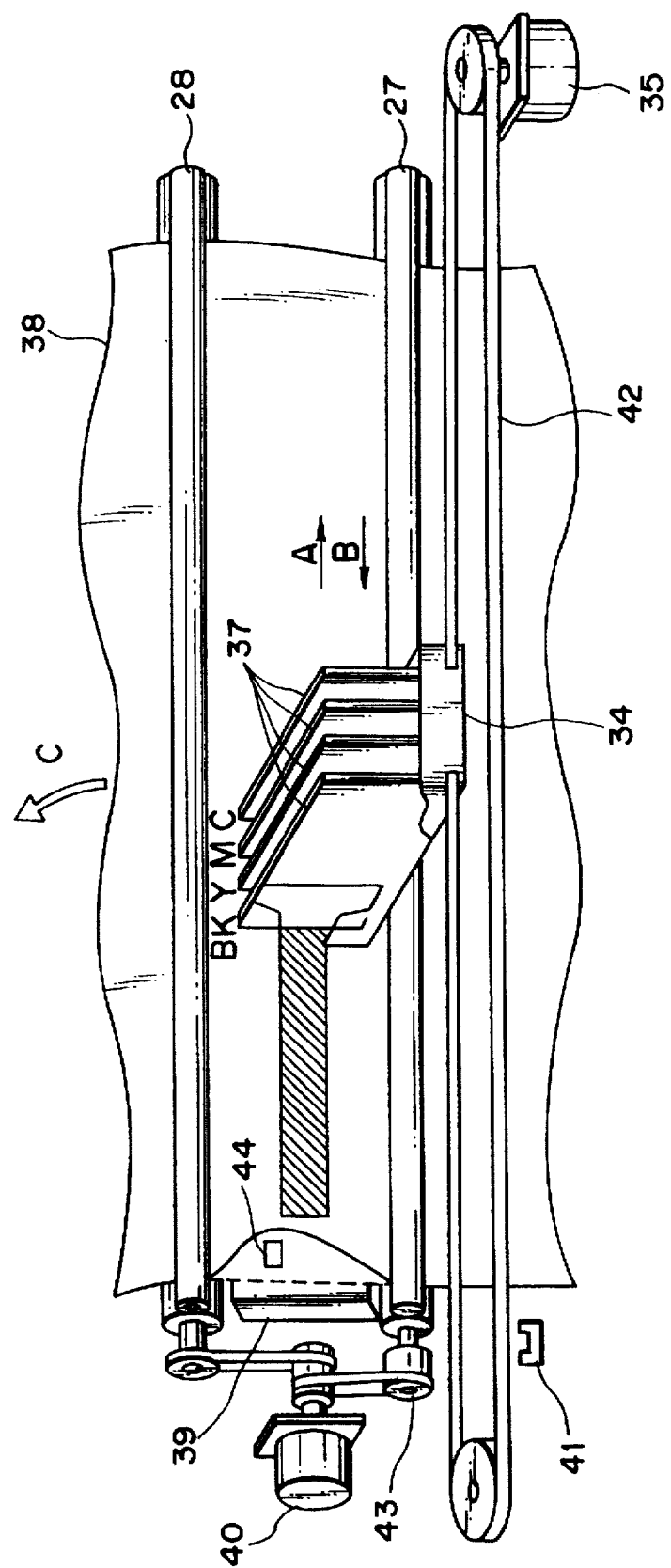
FIG. 3 is a diagram illustrating the construction of a portion in the vicinity of the scanning carriage 34 according to the first embodiment.

FIG. 3 is a diagram illustrating the construction of a portion in the vicinity of the scanning carriage 34 according to the first embodiment.

In FIG. 3, a paper feeding motor 40 serves as a driving power source for intermittently feeding the recording paper in the sub-scanning direction, and for driving the second rollers 27 via the paper feeding rollers 28 and a second paper feeding clutch (second roller clutch) 43. The scanning motor 35 serves as a driving power source which drives the scanning carriage 34 via a scanning belt 42 in the main scanning direction designated by arrows A and B. Since the paper feeding operation must be accurately controlled in this embodiment, pulse motors are used for the paper feeding motor 40 and scanning motor 35. When the recording paper reaches the second rollers 27, the second roller clutch 43, and the paper feeding motor 40 are respectively turned on. As a result, the recording paper is conveyed on a platen 39 to the paper feeding rollers 28.

The recording paper is detected by a paper detection sensor 44 provided on the platen 39 and sensor information is utilized for position control and jam control.

When the recording paper reaches the paper feeding roller 28, the second roller clutch 43 and paper feeding motor 40 are respectively turned off. As a result, a sucking operation is performed from the inside of the platen 39 by a vacuum motor (not shown), and the recording paper is contacted with the surface of the platen 39.

Prior to performing the image recording operation onto the recording paper, the scanning carriage 34 is moved to a position at which a home position sensor 41 is disposed, so that the forward scanning operation is performed in the direction designated by the arrow A. In this forward scanning operation, inks for cyan (C), magenta (M), yellow (Y), black (BK) are respectively discharged from the recording head 37 at the predetermined position. When an operation of recording the image by a predetermined length has been completed, the scanning carriage 34 stops, and starts to move in the direction designated by the arrow B, thus returns to the position at which the home position sensor 41 is located. During the returning directional scanning operation, the paper feeding motor 40 drives the paper feeding rollers 28 so that the paper feeding operation by the length which is recorded by the recording head 37 is performed in the direction designated by an arrow C.

In the embodiment, the recording head 37 is comprised of the four ink-jet nozzles where 256 nozzles are assembled for each Y, M, C, BK.

When the scanning carriage 34 is stopped at a home position which is detected by the home position sensor 41, an operation of recovering the recording head 37 is performed. The aforementioned recovery operation is performed to stable the recording operation by preventing irregular discharge at the time of the start of discharge due to change in the viscosity of ink left in the nozzle of the recording head 37. In this recovery operation, pressure is applied to each nozzle in the recording head 37 and an idle discharge of ink from each nozzle is performed under the previously programmed conditions such as the time when the recording paper is fed, the temperature in the apparatus, and the time when the discharge is executed.

The image recording over the entire recording paper is performed by repeating the above operations.

The operation of the scanner 1 is described below.

Figure 4:
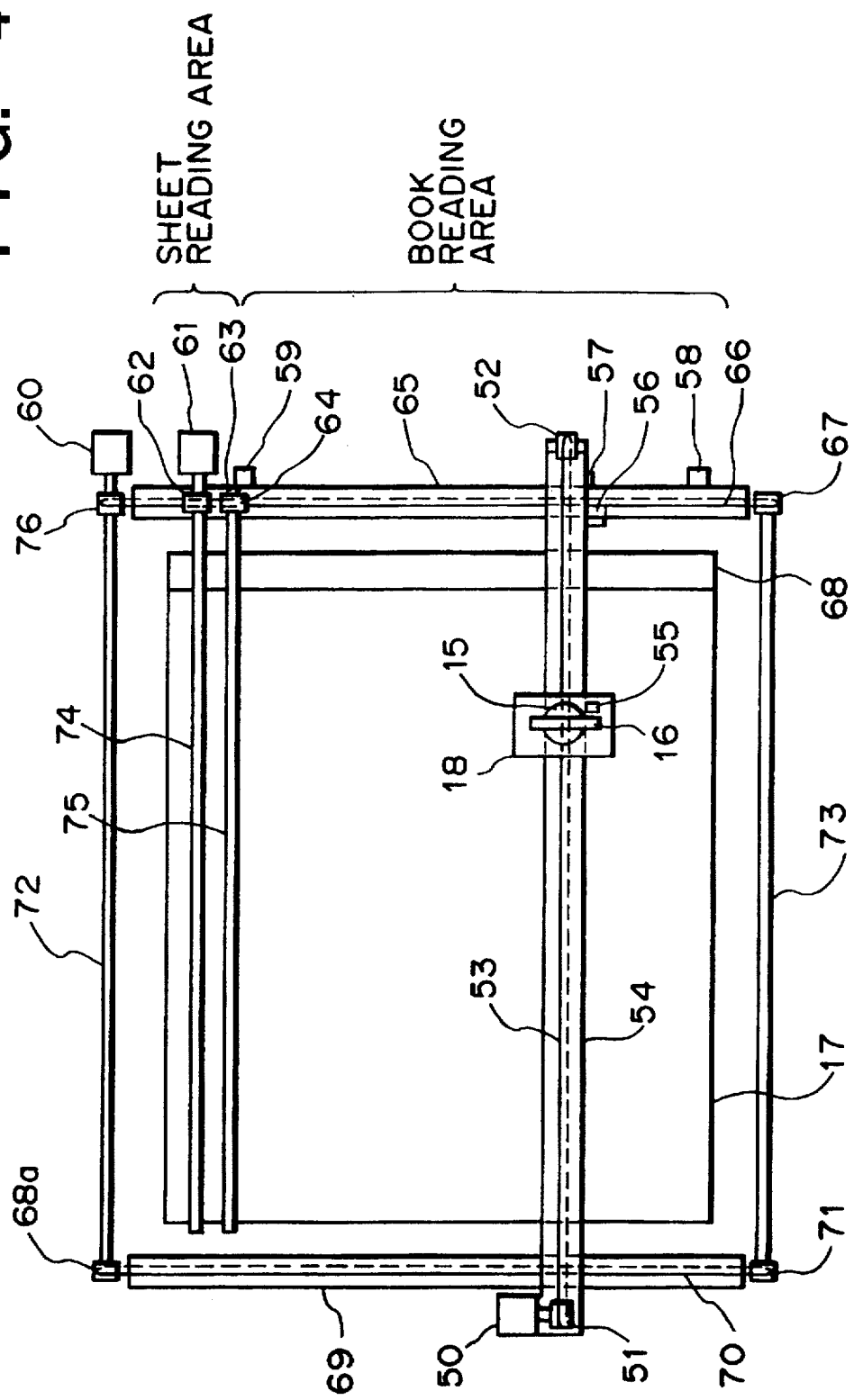
FIG. 4 is a diagram illustrating an internal mechanism of a scanner 1 according to the first embodiment.

FIG. 4 is a diagram illustrating the internal mechanism of the scanner 1 according to the first embodiment.

In FIG. 4, a CCD unit 18 is a unit comprising of a CCD 16 and lens 15, and is moved on a rail 54 by a main-scanning directional drive system comprising of a main scanning motor 50 secured to the top surface of the rail 54, pulleys 51 and 52, and a wire 53, so that it reads the image on the original glass table 17. A light shielding plate 55 and home position sensor 56 are used for the position control when the CCD unit 18 is moved to the main scanning position in a correction area 68.

The rail 54 is placed on other rails 65 and 69 and moved by a sub-scanning directional drive system comprising of a sub-scanning motor 60, pulleys 67, 68a, 71, 76, shafts 72 and 73, wires 66 and 70. A light shielding plate 57 and home position sensors 58, 59 are used for the position control when the rail 54 is moved to the sub-scanning home scanning position in a book mode where an original document such as a book placed on the original glass table 17 is read and a sheet mode where a sheet original document is read.

Sheet feeding motor 61, sheet feeding rollers 74, 75, pulleys 62, 64, and a wire 63 form a mechanism for feeding the sheet original. This mechanism is disposed on the original glass table 17 to feed the sheet original document downwards placed on the table by a predetermined quantity by the sheet feeding rollers 74 and 75.

Figure 5:
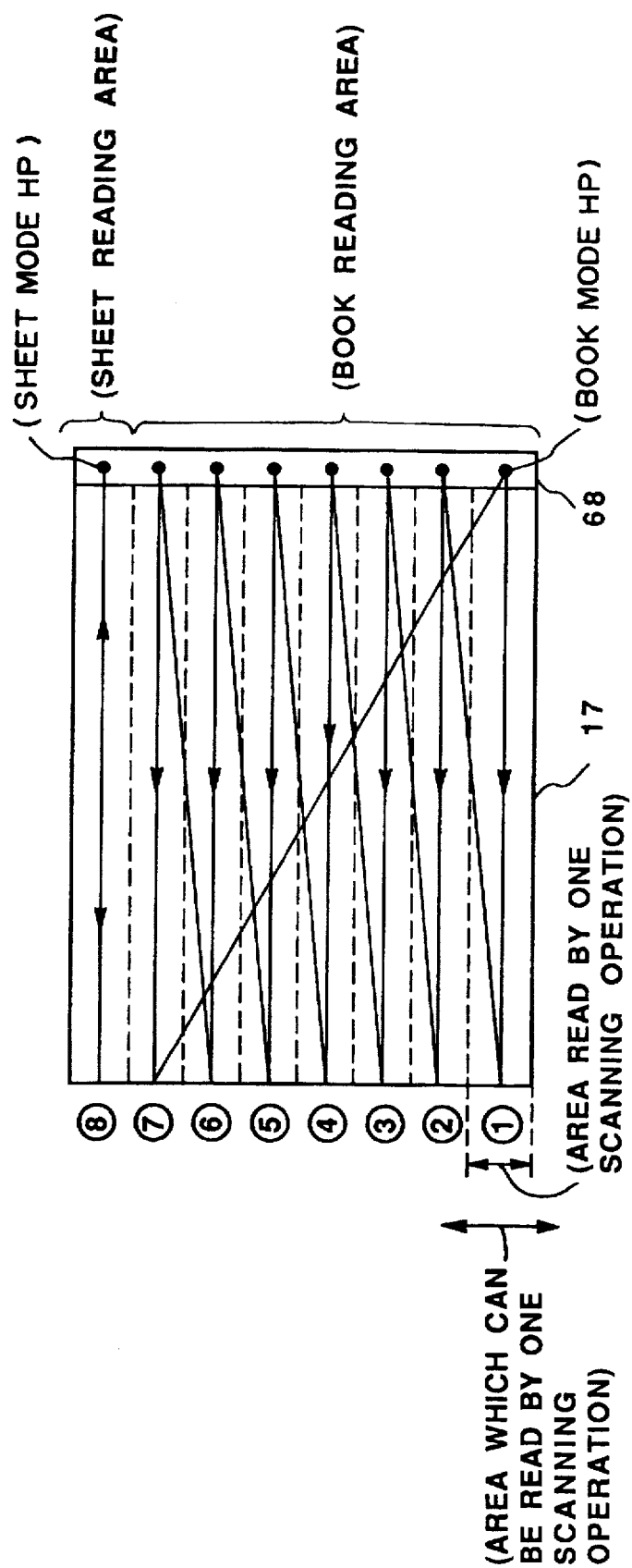
FIG. 5 is a diagram for explaining the reading operation at a book mode and sheet mode according to the first embodiment.

FIG. 5 is a diagram for explaining the reading operation in the book mode and sheet mode according to the first embodiment.

In the book mode, the CCD unit 18 is moved to a book mode home position (book mode HP) in a correction area 68 shown in FIG. 5, and an operation of reading the entire surface of the original document placed on the original glass table 17 is started.

Prior to performing the operation of scanning the original document, parameters required to perform a shading correction operation, a black level correction operation, and color correction operation are set in the correction area 68. Then, the scanning to the main scanning direction is started by the main scanning motor 50 in the direction designated by the arrow. When an operation of reading an area ① has been completed, the rotation of the main scanning motor 50 is reversed and the sub-scanning motor 60 is driven to move the sub-scanning direction to the area ② of the correction area 68. Subsequently, similar to the main scanning of the area ①, the processing such as shading correction, black level correction, color correction are performed if necessary, and an operation of reading the area ② is performed.

The reading operation over the entire surface areas 1–7 is executed by repeating the above scanning. When the area 7 has been read, the CCD unit 18 is again returned to the book mode.

In the embodiment, since the original glass table 17 is able to read an original document the size of which is A2 or smaller, the operations described above must be performed more frequently. However, the description is simplified to make the operation understood easily.

In the sheet mode, the CCD unit 18 moves to a sheet mode home position (sheet mode HP) to repeatedly read area 8 of the sheet original document by intermittently rotating the sheet feeding motor 61, so that the entire surface of the sheet original document is read.

Prior to scanning the original document, the processings such as shading correction, black level correction, color correction are performed by the correction area 68. Subsequently, the main scanning motor 50 executes the main scanning directional scanning in a direction designated by an arrow in FIG. 5. When the area 8 has been read by the forward scanning operation, the rotation of the main scanning motor 50 is reversed and the returning directional scanning is executed. During the returning directional scanning, the sheet feeding motor 61 is driven to move the sheet original document in the sub-scanning direction. Subsequently, the similar operation is repeated and the entire surface of the sheet original document is read.

As described above, if the reading operation is an equal magnification reading operation in a copying process, the area read by the CCD unit 18 is a considerably wide area shown in FIG. 5. This is because the digital color copying machine of the embodiment includes a variable magnification function for enlargement and reduction. More particularly, when 50%-reduction is performed, since a region recorded by the recording head 37 is fixed to 256 bits for one time, image information of at least a region 512 bits which is twice the above bits must be used. Accordingly, the scanner 1 contains a function capable of reading and outputting image information of an arbitrary image region by one main scanning reading operation.

(System Structure)

Figure 6:
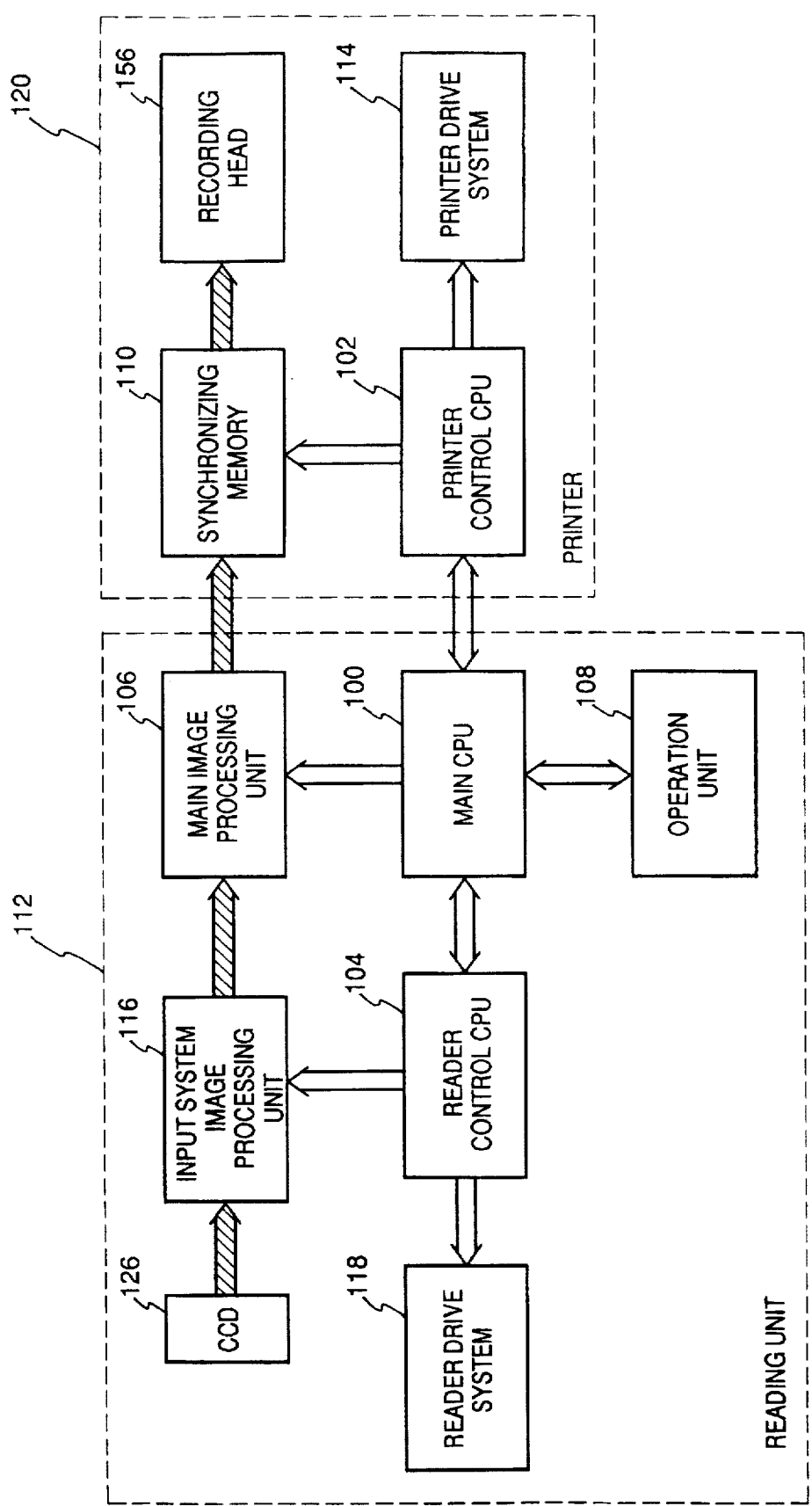
FIG. 6 is a block diagram illustrating the construction of a control system in the digital color copier according to the first embodiment.

Processing and controlling of an image signal in the control system of the digital color copier of the embodiment is described. FIG. 6 is a block diagram illustrating the control system structure in the digital color copying machine of the embodiment.

In FIG. 6, numeral 100 is a main CPU which controls the overall operation of the copying machine. The main CPU 100 is connected to a printer control CPU 102 for controlling the operation of the printer, reader control CPU 104 for controlling the reading operation, a main image processor 106 for processing the image forming operation, an operation unit 108 for processing various inputs from an operator. The printer control CPU 102 and reader control CPU 104 respectively control the printer 120 and reader 112. The CPUs 102 and 104 serve as a slaves with respect to the main CPU 100, a master.

The printer control CPU 102 is connected to a printer driving system 114 for controlling the input operation to the printer 120.

The reader control CPU 104 is connected to an input system image processor 116 for performing the correction processing such as such as a shading correction, a color correction, and γ correction required for the reading system 118 and a reader drive system 118 for controlling the input to the reader 112.

Furthermore, the image sensor 126 comprising a CCD is connected to the input system image processing unit 116 which is connected to the main image processor 106.

The reader 112 is provided with the main CPU 100, reader control CPU 104, main image processor 106, operation unit 108, input system image processor 115, reader drive system 118, and image sensor having a CCD line sensor. The printer 120 is provided with the printer control CPU 102, synchronizing memory 110, recording head 156, and printer drive system 114.

(Image Discrimination Processing)

Figure 7:
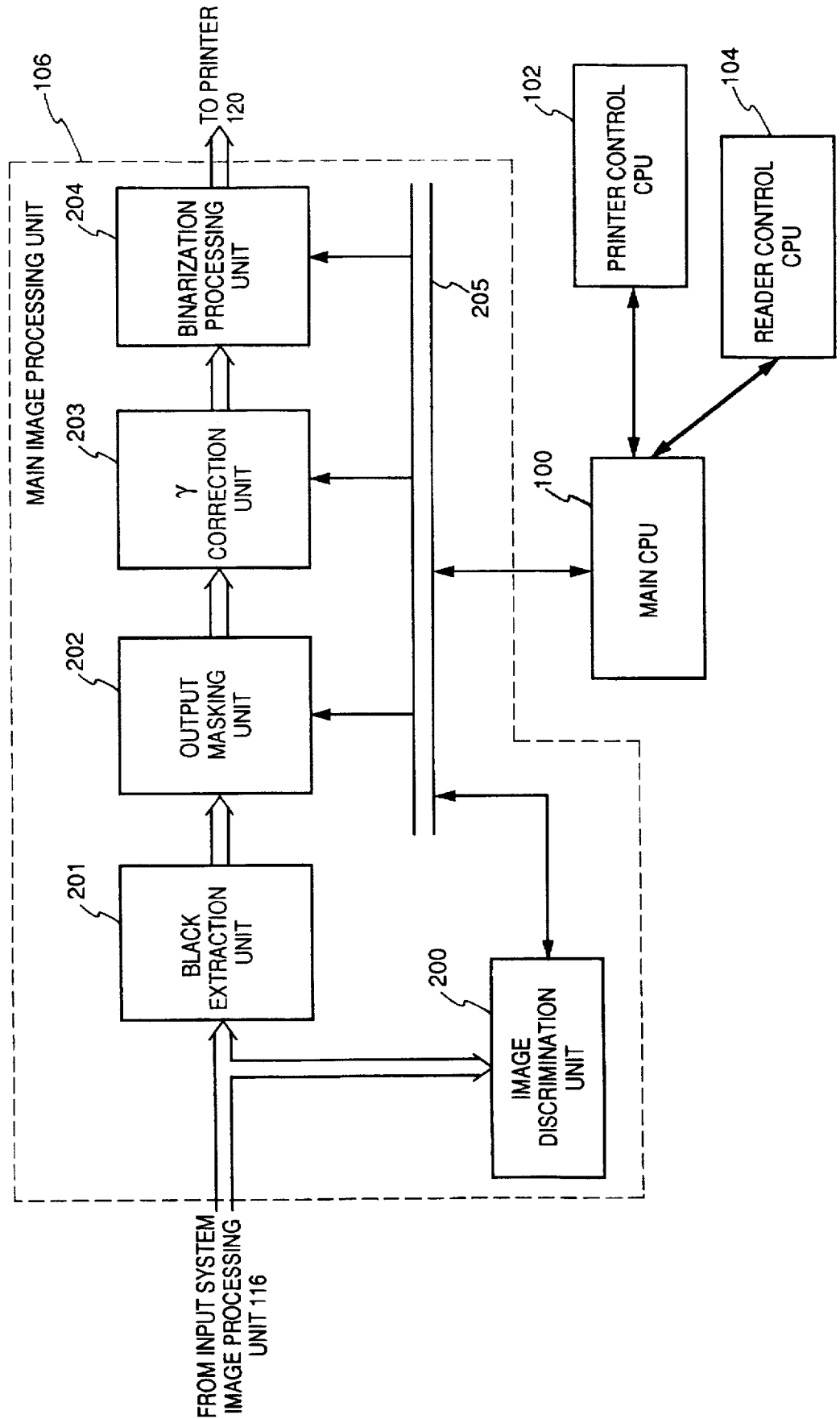
FIG. 7 is a block diagram illustrating the construction of control of a main image processor 106 of the first embodiment.

The main image processor 106 is described in detail. FIG. 7 is a block diagram illustrating the control structure of the main image processor 106.

An image signal from the input system image processor 116 is transmitted to a black extraction unit 201. Black data is extracted from minimum values of C, M, Y image components. The image signal is also transmitted to an image discrimination unit 200. In the image discrimination unit 200, whether or not the input image signal is that of a specific original which is prohibited from image formation (hereinafter referred to as a "specific original") is discriminated by a well-known pattern recognition method.

Numeral 202 is an output masking unit for performing an output masking processing to the image, numeral 203 is a γ correction unit for performing a γ correction, and numeral 204 is a binarization processor for binarizing a multivalue image signal. The image signal which is binarized in the binarization processor 204 is transmitted to the printer 20. Parameters needed for each processor (200-204) are set by the main CPU 100 via a data bus 205. The result of discrimination in the image discrimination unit 200 is also transmitted to the main CPU 100 via the data bus 205. The image signal is transmitted to the printer 120, as image data via each processor (200-204), where an image is formed based on the image data.

The detail of the copying sequence which is executed in the main CPU 100, printer control CPU 102, reader control CPU 104 is described with reference to FIGS. 8 and 9.

Figure 8:
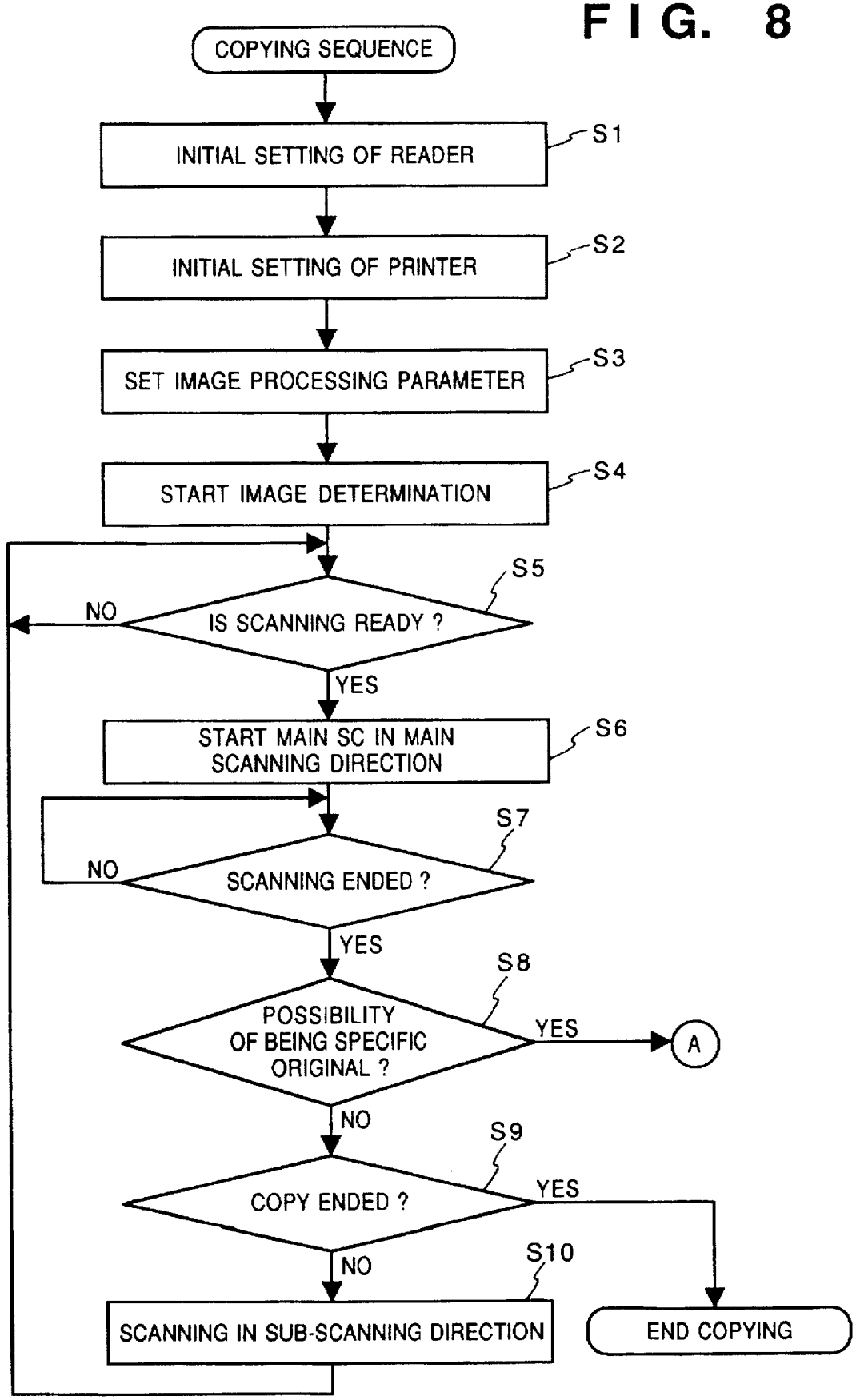
FIG. 8 is a flowchart illustrating a copy sequence in the first embodiment.
Figure 9:
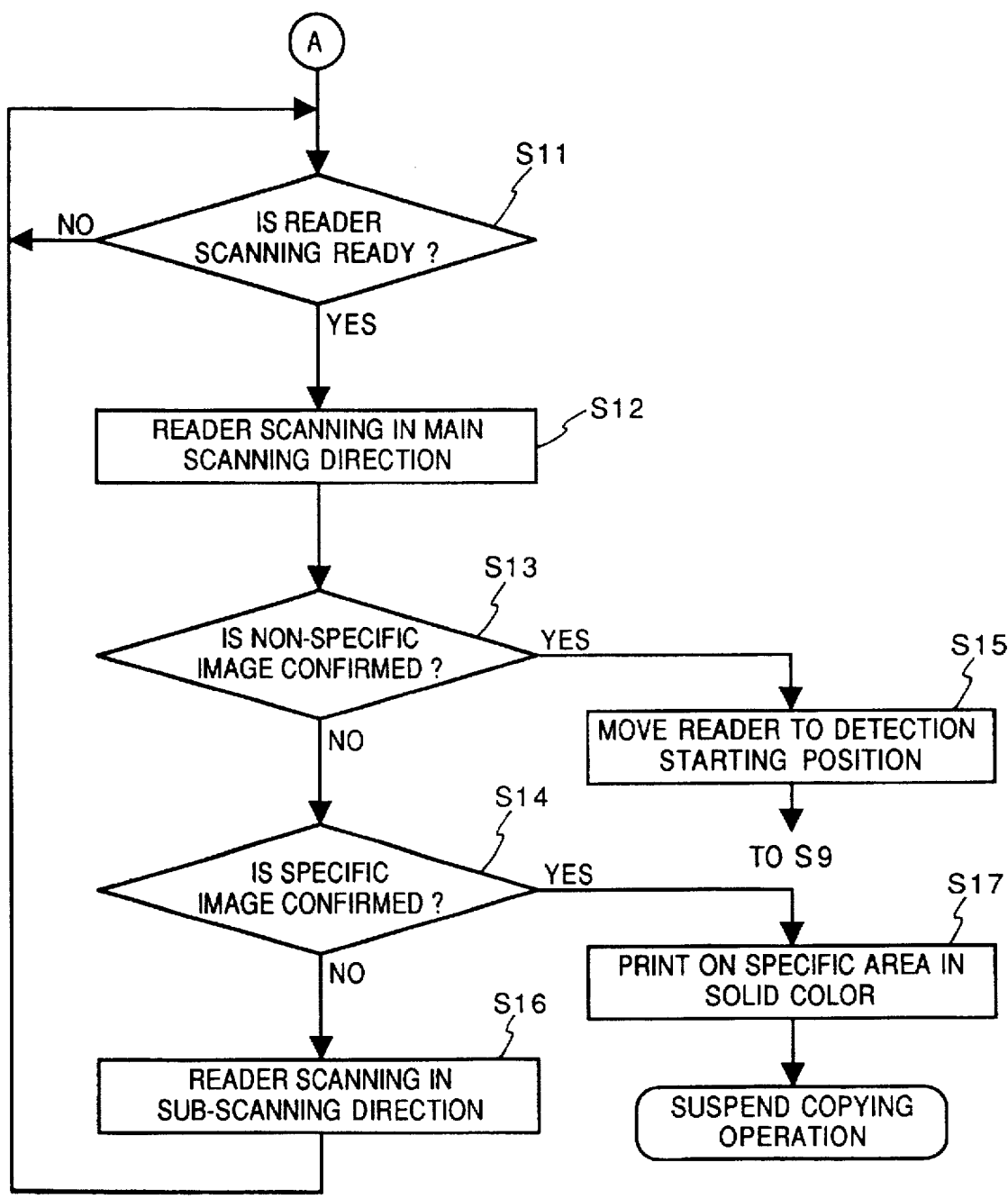
FIG. 9 is a continuation flowchart illustrating a copy sequence in the first embodiment.

When a start key (not shown) provided in the operation unit 108 is pressed, a copying sequence task program is called out of a program memory (not shown), the main CPU 100 proceeds the process to step S1 of FIG. 8.

At step S1, data required for an initial setting is transmitted to the reader control circuit 104 and the initial setting of the reader 112 is performed. When this setting ends, the process proceeds to step S2 where the data required for the initial setting is transmitted to the printer control CPU 102 and the initial setting of the printer 120 is performed.

When the above processings end, the main CPU 100 proceeds the process to step S3 where the image processing parameters are set. Data required for the image discrimination unit 200, output masking unit 202, and γ correction unit 203 are set. At step S4, the image discrimination unit 200 is activated to start image discrimination.

At step S5, if a state where the reader and printer are ready for main scanning operation is confirmed, the process proceeds to step S6 where the main scanning operation is started. During the scanning operation in the main scanning direction, the image discrimination unit 200 monitors an input image signal and discriminates the possibility if the input image signal is that of a specific original. When the scanning operation ends at step S7, the process proceeds to step S8. At step S8, the main CPU 100 reads the data from the image discrimination unit 200 and discriminates the possibility of the input image signal being a specific original. If the possibility is low, the process proceeds to step S9 where whether or not the image formation for all bands has been completed, that is, the coping operation has been completed is discriminated. If YES, the copying sequence ends, while if NO, the process proceeds to step S10 where a scanning operation in the sub-scanning direction is performed in the reader 112 and printer 120. Subsequently, the process returns to step S5 where the above processing is repeated.

On the other hand, if it is determined that there is a possibility that the input signal is that of the specific original, the process proceeds to step S11 where it is confirmed if the reader 112 is ready for scanning operation. If it is confirmed, the process proceeds to step S12 where the reader 112 performs the scanning operation and reads the original image without the printing operation by the printer 120, and the image discrimination unit 200 discriminates if the input signal is that of a specific original.

After the scanning operation, the discrimination result of the image discrimination unit 200 is confirmed at step S13. If the read image not being a specific original is confirmed, the process proceeds to step S15. At step S15, a reader carriage 190 (FIG. 10) is moved to the sub-scanning position where the image discrimination unit 200 has detected, at step S8, that the input signal has the possibility of being the specific original. Subsequently, the process returns to step S9 where the image starts to be formed again.

On the other hand, when , the process proceeds to step S14. At step S14, if the read image being a non-specific original is not confirmed, the process proceeds to step S14. At step S14, if the read image being a specific original is not confirmed, the process returns to step S11. While if the read image being a specific original is confirmed, the process proceeds to step S17. Here, in the image recorded for one line when the input signal having the possibility of being the specific original is detected, the region where the specific original has been printed is subject to a pitch-black image and the copying operation is suspended.

Figure 10:
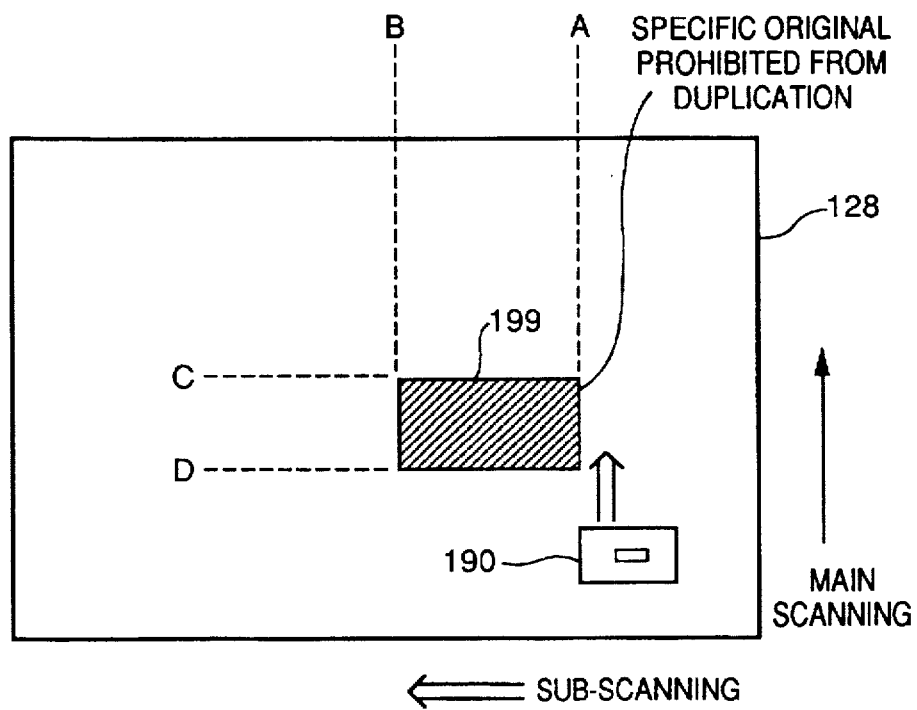
FIG. 10 is a diagram for explaining the copy sequence in the first embodiment.

The above sequence is described with reference to FIG. 10. FIG. 10 is a top view of a reader original table. Numeral 128 is an original glass table and numeral 190 is a reader carriage. Furthermore, numeral 199 is a specific original having a specific image.

The specific original 199 is placed on the original glass table 128. It is assumed that the possibility of being specific original is detected at the position A in the sub-scanning direction by the image discrimination unit 200. At this point, the printer 120 once suspends the printing operation, while only the reader 112 performs a scanning operation for image discrimination. If it is confirmed that the read image is the specific original at the position B, the printer 120 performs a solid printing over the region where the specific original is recorded at the position A, and the copying operation is stopped immediately. If it is confirmed that the input image is not the specific original at the position B, the reader carriage 190 is returned to the position A, and the image formation after the next band of the position A where the reader and printer have been conveyed to the sub-scanning direction. The reader carriage 190 is once returned to the position A and conveyed to the sub-scanning direction to prevent backlash in each feeding mechanism.

As described above, according to the image forming apparatus of the present embodiment, the recording of the specific image is suppressed and the formation of the specific image can be suspended. Furthermore, since the scanning operation for the image discrimination is executed only when there is the possibility that the original image may be a specific original, decrease of throughput in the image formation as an apparatus can be suppressed.

Furthermore, in the above embodiments, the scanning operation in the reader 112 in the case of detecting the specific images is a similar operation to that of general image formation, however, this does not impose a limitation to the invention.

In general, in the image forming apparatus having the above structure, a scanning direction only in one direction with respect to the main scanning direction is performed during the image formation. This is because the order of printing each color (C, M, Y, BK) effects on the color tone of the image and the mechanical accuracy needs to be assured for both directions during the reciprocating recording operation which is mechanically difficult in comparison with the recording in one direction.

However, when a final discrimination after the discrimination of the possibility of being a specific original, the printer 120 is not operated. Accordingly, if the mechanical accuracy in the reader 112 is assured, a reciprocating reading can be performed during the discrimination of the possibility. Thus, the throughput of the sequence whether the input image is a specific image is discriminated can be improved.

Furthermore, in the case of discrimination of the specific original, the scanning area in the main scanning direction can be limited to the area where a specific original may exist. For example, in FIG. 10, on the areas C to D are subject to the scanning operation. Means for determining this area is executed when a counter which counts up every one pixel in the main scanning and RAM which temporary stores values according to the signal from the image discrimination unit. According to this method, the throughput in the specific original discrimination can be further improved.

<Second Embodiment>

In the first embodiment, the present invention is applied to a digital color coping machine, however, a similar structure can be applicable to a scanner or printer.

Figure 11:
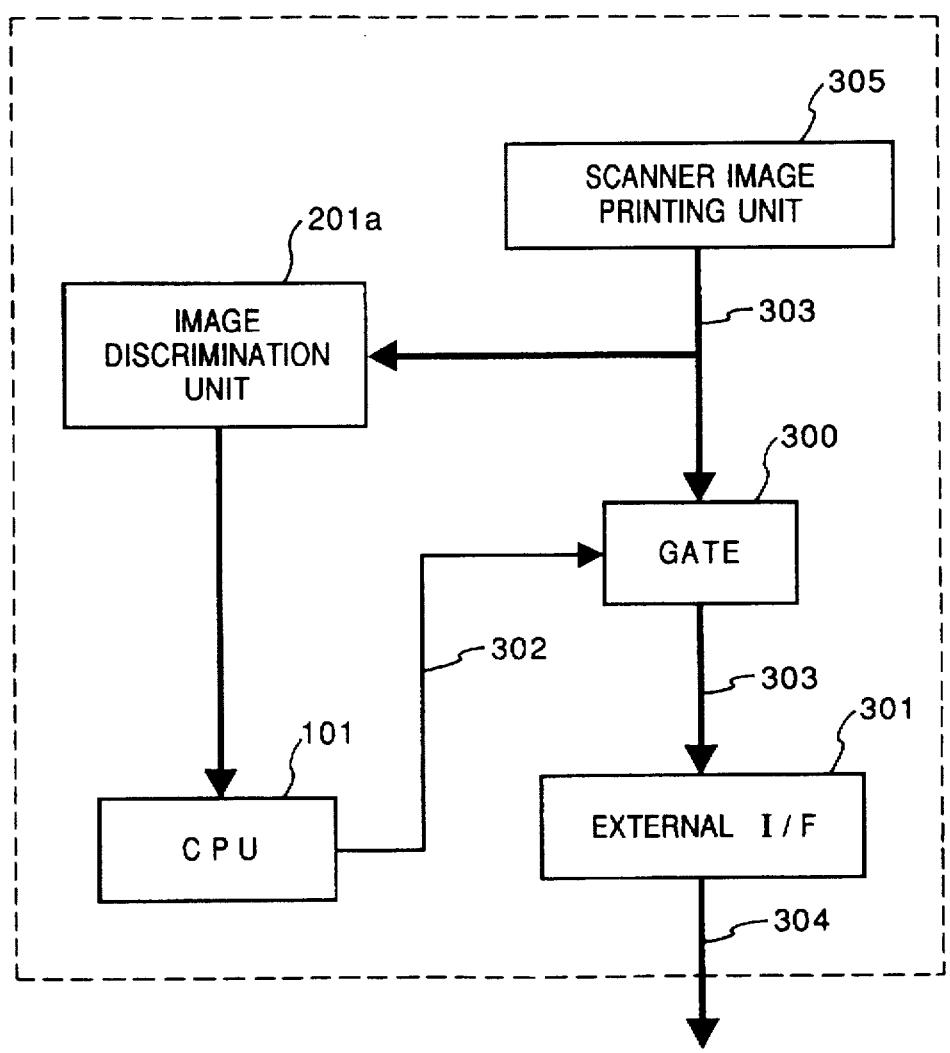
FIG. 11 is a block diagram illustrating an example of the construction of scanner control according to a second embodiment.

FIG. 11 is a diagram illustrating the control structure when the invention is applied to a scanner. Numeral 303 is an image data bus where an image signal goes through, numeral 300 is a gate unit which gates the image signal, numeral 302 is a gate control signal which turns on/off the gate 300, numeral 301 is an external I/F such as an SCSI which transmits the image signal to the outside, and numeral 304 is an external I/F bus. Numeral 305 is a scanner image processor which contains a reading head for reading the original image.

When the image discrimination unit 201a discriminates the possibility such that there is a specific original in the original image, the CPU 101 turns off the gate control signal 302 so that the image data is not outputted from the external I/F 304. Then, as similar to the first embodiment, only the scanning for the original discrimination is performed. When it is confirmed that the specific original is not present, the gate control signal 302 is turned on and the transmission of the image signal to the outside is restarted.

Figure 12:
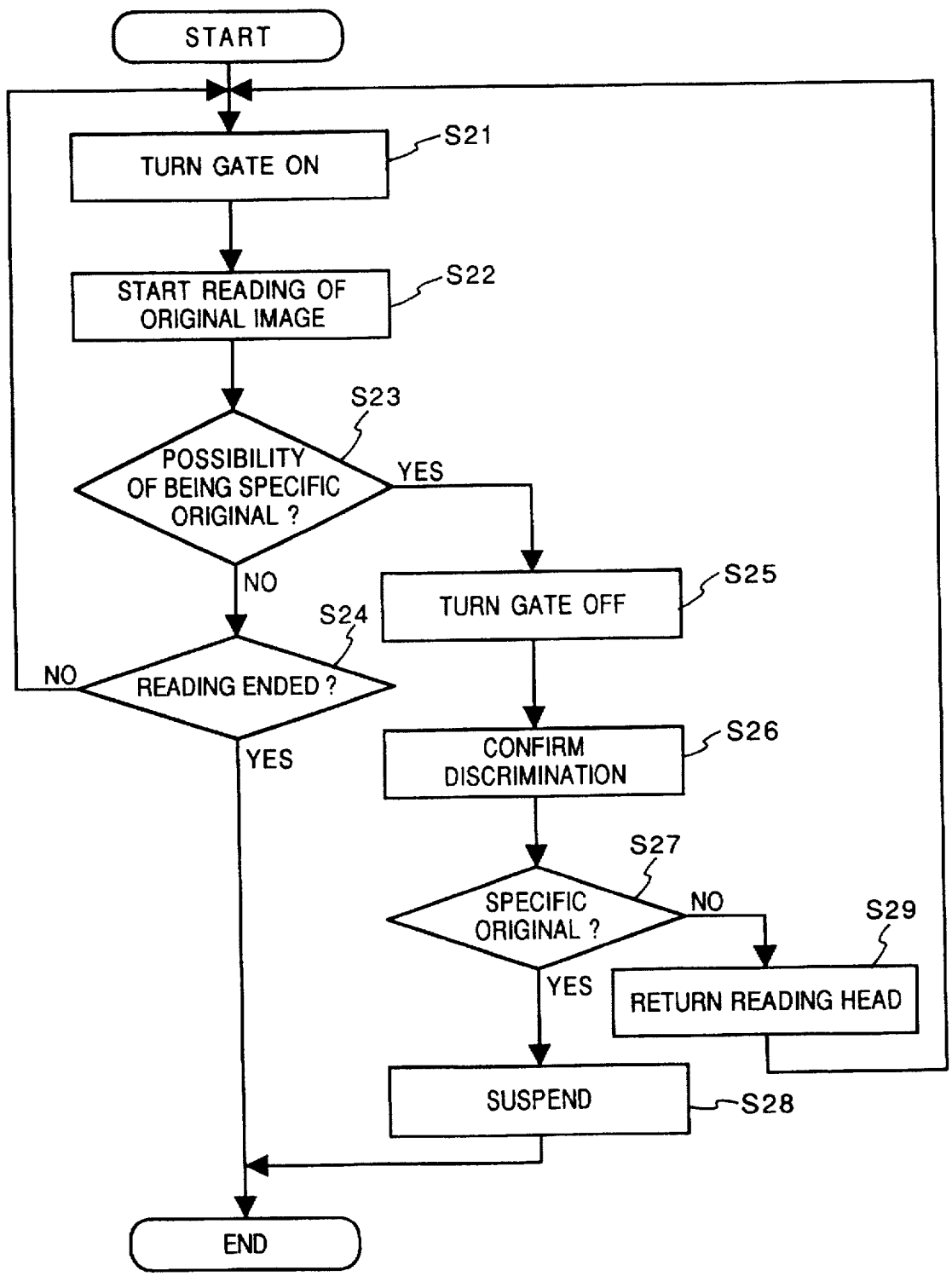
FIG. 12 is a flowchart for explaining the operation of the scanner of the second embodiment.

The above scanner operation is described more detail with reference to the flowchart of FIG. 12.

At step S21, the gate 300 is turned on so as being ready to output the image signal. At step S22, the reading of the original image is started by the scanner image processor 305. Since the state of the gate 300 is "on", the read image signal outputted from the scanner image processor 305 is outputted to the outside of the scanner via the external I/F 301. Furthermore, the image discrimination unit 201a monitors the image signal outputted from the scanner image processor 305 and determines if the original image has the possibility of being a specific original. At step S23, if the result is not "positive possibility", the process proceeds to step S24 where whether or not the reading of the original image has ended is determined. If not, the process returns to step S21, while if ended, the present processing ends.

On the other hand, at step S23, if the determination result is "positive possibility", the process proceeds to step S25 where the CPU 101 turns off the gate 300 by the control signal 302 and shuts down the output of the image signal to the outside of the scanner. At step S26, the image discrimination unit 201a discriminates if the original image is the specific original from the image signal continuously outputted from the scanner image processor 305. At step S27, the next processing is selected according to the discrimination result. That is, if the image determination unit 201a determines that there is the specific original in the original image, the process proceeds to step S28 where the scanner reading operation is suspended and this processing ends. On the other hand, if the original image is not the specific original, the process proceeds to step S29 where the reading head returns to the position where the gate 300 is turned off at step S25. Subsequently, the process returns to step S21 where the gate 300 is turned on and the output of the image signal to the outside of the scanner is restarted.

Figure 13:
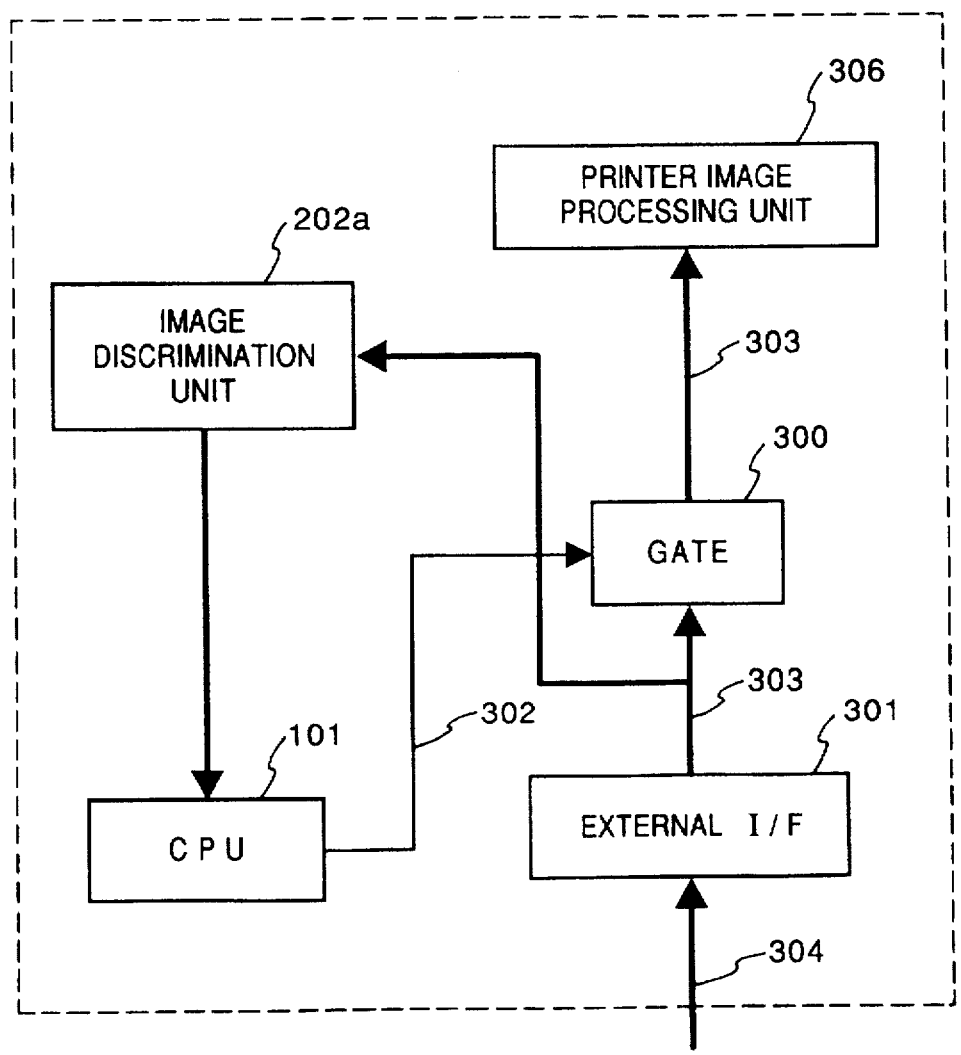
FIG. 13 is a block diagram illustrating an example of the construction of a printer control according to the second embodiment.

FIG. 13 is a diagram illustrating the control structure where the present invention is applied to a printer. In the scanner shown in FIG. 11, the position of the image pick up ports are respectively reversed in the gate 300 and image discrimination unit 202a. Furthermore, in FIG. 13, the elements which are identical to those in FIG. 11 have the same reference numerals.

Numeral 306 is a printer image processor which forms an image from the image data inputted via the gate 300 and records the image to a recording medium. As for the printer, when the image determination unit 202a detects the possibility of presence of the specific original, the gate 300 is turned off and the image transmission to the printer image processor 306 is tuned off. However, during this period, the image from the outside I/F 301 is being received and the above discrimination is continued. When the image is not any one of the specific originals is confirmed, the image retransmission request is outputted to the external apparatus and the recording is restarted from the point where the possibility of presence of the specific original has been detected.

Figure 14:
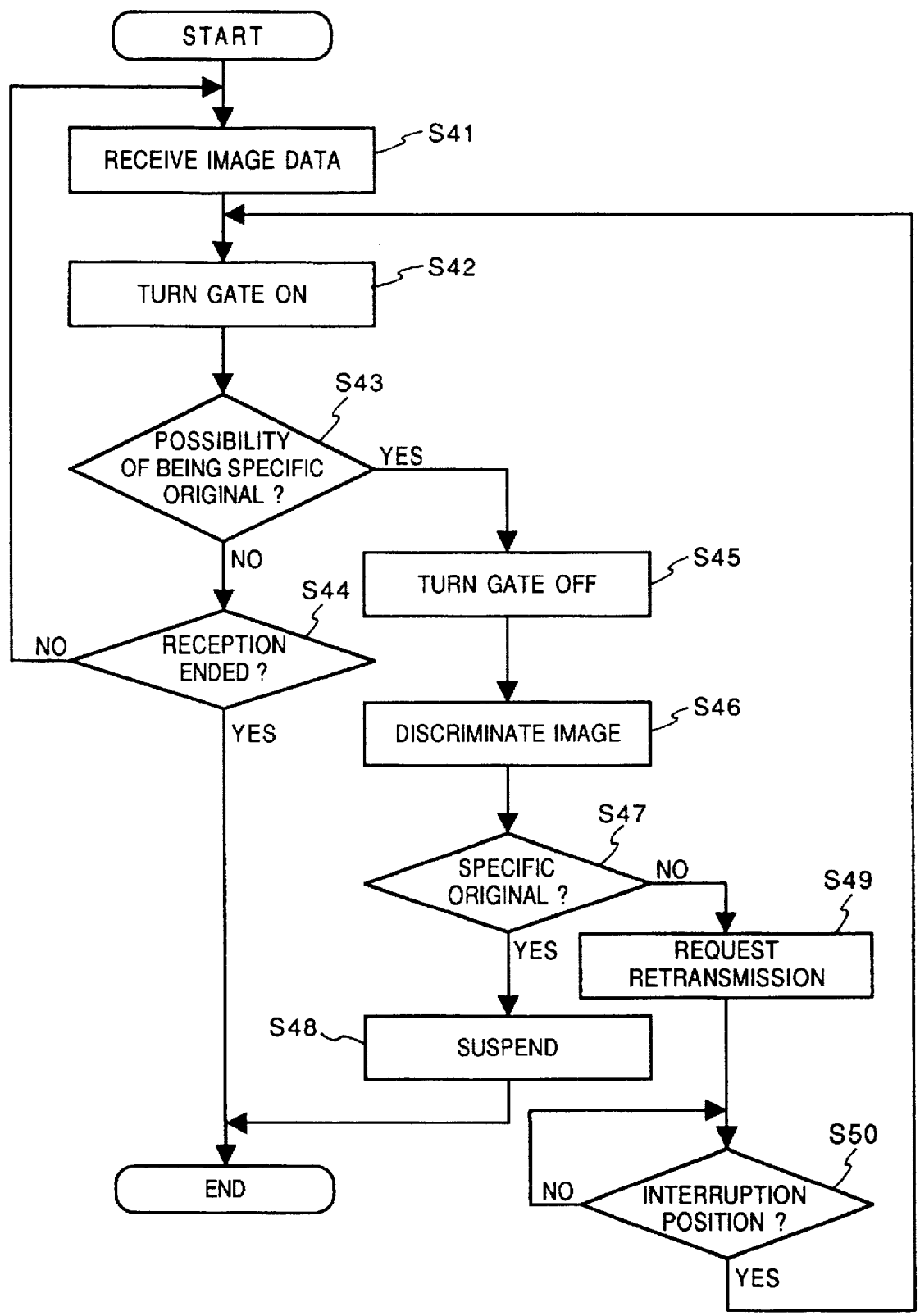
FIG. 14 is a flowchart for explaining the operation of the printer of the second embodiment.

FIG. 14 is a flowchart illustrating the operational procedure of the printer in the embodiment. When the image data is received at step S41, the process proceeds to step S42 where the CPU 101 turns on the gate 300. By turning the gate 300 on, the image data inputted from the external I/F 301 is inputted to the printer image processor 306 and an image is formed. Furthermore, the image data inputted via the external I/F 301 is inputted into the image determination unit 202a and discriminated if it has the possibility of being the specific original. At step S43, if the discrimination result by the image determination unit 202a is "there is the possibility (positive)", the process proceeds to step S45, while if negative, the process proceeds to step S44 where whether or not the reception had ended is determined. If the reception has ended, the present processing ends, while if not, the process returns to step S41.

At step S43, in the case of "there is the possibility", the process proceeds to step S45 where the CPU 101 turns off the gate 300, and the input of the image signal to the printer image processing 306 is shut down, thus, the image formation is interrupted. At step S46, the image determination unit 202a determines whether or not the image is one of the specific originals from the image data inputted via the external I/F 301. At step S47, the processing is branched off according to the result. As a result of the determination in the image determination unit 202a, when the presence of the specific original is confirmed, the process proceeds to step S48 where the image data reception is suspended. On the other hand, if the image is not any one of the specific images, the process proceeds to step S49 where the image data retransmission is requested. At step S50, the image determination unit 202a monitors the retransmitted image data and waits to receive the image of the point where the image formation has been suspended, that is, where the gate 300 is turned off at step S45. When the image data of the suspended point is received, the process returns to step S42 where the CPU 101 turns of the gate 300 and the image formation is restarted.

As described above, according to the first and second embodiments, when the image is read by repeating the above scanning operation, or the image is formed, the possibility that a pertinent image may be a specific image which is prohibited from the image formation is detected. When the possibility of presence is detected, the image formation is suspended, and the scanning operation to discriminate the presence is performed. Accordingly, since the image formation is suspended at the point where the possibility of presence has been detected, the formation of the specific original can be reduced to the minimum. Furthermore, since the scanning operation to confirm the presence is performed after the possibility is determined, the effect on the throughput of the image formation sequence can be suppressed.

Furthermore, after the detection of the specific image, the CPU stores the image in a backup memory and freezes the apparatus or the image forming apparatus and a copying control center are connected on-line and when the apparatus has detected a specific original, that can be informed to authorities. However, this does not impose the limitation upon the present invention.

In the first and second embodiments, the invention is applied to an ink-jet type printer, however, this does not impose the limitation upon the invention. For example, the invention can be applicable to a thermal type and other type of the printer.

<Third Embodiment>

The third embodiment of the present invention is described below.

The internal structure of the digital color copying machine and the structure of the vicinity of the scanning carriage according to this embodiment are the same as those of the first embodiment. Therefore, the description of those is not needed.

Figure 15:
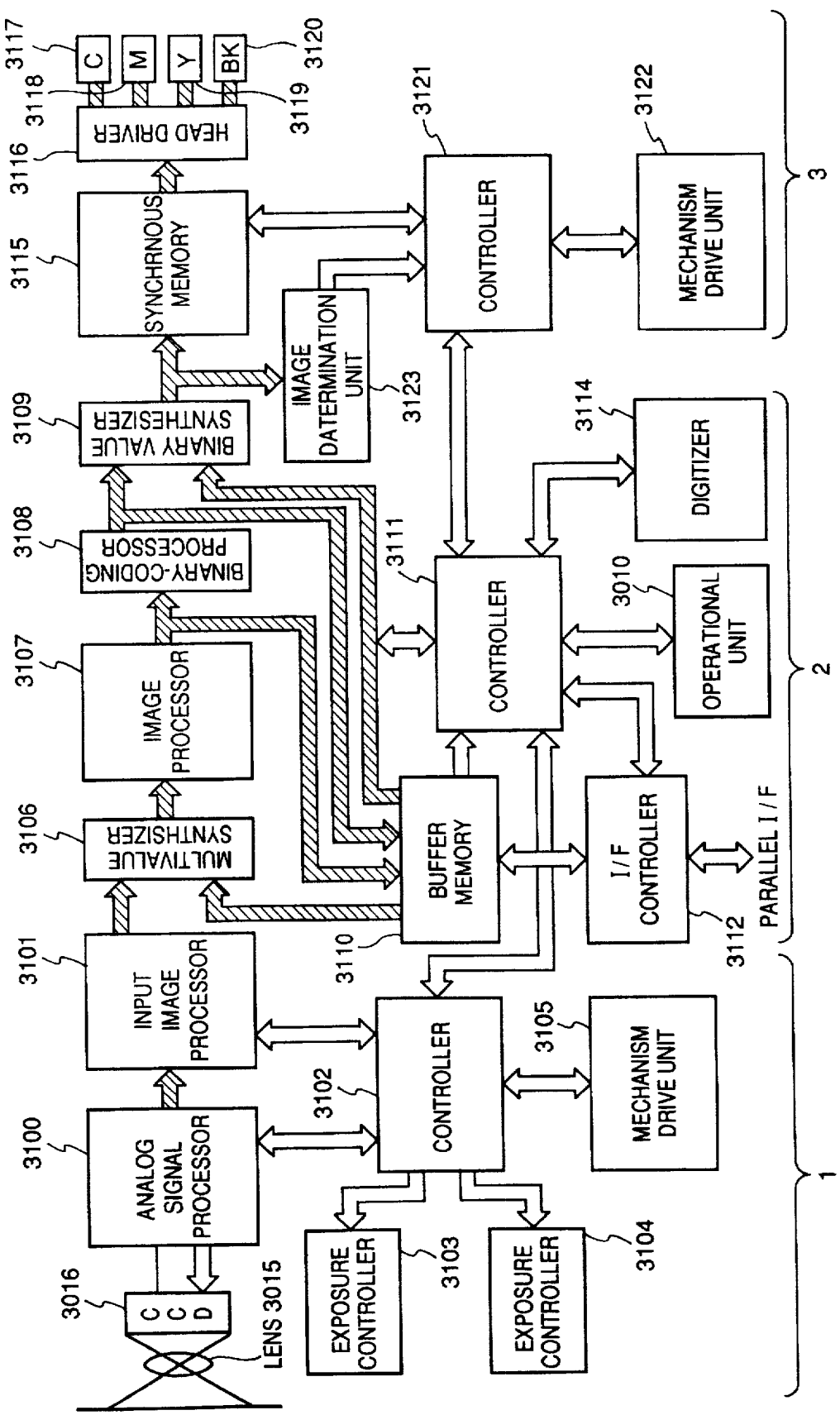
FIG. 15 is a block diagram illustrating the construction of the digital color copier of the third embodiment.

FIG. 15 is a block diagram illustrating the structure of the digital color copying machine of the embodiment. In the figure, controllers 3102, 3111, 3121 are circuits which respectively control the scanner 1, controller 2, printer 3, and comprised of a microcomputer, program ROM, data memory, and communication circuit. The controllers 3102–3111 and controllers 3111–3112 are connected by communication lines and operated by instructions from the control unit 3111. Thus, a master-slave control system is adapted.

The control unit 3111 is operated according to an input instruction from an operation unit 3010 and digitizer 3114 in a case where the subject apparatus is operated as a color copying machine.

The operation unit 3010 has a display formed by a liquid crystal display (LCD display) and a touch panel made of a transparent electrode located on the surface of the display, so that a selective instruction such as an instruction of color conversion and an instruction of an editorial operation can be made. Furthermore, keys relating to the operations, the following keys (not shown) which are used frequently are individually disposed: a start key for instructing to start the copying operation, a stop key for instructing to stop the copying operation, a reset key for returning the operation mode to a normal state, and a projector key for selecting a projector.

A digitizer 3114 is used to input positional information about a region to be subject to the trimming processing, masking processing, and color conversion processing. If a complicated editorial processing is required, the digitizer 3114 is connected as an option.

The control unit 3111 also controls an I/F control unit 3112 which is a control circuit for IEEE-488, that is a general-purpose parallel interface such as a GP-IB interface. The above-mentioned interface is used to input/output image data to and from external apparatus, for example host computer, and to remote-control the apparatus by an external apparatus.

Furthermore, the controller 3111 controls a multivalue synthesizer 3106 for performing various processing operations, an image processor 3107, a binary synthesizer 3109, and a buffer memory 3110.

The controller 3102 controls a mechanism drive unit 3105 for controlling a mechanism drive of the scanner 1, an exposure control unit 3103 for controlling an exposure lamp for use to read a reflected original document and an exposure controller 3104 for controlling an exposure halogen lamp (not shown) for use when a projector (not shown) is used. The controller 3102 also controls an analog signal processor 3100 and an input image processor 3101 for processing the image.

The controller 3121 controls a synchronous delay memory 3115 for absorbing the time scattering taken place between the operation of the mechanism drive unit 3105 for controlling the printer 3 and correcting a delay taken place due to the mechanical configuration of the recording heads 3117–3120.

The digital color copying machine shown by the image processing block of FIG. 15 will now be described with reference to a flow of the image signal.

The image formed on the CCD 3016 is converted into an analog electric signal by the CCD 3016. The converted image information is subject to a serial processing in the order of red→green→blue, for example, and supplied to the analog signal processor 3100. In the analog signal processor 3100, the image information is subject to the sample & hold processing, dark level correction, and dynamic range control for each color of red, green, and blue and is analog-to-digital concerted (A/D conversion), so that it is converted into a serial multivalue (the length for each color is 8-bit according to the embodiment) which is then outputted to the input image processor 3101.

The input image processor 3101 directly subject the serial multivalue digital image signal to the correction processings required for the reading system such as the shading correction, color correction, and γ correction operations.

The multivalue synthesizer 3106 of the controller 2 serves as a circuit block for selecting and synthesizing the serial multivalue digital image signal supplied from the scanner 1 and parallel I/F. The selected and synthesized image data is supplied to the image processor 3107 while being formed into the serial multivalue digital image signal as it is.

The image processor 3107 subjects the image data to the smoothing processing, edge highlighting processing, black extraction processing, masking processing for correcting the color of the recording ink for use in the recording head 3117-3120. The serial multivalue digital image signal outputted from the image processor 3107 is supplied to a binary-coding unit 3108 and the buffer memory 3110 respectively. The binary-coding unit 3108 serves as a circuit for binary-coding the serial multivalue digital image signal and may be operated according to a simple binarization by means of a fixed slice level, a pseudo half tone processing by the dither method selected. In the binary-coding unit 3108, the serial multivalue digital image signal is converted into a binary parallel image signal for four colors. Image data for four colors is supplied to the binary value synthesizer 3109 and that for three colors is supplied to the buffer memory 3110. The binary value synthesizer 3109 serves as a circuit for selecting and synthesizing the binary parallel image signal for the three colors supplied from the buffer memory 3110 and the binary parallel image signal for the four colors supplied from the binary-coding unit 3108 to form a binary parallel image signal for four colors. The buffer memory 3110 severs as a buffer memory for inputting/ outputting a multivalue image and a binary image via the parallel I/F and has a memory for three colors.

The synchronous delay memory 3115 serves as a circuit for absorbing the time scattering taken place between the operation of the mechanism drive unit 3105 for controlling the printer 3 and correcting a delay taken place due to the mechanical configuration of the recording heads 3117-3120. In the inside of the synchronous delay memory 3115, a timing required for driving the recording heads 3117-3120 is generated. A head driver 3116 serves as an analog drive circuit for driving the recording heads 3117-3120 and internally generating a signal which drives recording heads 3117-3120 directly. The recording heads 3117-3120 discharge inks of cyan, magenta, yellow, and black and the image is recorded on the recording paper.

Figure 16:
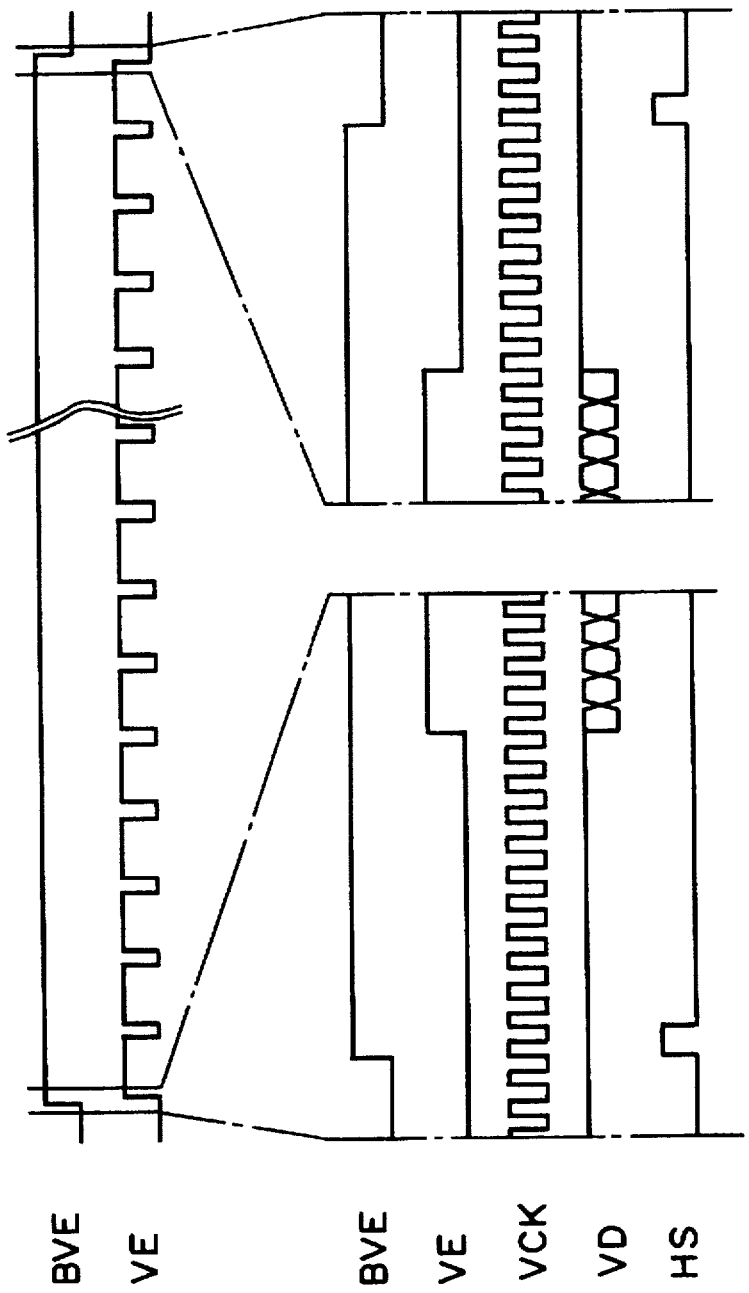
FIG. 16 is a timing chart of the image between circuit blocks shown in FIG. 15.

FIG. 16 is an image timing chart for use in the functional block of the digital color copying machine shown in FIG. 15. Referring to FIG. 16, signal BVE denotes an image effective region for each scanning operation in the main scanning reading operation shown in FIG. 5. By outputting the signal BVE plural times, the image of the overall original document is outputted.

Signal VE is a signal denoting the effective region for an image for each line read by the CCD 3016. When the signal BVE is effective, the signal VE becomes effective.

Signal VCK is a clock signal for transmitting image data VD. The signals BVE and VE are changed in synchronization with the signal VCK.

Signal HS is a signal for use in a case where the signal VE discontinuously repeats the effective region and an ineffective region during an output for one line. The signal HS is not required in a case where the signal VE is continuously effective during an output for line. The signal HS is the signal indicating the start of the one-line image output.

The delay between the recording heads in terms of binary image data for C, M, Y and BK supplied from the binary value synthesizer 3109 of FIG. 15 are corrected by the synchronous delay memory 3115. Then, the binary image data is printed and recorded by the recording heads 3117-3120 and supplied to the image discriminating unit 3123. The image discriminating unit 3123, in a real time manner, compares the supplied binary image data and specific image data, which has been previously registered. If the supplied binary image data shows significant similarity with the specific image data, the image discriminating unit 3123 supplies a discriminating signal to the controller 3121 to interrupt the printing operation. At this time, the controller 3121 informs the controllers 3102 and 3111 that the aforesaid fact has been caused.

Since a digital color copying machine of the type according to this embodiment is capable of directly printing binary image data via the I/F controller 3112 and the buffer memory 3110 if a host computer or the like is used, its image discriminating unit 3123 must be arranged to discriminate whether or not printing is performed according to a binary image data just before printing in order to inhibit printing of the specific image data through the aforesaid route.

Figure 17:
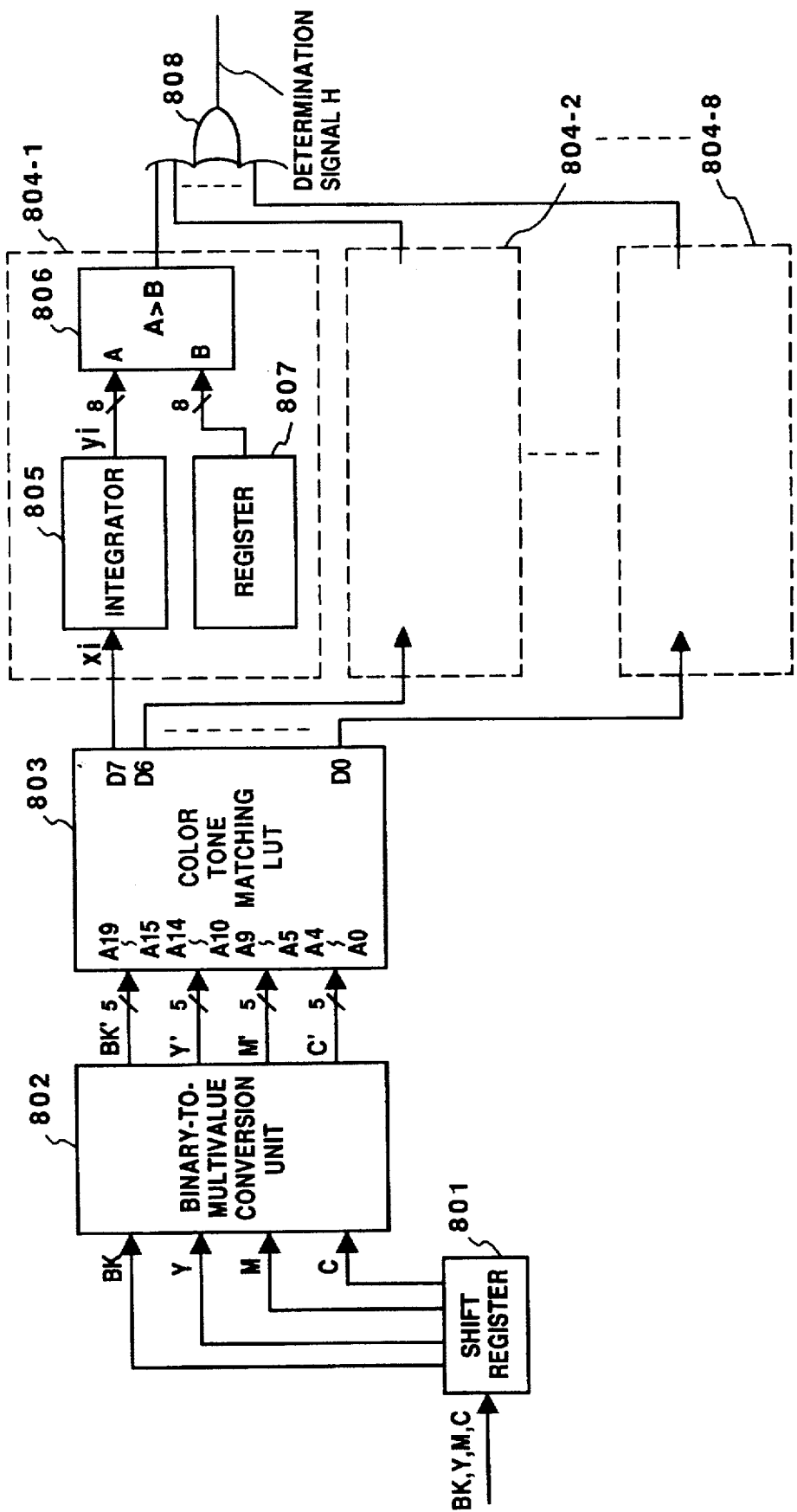
FIG. 17 is a block diagram illustrating the construction of an image determination unit 3123 according to a third embodiment.

FIG. 17 is a block diagram which illustrates the structure of the image discrimination unit 3123 shown in FIG. 3. Referring to FIG. 17, numeral 810 represents a shift register for converting image signals for C, M, Y and BK supplied in the form of a serial signal into parallel signals in this way that a timing controller (not shown) converts the serial binary image data for C, M, Y and BK into the parallel signals. Numeral 802 represents a binary-to-multivalue conversion unit for converting the binary image data, which has been converted into the parallel signal by the shift register 801, into the multivalue image data of 5 bits for each color. The reason why the width of the bit is determined to be 5 bits lies in that the load acting on the ensuing process in the circuit must be reduced and the specific original document must be detected reliably. Furthermore, the image data to be converted from the binary data into the multivalue data is selectively converted into the multivalue data in such a manner that one pixel for each four pixels is converted into the multivalue data. The reason for this also lies in the aforesaid requirements.

Numeral 803 represents a color-tone matching lookup table (hereinafter referred to as a "color tone matching LUT") serving as a ROM for matching the color tones which are the characteristics of plural kinds of specific original documents. Numerals 804-1, 804-2, . . . , 804-8 represent color tone discriminating circuits respectively formed by similar hardware. As typically shown by the color tone discriminating circuit 804-1, each of the color tone discriminating circuit is formed by an integrator 805, a register 807 and a comparator 806 and is capable of discriminating whether or not the specific original document is present in the image data. Numeral 808 represents an OR circuit for outputting "1" as a result of the discrimination in a case where at least one output from the color tone discriminating circuits 804-1 to 804-8 indicates the fact that the specific original document is present.

The binary-to-multivalue conversion unit 802 is described in detail.

Figures 18, 19, 20:
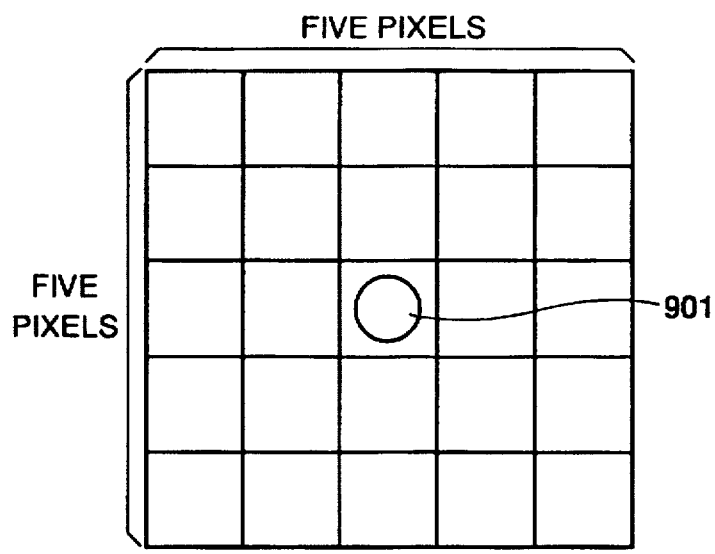
FIG. 18 is a diagram for explaining a processing method of a binary-to-multivalue conversion unit 802 according to the third embodiment.
FIG. 19 is another diagram for explaining a processing method of a binary-to-multivalue conversion unit 802 according to the third embodiment.
FIG. 20 is a diagram for explaining a processing method of a binary-to-multivalue conversion unit 802 according to the third embodiment.

FIGS. 18, 19 and 20 illustrate the binary-to-multivalue conversion method according to the third embodiment in the binary-to-multivalue conversion unit 802. According to this embodiment, the supplied binary image data is subject to the area processing. That is, as shown in FIG. 18, a matrix of 5 pixels×5 pixels is used to obtain the sum of the cells in which image data is present for the purpose of obtaining the density level of a subject pixel 901. Each cell has a weight coefficient at this time and therefore a value multiplied by the weight coefficient becomes data about each cell.

Assuming that the weight coefficient of each cell of the matrix is xi, yi (i, j=1 to 5), density level e of the subject pixel can be obtained by the following Equation (1):

$$e = \sum_{i=1}^{5} \sum_{j=1}^{5} (x_i \cdot y_i \cdot a_{i,j}) \quad (1)$$

where a is image data and is 1 or 0 because it is a binary image here.

FIG. 20 illustrates an example of the weight coefficient, wherein the highest density level is 61 (in the decimal format) and therefore all of the density levels can be expressed with the data width of 5 bits in the binary format.

Figure 21:
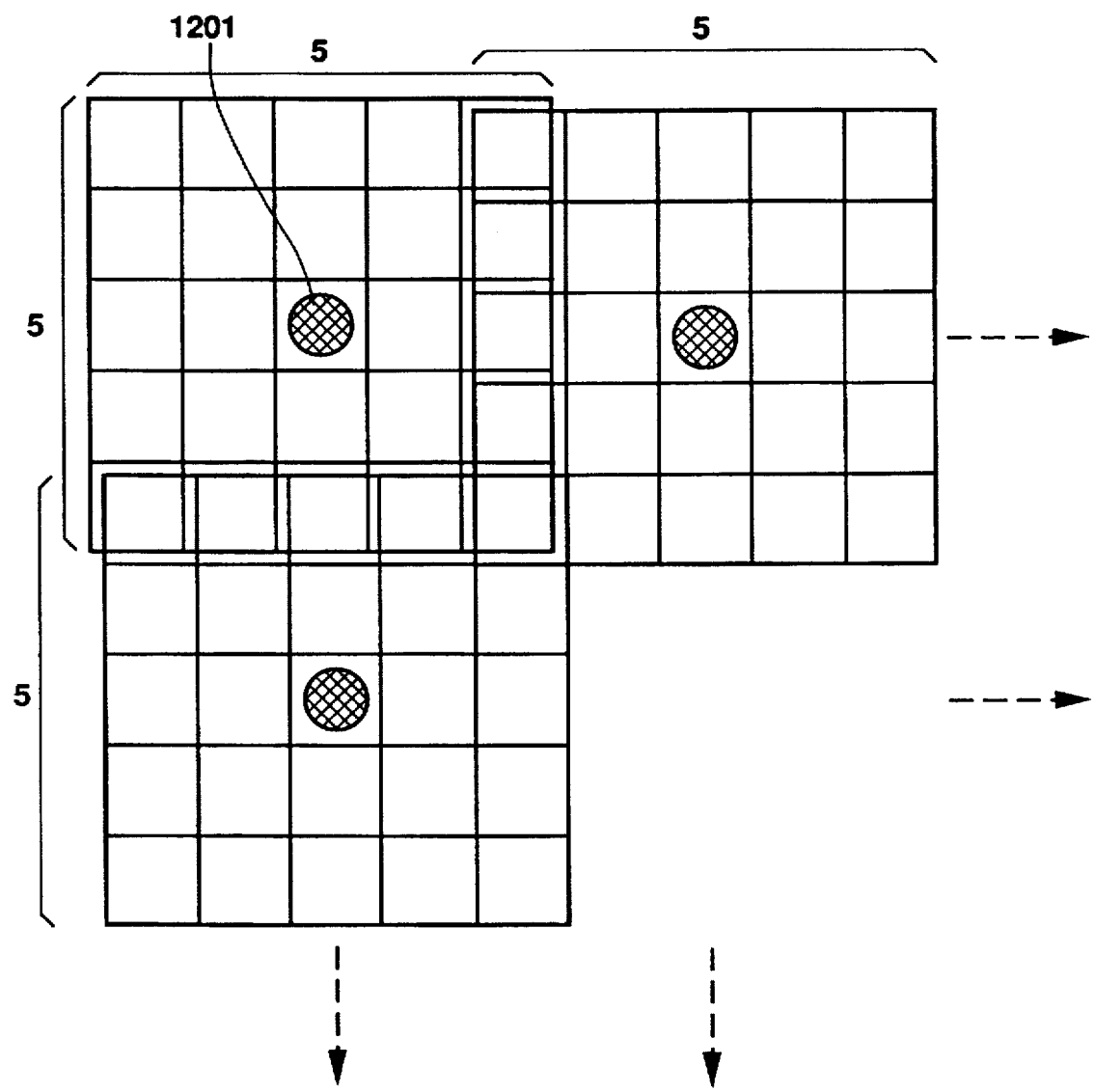
FIG. 21 is a diagram for explaining a method for multivalued transform by thinning image data in the third embodiment.

Then, a method of performing the multivalue-conversion while thinning the image data, in the third embodiment, will now be described with reference to FIG. 21. When the subject pixel 1201 is converted into multivalue data, and the fifth image data is made to be the subject pixel which is converted into the multivalue data.

The binary-to-multivalue conversion unit 802 has individual circuits for each color code C, M, Y and BK. The image data for C, M, Y and BK, which have been binary-to-multivalue converted by the aforesaid method are supplied to the color tone matching LUT 803 shown in FIG. 17.

The color tone matching LUT 803 stores color tone distribution previously examined about the 8 types of specific original documents and results of discriminations made whether or not the color tones of supplied image data coincide with the color tones of the aforesaid specific original document.

More particularly, the color tone matching LUT 803 has 20-bit address lines (A0 to A19) and, in units of 5 bits, receives image data for each C, M, Y and BK converted into the multivalue data by the binary-to-multivalue conversion unit 802. The color tone matching LUT 803 has 8-bit (D0 to D7) data output lines to discriminate 8 types of original documents since each bit corresponds one type of the specific original document.

Figure 22:
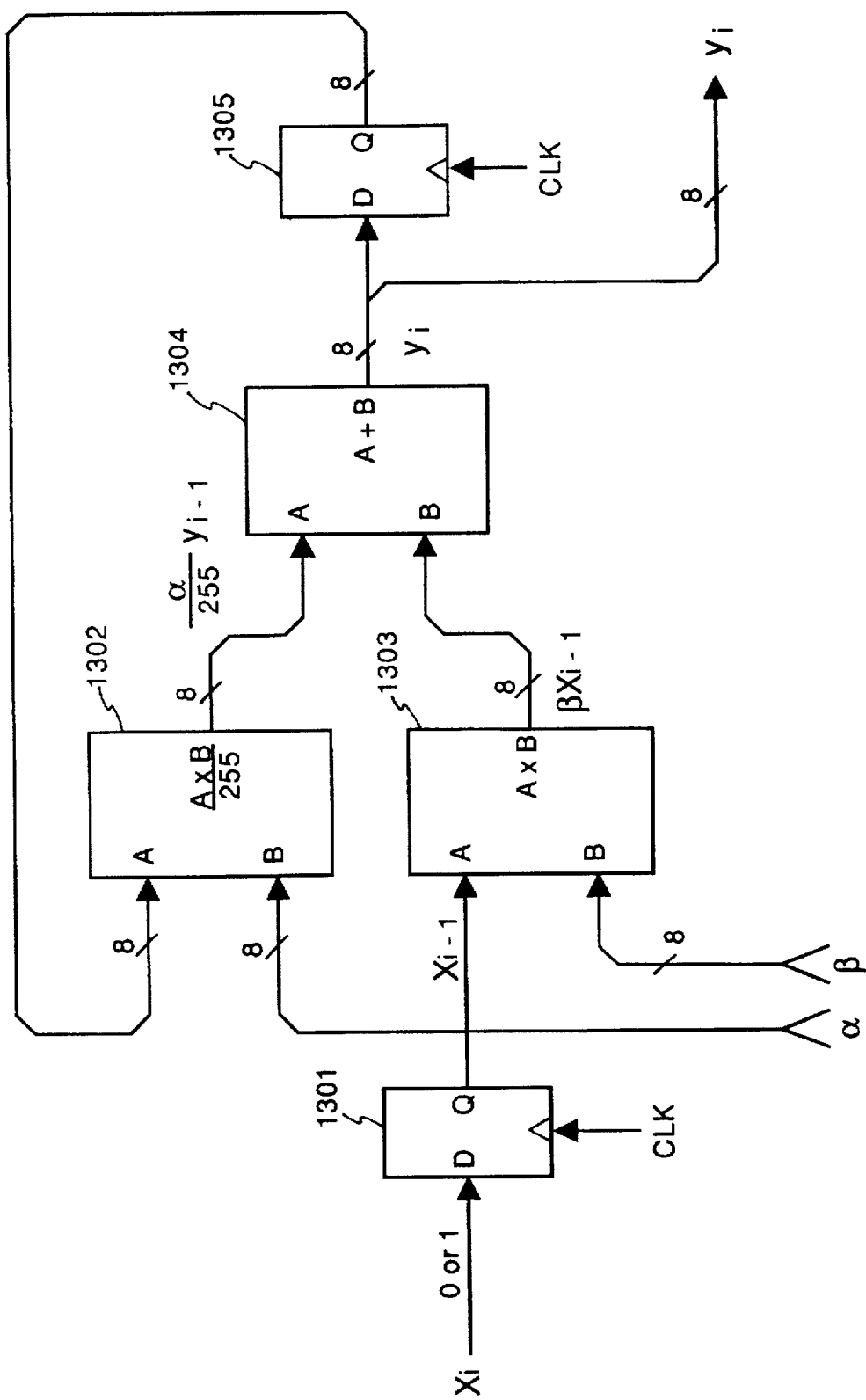
FIG. 22 is a block diagram illustrating the construction of an integrator 805 according to the third embodiment.

FIG. 22 is a block diagram which illustrates the structure of the integrator according to the third embodiment. Referring to FIG. 13, numerals 1301 and 1305 represent flip-flops for holding data at the timing of the first transition of a CLK signal. Numeral 1302 represents a multiplier which receives two input signals (A, B) of 8 bits and outputs an 8-bit signal (A×B/255) denoting the result of the multiplication. Numeral 1303 represents a multiplier which receives a 1-bit input signal (A) and an 8-bit input signal (B) and which outputs an 8-bit output signal (A×B) denoting the result. Numeral 1304 represents an adder which receives two input signals of 8-bit (A and B) and outputs an 8-bit signal (A+B).

As a result of the aforesaid calculations, the integrator 805 receives a binary input signal xi and outputs an 8-bit output signal yi expressed by the following Equation (2):

$$yi = (\alpha/255)yi-1 + \beta \cdot xi-1 \quad (2)$$

where α and β are predetermined constants which determine various characteristics of the integrator 805.

Figure 23:
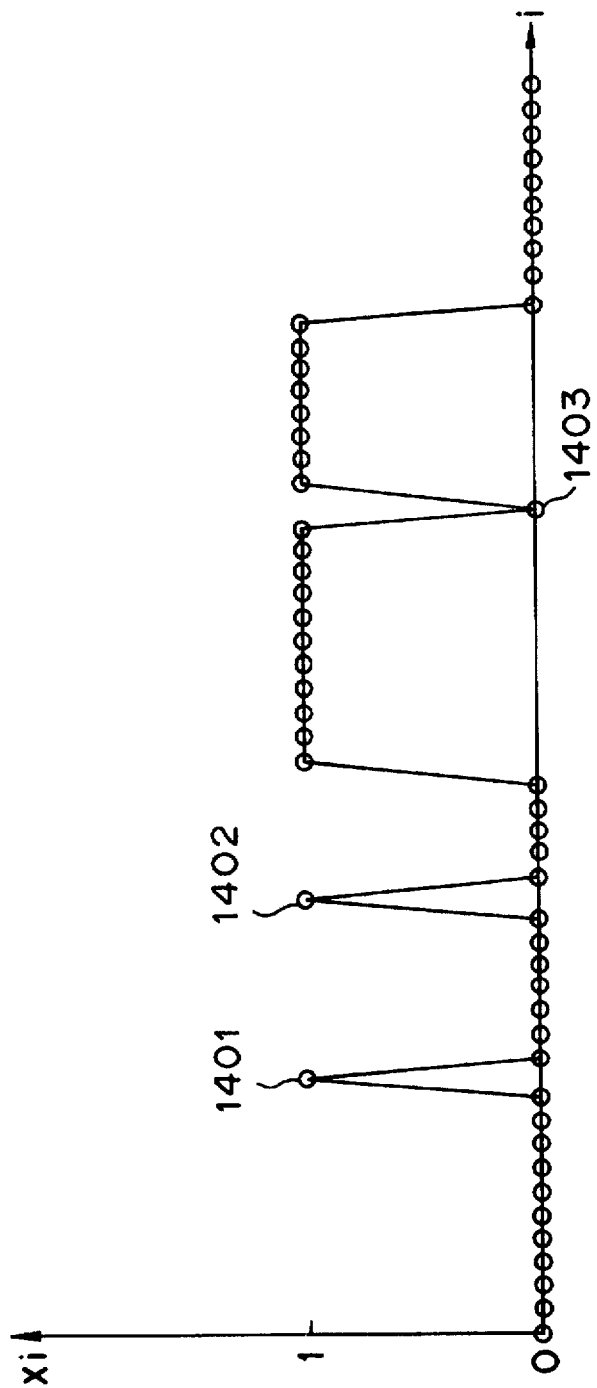
FIG. 23 is a diagram of an example of input/output of the integrator 805 according to the third embodiment.
Figure 24:
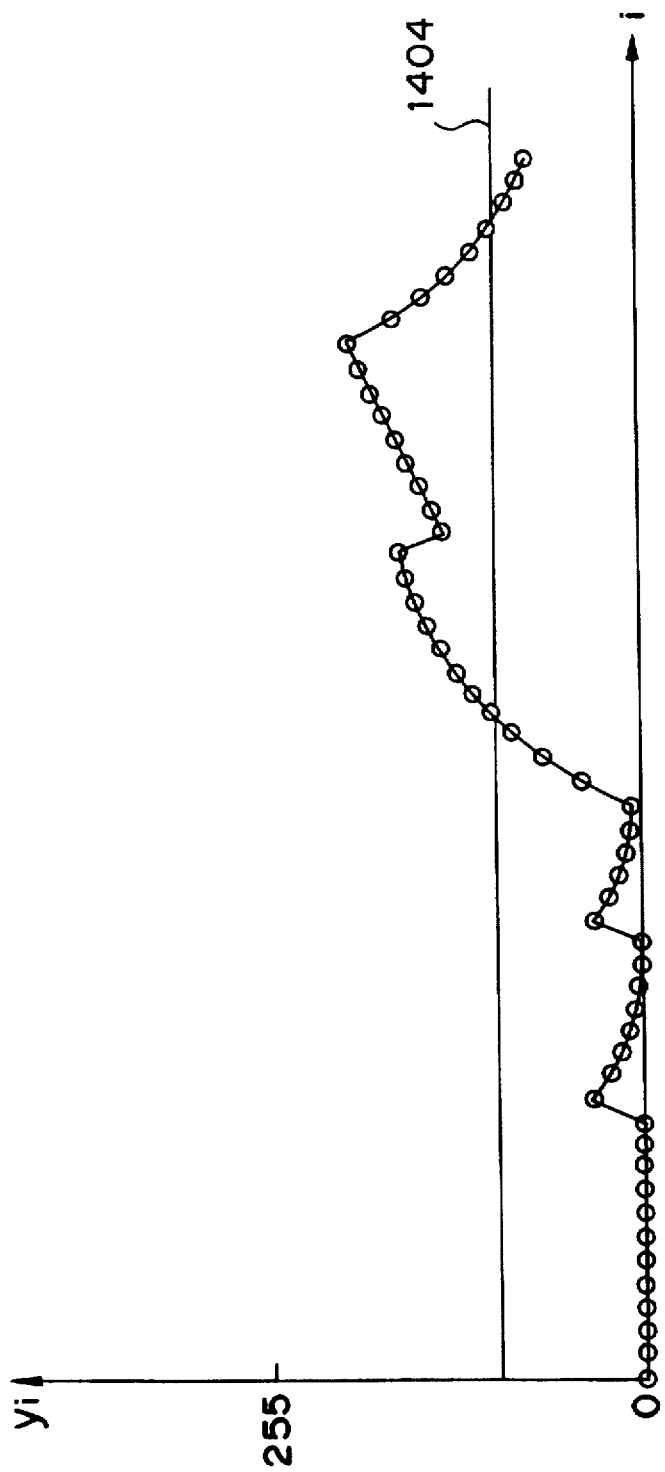
FIG. 24 is a diagram of another example of input/output of the integrator 805 according to the third embodiment.

FIGS. 23 and 24 illustrate an example of input and output from the integrator according to the third embodiment, where α=247, β=8. The integrator 805 outputs yi as shown in FIG. 24 with respect to the input xi−1 as shown in FIG. 23.

More particularly, an input such a dots 1401 and 1402, the level of which is substantially "0" at its surrounding portion and the level of which is "1" or an input such as a dot 1403, the level of which is substantially "1" and the level of which is "0" are considered to be noise. When the aforesaid inputs are processed by the integrator 805, its output becomes as shown in FIG. 24. Accordingly, a threshold such as a level 1404 shown in FIG. 24 is provided for the register 807 shown in FIG. 17 so as to be used to binary-code the output yi from the integrator. As a result, the aforesaid noise can be eliminated.

In the binarization result obtained in this way, the data of "1" is counted by a counter (not shown). When the sum obtained by the count is over a predetermined threshold, a final discrimination of the specific original is performed (hereinafter, a counted value of the binary data is referred to as a "count value"). The count values are continuously accumulated during three scanning operations. If the specific original is not present, the accumulated count value is cleared every three scanning operations, thus, preventing erroneous detection in the case where the image data in which the color tone is similar to that of the specific original is scattered over the large original document. In this embodiment, if the short side of the specific original such as paper money is scanned, it is detected as the specific original in three scanning operations, the accumulated count value is cleared every three scanning operations.

The detail discrimination sequence of a specific original according to this embodiment is described with reference to FIGS. 25, 26, and 27.

Figure 25:
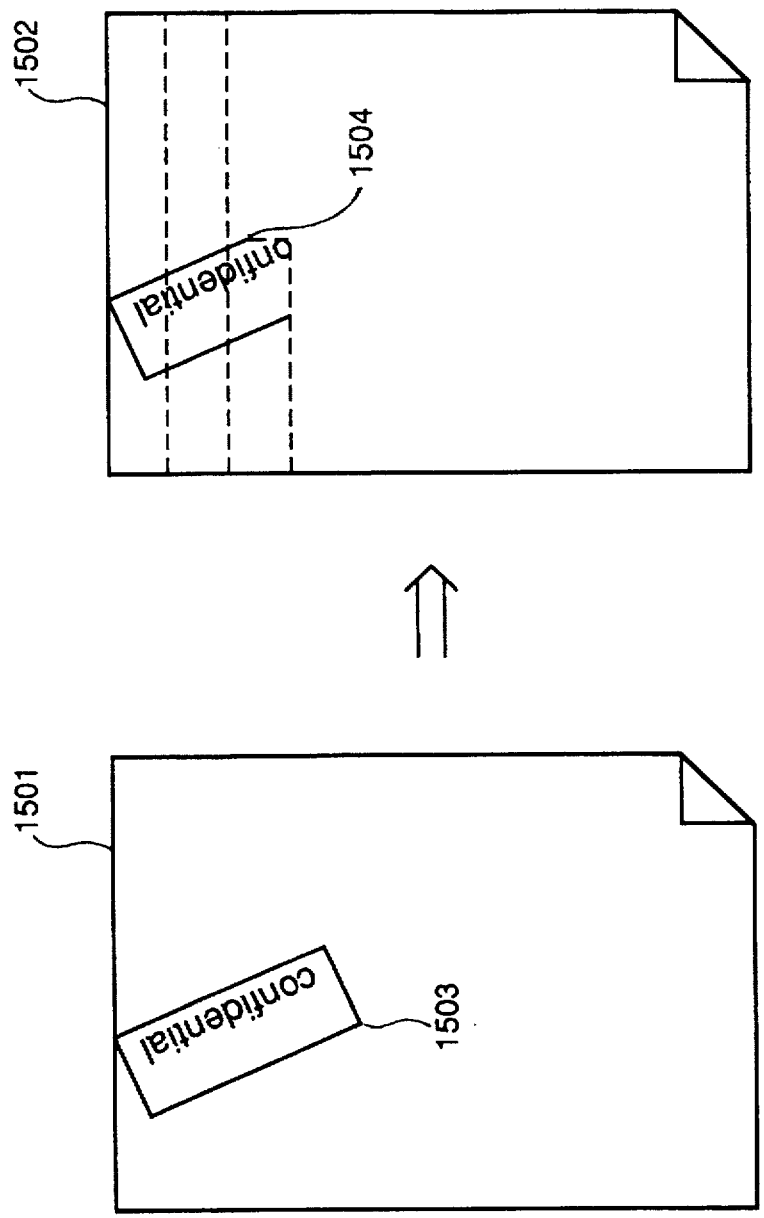
FIG. 25 is a diagram of an example of the processing result according to the third embodiment.
Figure 26:
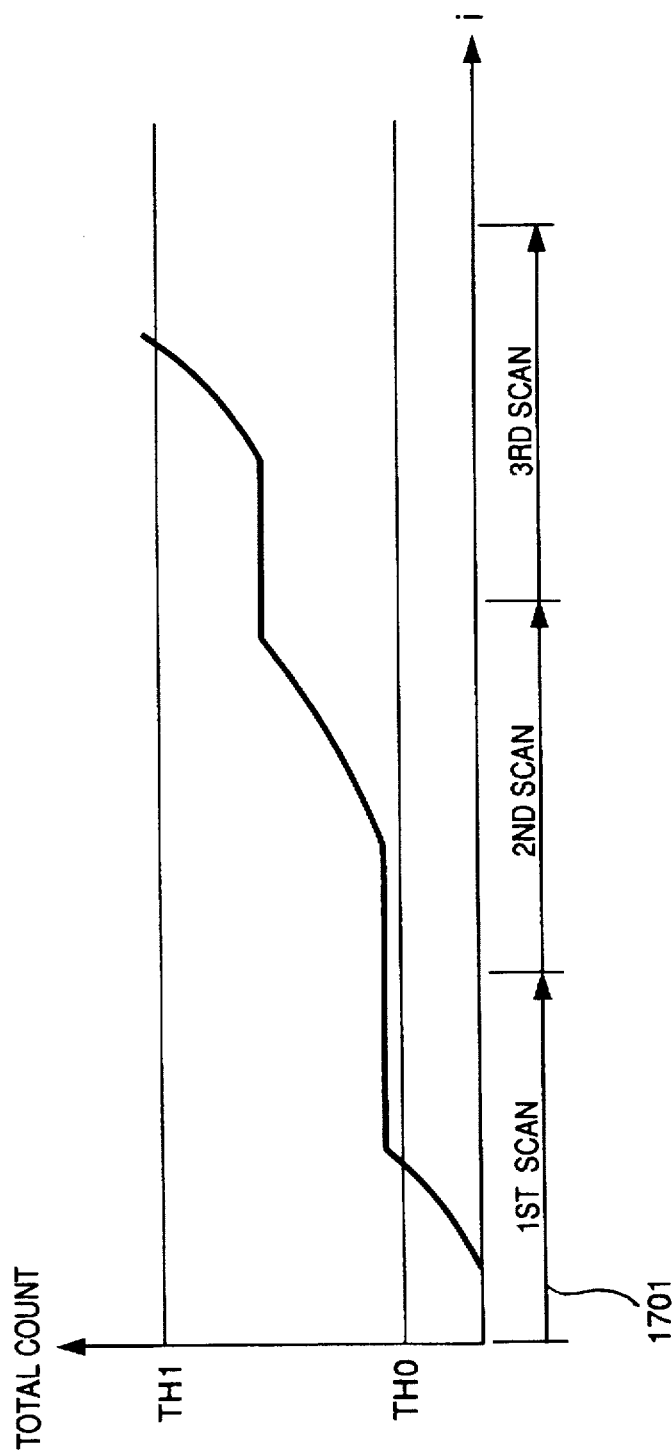
FIG. 26 is a diagram of an example of count value according to the third embodiment.
Figure 27:
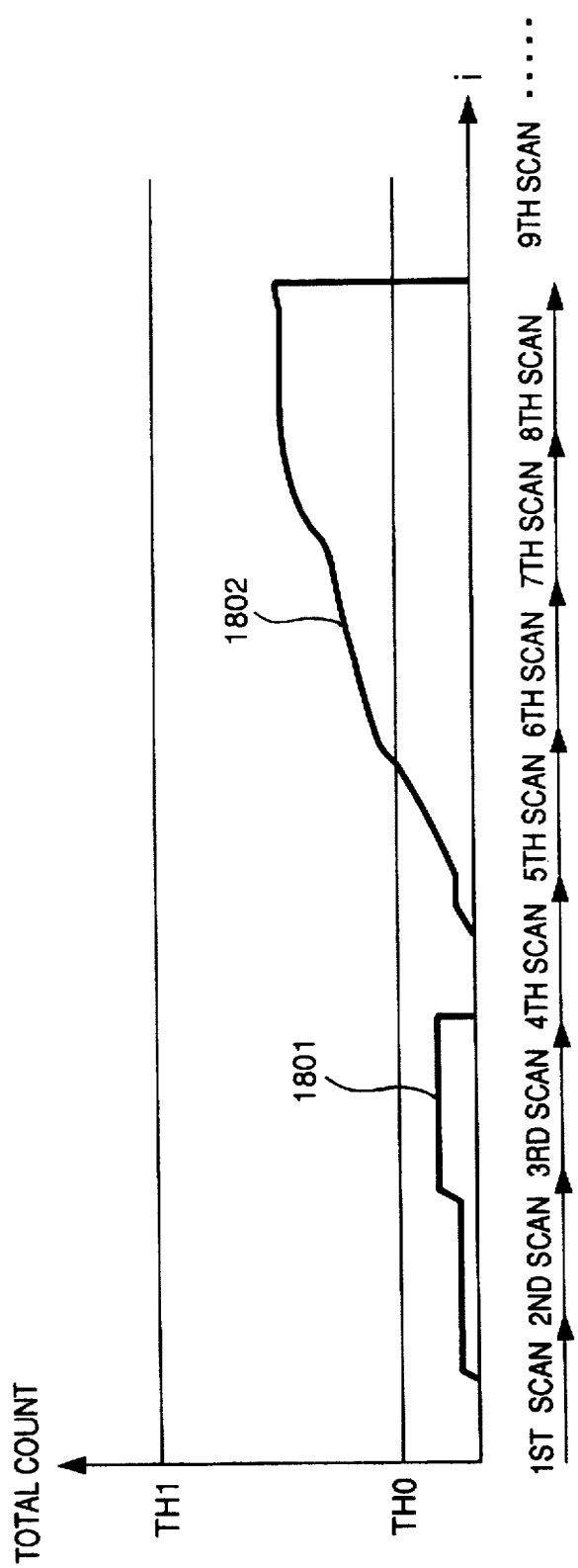
FIG. 27 is a diagram of another example of count value according to the third embodiment.
Figure 28:
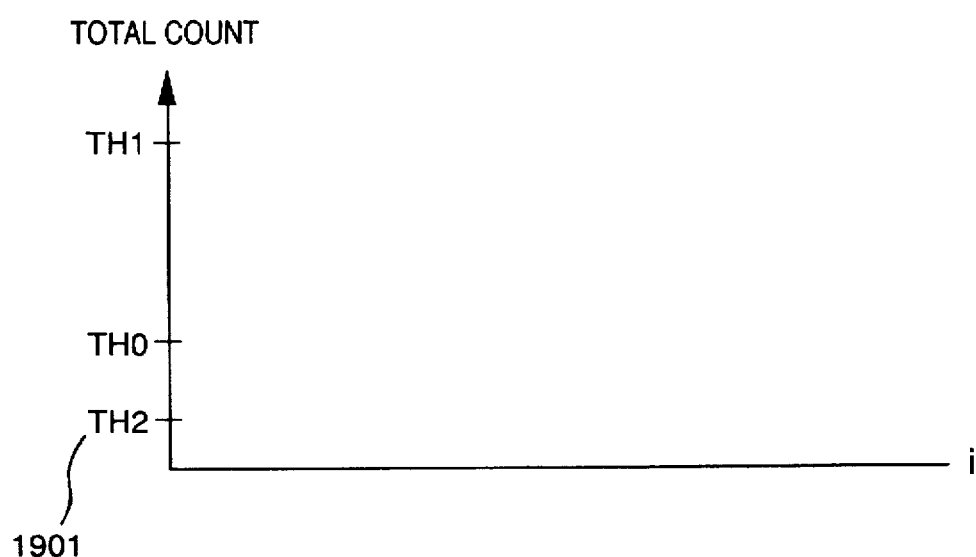
FIG. 28 is a diagram for explaining the relationship between scanning and a threshold according to a modified example of the third embodiment.

In FIGS. 26 and 27, the vertical axis represents a sum of the count and the horizontal axis represents a scanning operation each scanning. FIG. 25 illustrates the example of detection of the specific original which is included in the original document.

In FIG. 25, numeral 1501 is an original document and the specific original 1503 is included in the original document. Numeral 1502 is the output result when the original document 1501 is outputted. In the portion which corresponds to the specific original 1503, is shown that the original document includes the specific original is detected at the third scanning line indicated by numeral 1504. The amount of the image which has been copied until that detection of the specific original differs according to a type of the original document and the way to place the original document on the original glass table. However, it is assumed that the specific original is detected in the third scanning line. In the case where several scanning lines are printed until the specific original is detected at last, when a key to suspend duplication or a reset key is operated after the specific original has been printed for some amount, a part of the specific original is duplicated. Accordingly, if the specific original is shifted little by little and copied for plural times, and the outputs are pasted together, a complete duplication can be obtained.

In this embodiment, in order to prevent the above problem, a first threshold TH0 and a second threshold TH1 are provided to the count of the binarization result. FIGS. 26 and 27 are the diagrams illustrating the change of the count values of the binarization result. In FIGS. 26 and 27, the threshold values TH0 and TH1 are indicted for thresholds for discriminating the specific original. "TH1" is a threshold value for discriminating the specific original in an original document. When a sum of the count is larger than TH1, the copying operation is interrupted and an invalidation processing is performed on the printout which has been already outputted. On the other hand, "TH0" is a threshold value indicating the state where there is a strong possibility that the original document includes a specific original, although it is not confirmed yet.

In this embodiment, when the sum of the count is larger than TH0 during the scanning operation of the original document, the copying operation is not interrupted at that point, however, the key input from the stop key of the operation unit 10 shown in FIG. 1 is invalidated and the scanning operation of original document is automatically performed until it is confirmed that the original includes a specific original. In the image discrimination unit, the above processing is continued for the scanning operation until it is confirmed that the original includes a specific original.

In the embodiment, since the discrimination is completely performed in the three scanning lines of the original document such as the short side of a paper money, when the sum of counter becomes larger than the threshold value TH0, the key input for the three scanning operations is invalidated and the original document is automatically scanned. Of course, this scanning operation is not different form the normal scanning operation if the key is not operated. As a result, when the specific original is copied, it is completely detected because the sum of count becomes over the TH1 and the invalidation processing (to be described later) of the copied image is performed. On the other hand, when the original document is not the specific original, but it includes the color tone which is similar to that of the specific original, the sum of count does not become larger than TH1. Accordingly, since the key input hold is released and the normal copying operation is continued, a normal copying sequence has been ended from a point of view of a user.

FIG. 26 is a diagram illustrating the change of the count value in each scanning operation when the specific original included in the original document is placed on the original glass table. In FIG. 26, in the first scanning line shown by numeral 1701, the sum of count is over TH0, the key operation from this point is invalidated, and the scanning operation for the next three scanning lines is automatically operated. In this embodiment, the count value is over TH1 in the third scanning line, the scanning operation after this will not be performed.

FIG. 27 is a diagram, which is similar to FIG. 26, illustrating the change of the count values in the case where the specific original is not present. In the third scanning operation in numeral 1801 of FIG. 27, the image containing the color tone which is similar to the specific original is present, but the threshold does not exceed TH0. In this case, the count value is cleared when the three scanning operations have been operated. Numeral 1802 indicates the change of count in the case where the specific original is not present, but the image data which is similar to that of the specific original is considerably present. In this case, the count value in the second scanning operation (the fifth scanning) is over TH0, and the key input at this point is invalidated and the scanning operation for next three lines is automatically performed. During this period, the count value is not cleared, but accumulated. In this case also, the specific original is not present, thus, the threshold is not over TH1. After this, when the count value is cleared and the key input is invalidated, counting in every three scanning lines is restarted. The above operation is repeated until an entire image is duplicated and the similarity of the duplicated image is compared with that of the specific original.

Subsequently, the invalidation processing of the duplicated image after the image is discriminated as the specific original is described.

When the image is detected as being the specific original, the key input is hold as being invalidated. The scanning operation of original document by the scanner 1 is suspended immediately. On the other hand, The CPU of the controller 121 of the printer shown by FIG. 15 writes a pattern on the synchronous delay memory 115 in order to invalidate the specific original which has been duplicated. In the embodiment, the pattern is a lattice pattern of 4 mm×4 mm in BK. The printer prints this pattern over the recording paper to which a part of the specific original has been duplicated and the duplicated pattern is invalidated. This processing is explained with reference to FIG. 3.

The carriage 34 having the head 37 returns to the home position 44 in the state where the recording paper 38 will not be fed in the sub-scanning direction. In order to print the lattice pattern over the image, the scanning is performed to the direction A. When the scanning operation ends, the carriage 34 is returned to the direction B and the sub-scanning motor 40 is reversed so that the recording paper 38 is fed in the direction which is opposite to the normal recording. Accordingly, the recording paper 38 is fed in the direction which is opposite to the direction C. Subsequently, the above lattice pattern is printed over the duplicated image. The above operation is repeated for three scanning lines and the lattice pattern is printed over the entire duplicated image. When this processing ends, the apparatus is in a state which is equivalent to the error state incapable of returning to general states and a specific processing needs to be performed by a copying machine maintenance engineer.

The processing is performed not only in the case of copying the original document, but also printing the image of a host computer and the normal printing of the specific original cannot be performed. In this case, the processing to the command supplied through the interface such as GP-IB is invalidated. Accordingly, the effect which is similar to that of the original image can be obtained for a computer image.

As described above, according to the third embodiment, when the input image has not been detected as a specific original yet, but has the possibility of it, if the copy stop instruction is supplied from the operator or the host computer, this is not accepted immediately. The copy instruction is held until whether or not the suspected specific original is the specific original is confirmed, thus preventing the specific original from printing.

Furthermore, the matrix size and weighting coefficient of the binary-to-multivalue conversion unit 802 described in the third embodiment are not limited to this embodiment. They can be arbitrary according to characteristics of a type of the specific original and binary printer. Furthermore, a bit width of image data which is subject to the multivalue conversion is not limited to 5 bits. Still further, if the color copying machine according to the embodiment processes the data of multivalue image between the apparatuses such as a host computer, the binary-to-multivalue conversion 802 is not needed and the multivalue image is directly discriminated.

<Modification>

In the modified embodiment, a third threshold value is provided in addition to the first and second threshold values which are described in the third embodiment.

In the modified embodiment, the processing which is similar to the first embodiment is performed for the first and second threshold values. However, the third threshold value TH2 is set so as being lower than TH0 as indicated by numeral 1901.

The processing where the result of binarization is multiplied in the three scanning lines shown in the third embodiment and the product is larger than TH2, but lower than TH0 is described.

In this case, the key input is not invalidated, but if the copy suspension key or the reset key is pressed, the controller 111 of FIG. 15 change the processing to store information in a non-volatile storage with respect to the key input. Subsequently, when the count value becomes over TH2 in the three scanning lines and the stop key or the reset key is pressed, the content of the aforementioned memory is incremented. On the other hand, if neither of the keys is pressed, the memory is cleared. This processing is repeated until the count value of the memory becomes over a predetermined value, is determined that a part of the specific original is duplicated and the color copying machine becomes out of order, as the third embodiment, and the duplication cannot be performed. Accordingly, the threshold is increased and a more improved method for preventing the forgery of the specific original can be provided.

Although the third embodiment is described about an application to a bubble-jet type printer having a head of the type for discharging a liquid droplet by utilizing film boiling taken place by heat energy, however, this does not impose a limitation upon the present invention. It is applicable to a piezo type of ink-jet printer and thermal transferal printer. Furthermore, in the aforementioned embodiments, the original image is inputted by the image scanner, however, this does not impose a limitation upon the present invention. For example the present invention is applicable to an image inputted through a still-video camera, video camera or an image formed by a computer graphics.

<Fourth Embodiment>

Figure 29:
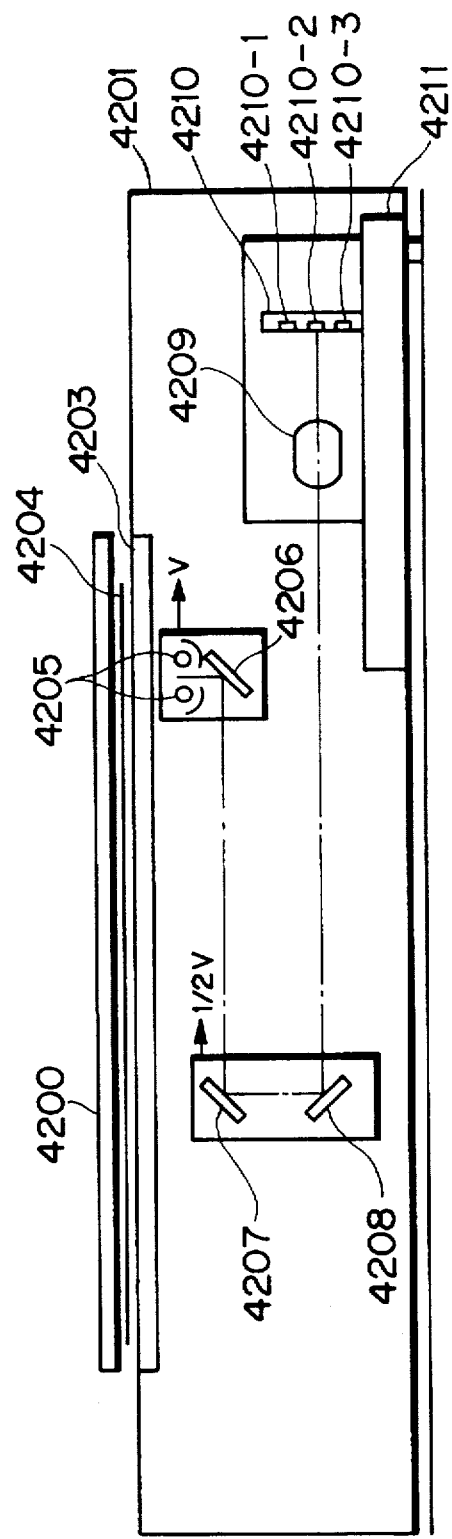
FIG. 29 is a side view showing a general internal construction of an image scanning body according to a fourth embodiment of the present invention.

FIG. 29 is a sectional side view showing the construction of an image scanner body comprising a copying machine in accordance with the fourth embodiment of the present invention. Numeral 4201 denotes an image scanner 4201 which reads an original at a resolution of 400 dpi (dots/inch) and processes a digital signal processing. The image scanner 4201 includes a pressure plate having a mirror surface 4200. An original 4204 on a glass table (hereinafter referred to as a "platen") 4203 is irradiated by means of lamps 4205, an image is formed on a three-line sensor (hereinafter referred to as a "CCD") 4210 via mirrors 4206, 4207, and 4208 and a lens 4209, and the image is sent to a signal processor 4211 as full-color information red (R), green (G) and blue (B) components. The entire original is scanned (sub scanning) by mechanically moving the carriage 4227 fixing the lamps 4205 and mirror 4206 at a velocity v as well as the mirrors 4207, 4208 at a velocity ½ v in a in a direction perpendicular to the electrical scanning direction of the line sensor (a main scanning direction).

The signal processor 4211 processes the read image signal, outputs to the outside, and compares the read image signal with a specific image signal.

[Image Scanner]

Figure 30:
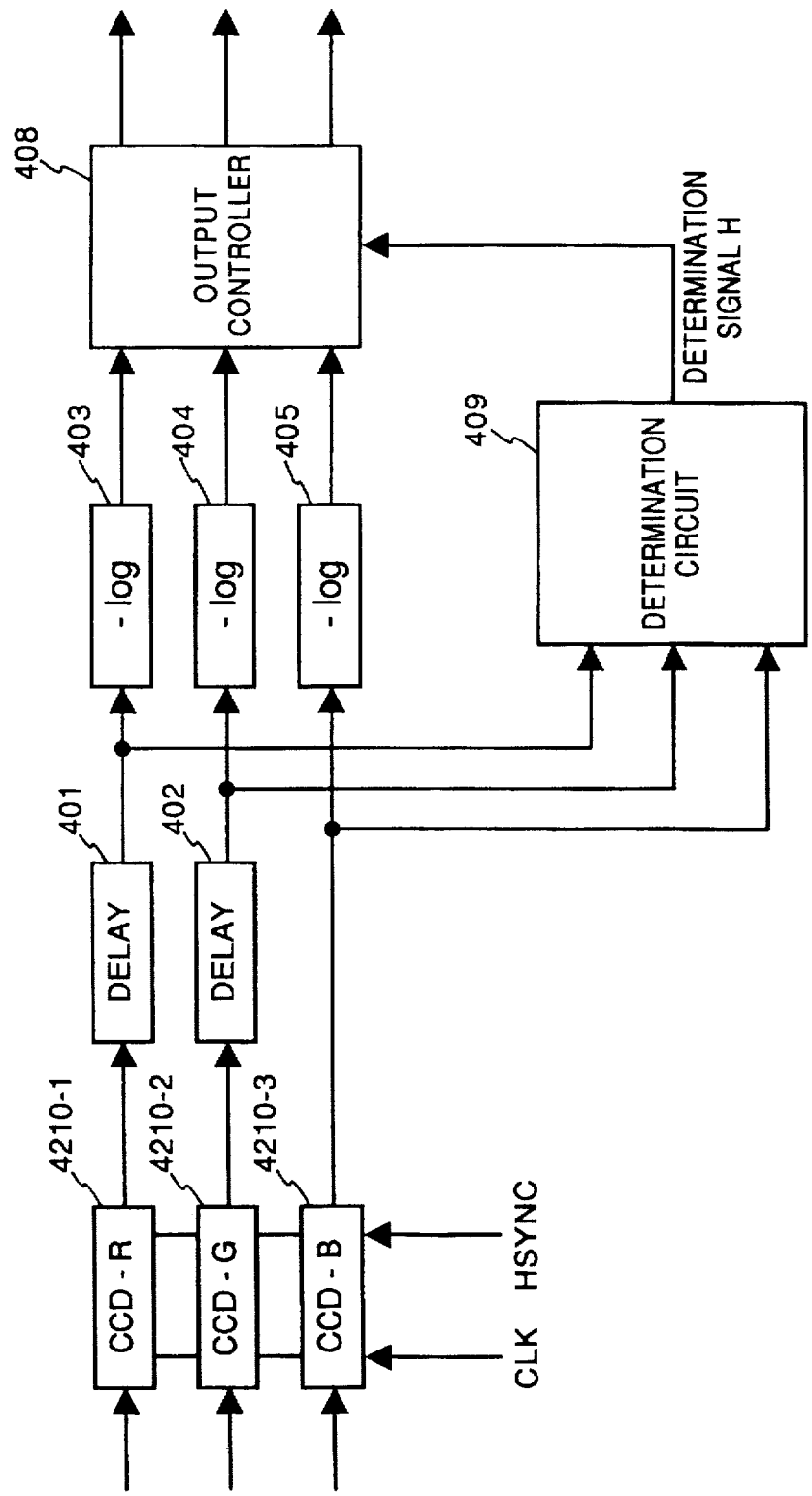
FIG. 30 is a block diagram illustrating the circuit construction of the image scanner 4201 according to the forth embodiment.

FIG. 30 is a block diagram of the construction of the image scanner 4201 according to the fourth embodiment. Numerals 4210-1, 4210-2, and 4210-3 denote CCD (charge coupled device) line sensors having spectroscopic sensitivity characteristics such as to be sensitive to red (R), green (G) and blue (B), respectively. After the A/D conversion, an 8-bit signal having a value of 0 to 255 is outputted. Numerals 401 and 402 are delay elements.

Since the CCD line sensors 4210-1, 4210-2, and 4210-3 used in the embodiment are placed at regular intervals, relative spatial deviations thereof are corrected by the delay elements 401 and 402.

Numeral 403, 404, and 405 denote logarithmic converters (log converters) comprising look-up table ROMs or RAMs which convert a luminance signal into a density signal.

Numeral 409 denotes a determination circuit which determines a specific original. The determination circuit 409 determines a possibility that the original placed on the original table is at least one of plurality of specific originals and outputs a determination signal H in two bits. If there is a strong possibility that the original is one of the specific originals, H="3" is outputted. On the other hand, if the possibility is rare, H="0" is outputted. The possibility that the original is one of the specific originals is graded from "0" to "3" as the degree of the possibility increases.

Numeral 408 is an output controller which outputs RGB signals to the outside of the apparatus in accordance with the determination signal H from the determination circuit 409.

[Determination Circuit]

Figure 31:
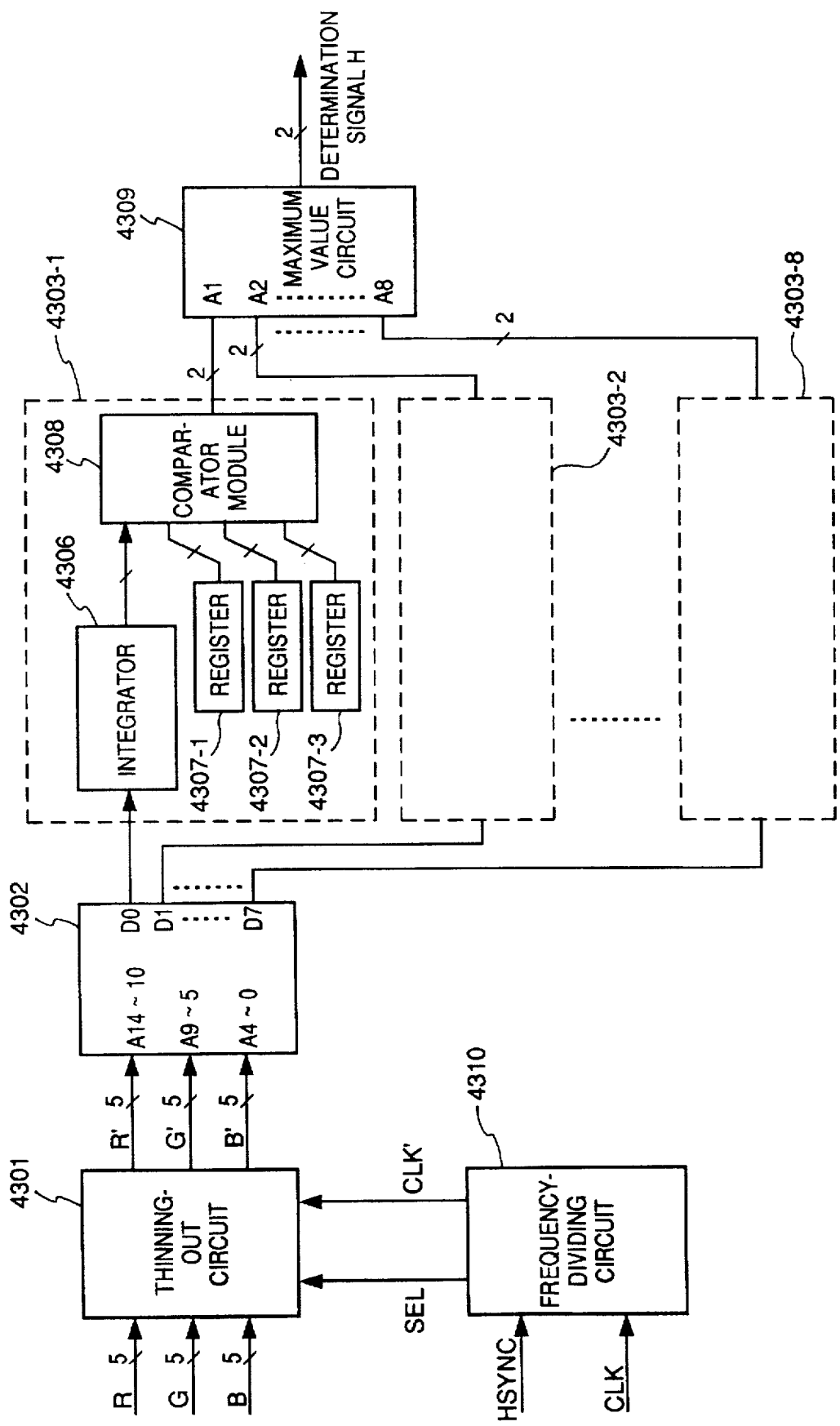
FIG. 31 is a block diagram illustrating the construction of a determination circuit 409 according to the fourth embodiment.

FIG. 31 is a block diagram of the construction of the determination circuit 409 in accordance with the fourth embodiment. The thinning-out circuit 4301 shown in FIG. 32 thins out data to reduce the load on the processing circuit of the determination circuit 409. Numeral 4302 denotes a color-matching look-up table ROM (hereinafter referred to as a "LUT") which performs the color matching on the plurality of specific originals (securities, bank notes, confidential documents, etc.) and inputted data. The LUT 4302 investigates color distribution with regard to 8 specific originals in advance and holds the results of judgment whether the color of a pertinent pixel coincides with a color of the specific original.

In the LUT 4302, five higher order bits of the thinned-out image signal of each of the colors R, G, B are inputted to the 15 lower order address bits. Whether or not the color tone of the pertinent pixel coincides with the color tone of the 8 types of specific originals is simultaneously outputted in correspondence with the 8-bit data. Accordingly, determination is made with respect to the 8 specific originals by one cycle of read scanning.

Numerals 4303-1, 4303-2, . . . , 4303-8 denote a color tone determination circuit constituted of the same hardware. Each circuit comprises an integrator 4306, registers 4307-1, 4307-2, 4307-3 and a comparator module 4308, determines the possibility of the existence of a specific original in the read originals, and outputs a 2-bit determination result. Numeral 4309 denotes a maximum value circuit which outputs a maximum value among the determination results outputted from the color tone determination circuits 4303-1, 4303-2, . . . , 4303-8. That is, the determination result corresponding to one of the 8 specific originals which is the most probable to exist is outputted.

Figure 32:
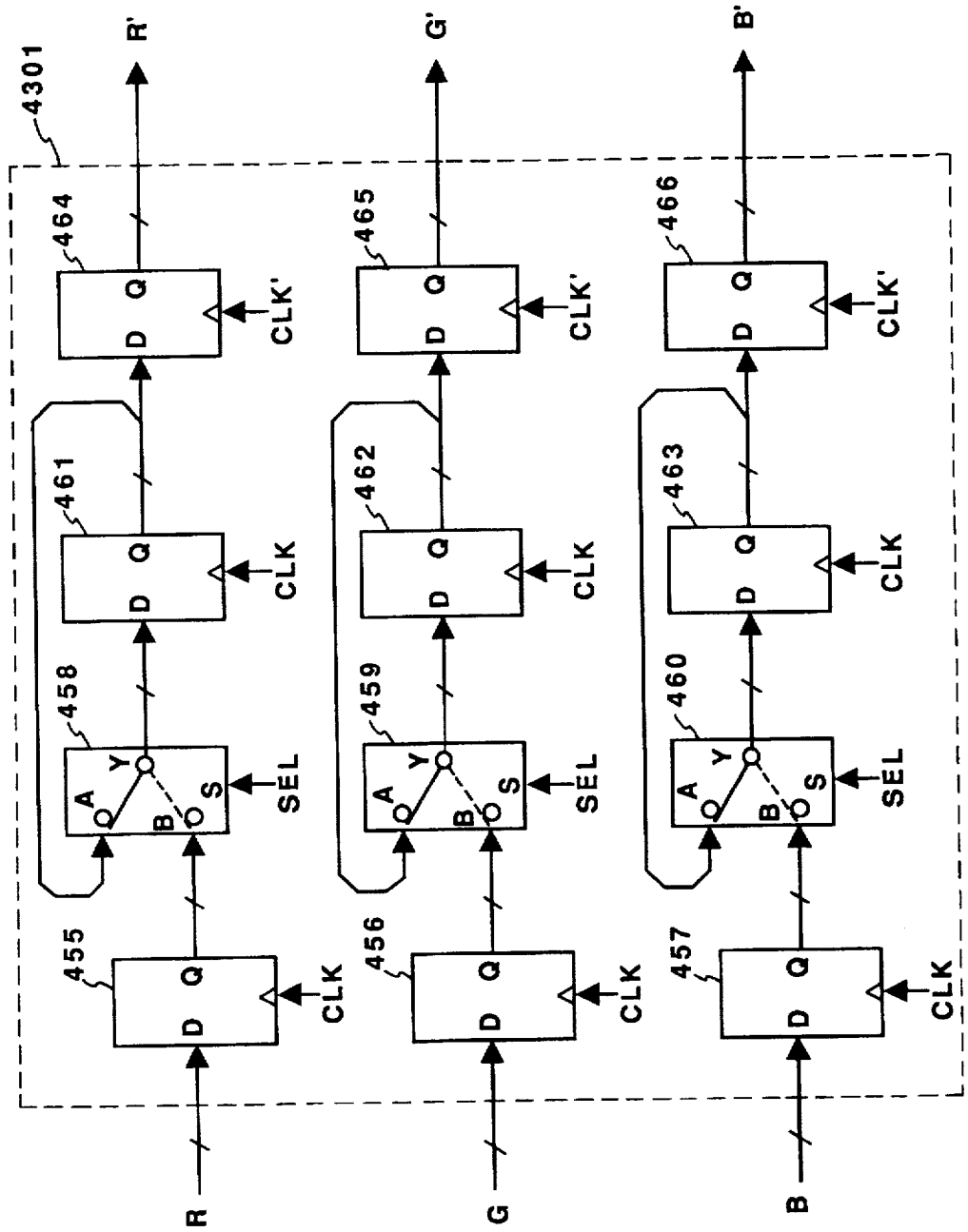
FIG. 32 is a diagram illustrating the construction of a thinning circuit according to the fourth embodiment.
Figure 33:
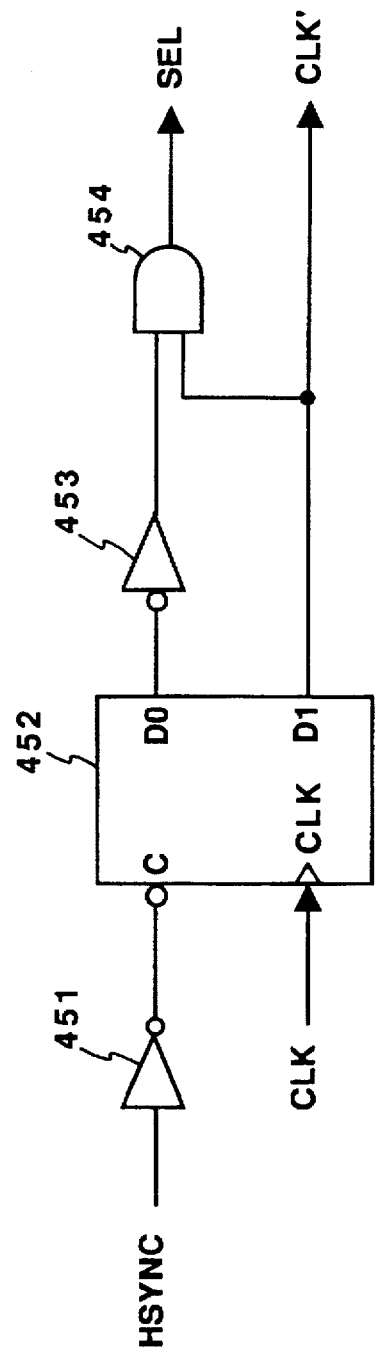
FIG. 33 is a diagram illustrating the construction of a frequency-dividing circuit according to the fourth embodiment.
Figure 34:
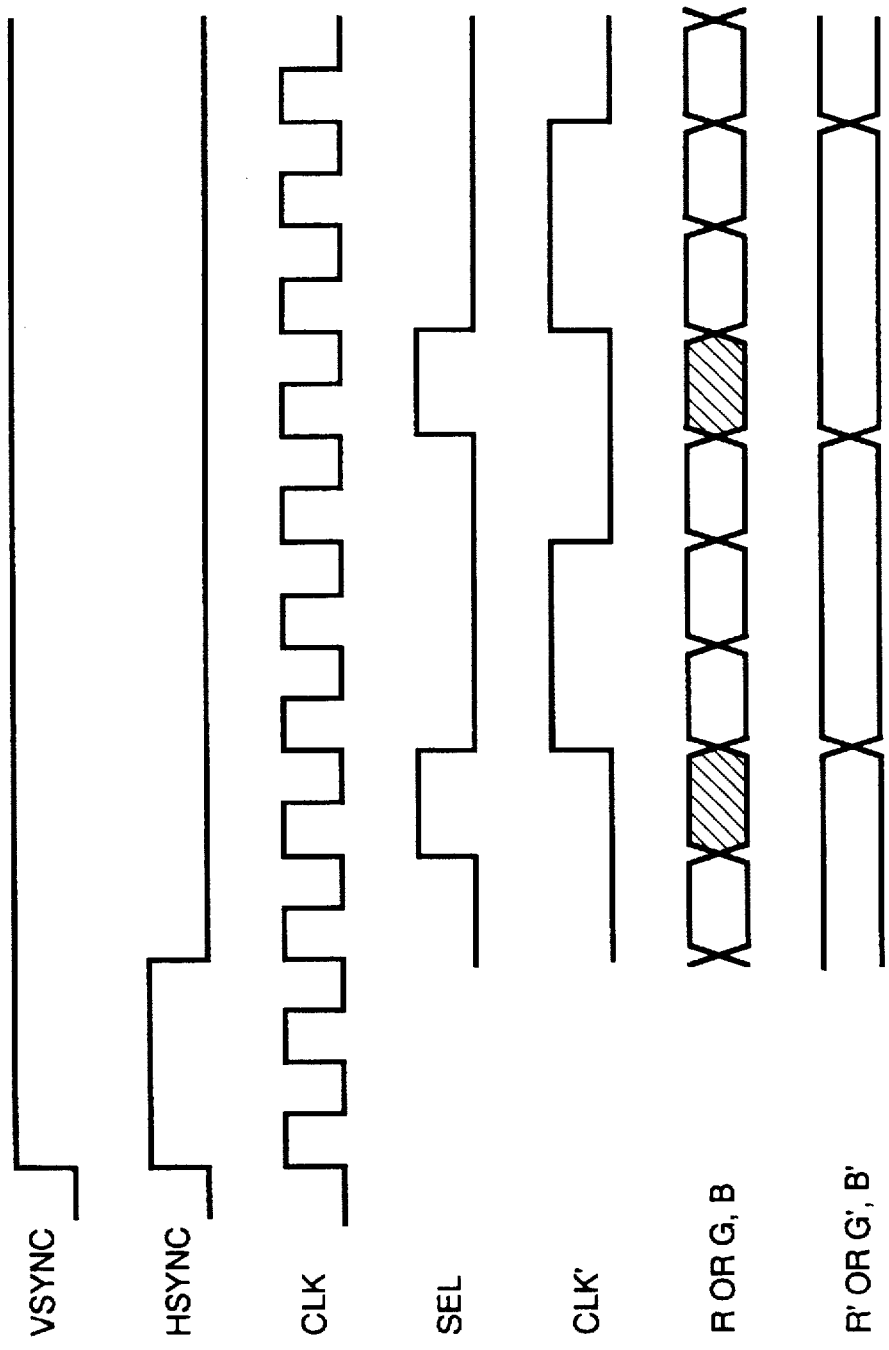
FIG. 34 is a timing chart of the main scanning direction in the fourth embodiment.

FIG. 32 is a diagram of the construction of thinning-out circuit 4301 in accordance with the fourth embodiment and FIG. 33 is a diagram of the construction of the frequency dividing circuit 4310 in accordance with the fourth embodiment. FIG. 34 is a timing chart of various signals with respect to the main scanning direction in accordance with the fourth embodiment.

In FIG. 34, a signal VSYNC is a sub scanning interval signal which indicates an image output interval of sub scanning. A signal HSYNC is a main scanning synchronizing signal for synchronizing the start of the main scanning. CLK denotes an image transfer clock which is a master clock for various image processings in the embodiment.

On the other hand, CLK' denotes a clock which is obtained by dividing the frequency of the CLK by 4 to be used as a master clock for the determination circuit 409. A signal SEL is a timing signal for use in the thinning-out circuit 4301 (refer to FIG. 32). The clock CLK' and signal SEL are generated by the frequency dividing circuit 4310 shown in FIG. 33.

In FIG. 33, in the frequency-dividing circuit 4310 is comprised of the inverter 451, the 2-bit counter 452, the inverter 453, and the AND gate 454. The 2-bit counter 452 is cleared (initialized) by the signal HSYNC which is the main scanning synchronizing signal, counts the CLK thereafter, and outputs the count value in two bit (D0, D1). The upper bit D1 of these count values is outputted as CLK', and a logical product of an inverted signal of the lower bit D0 and the upper bit D1 is outputted as a signal SEL.

Figure 35:
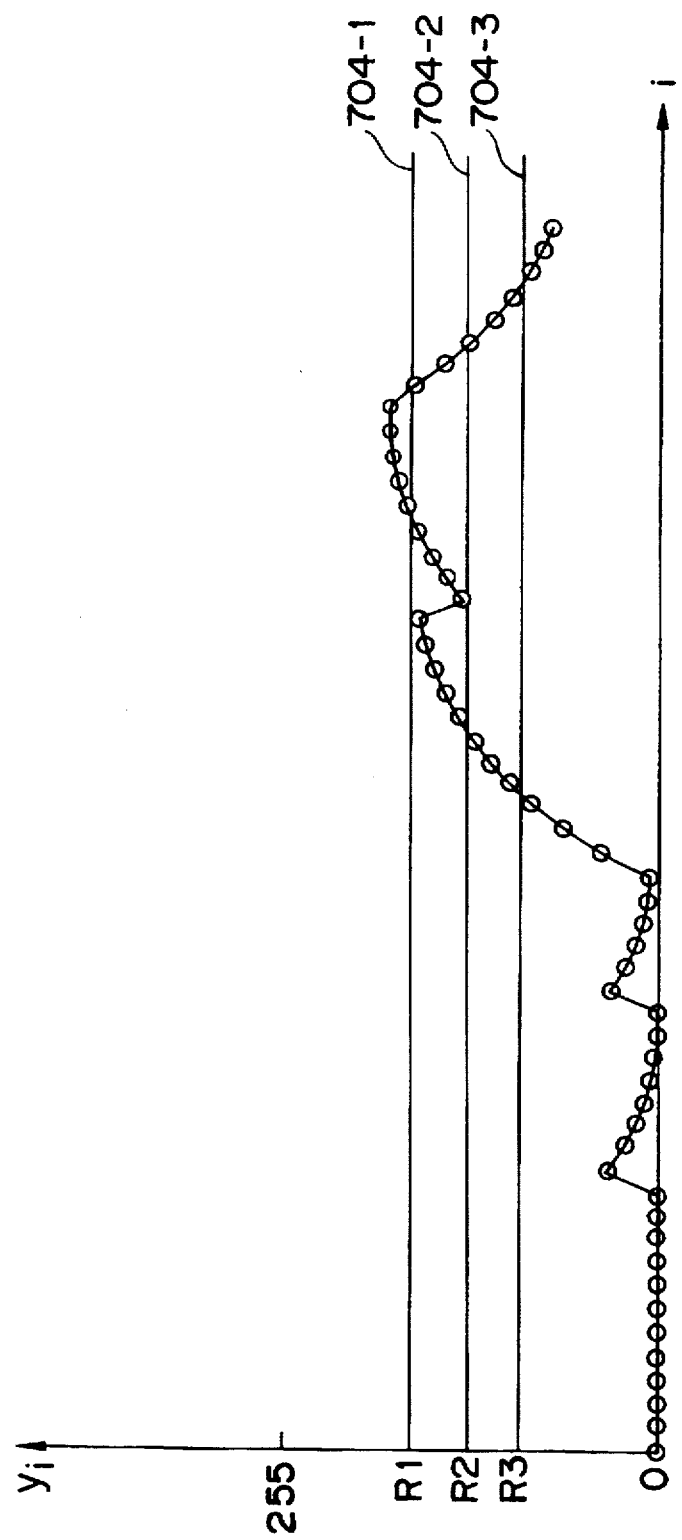
FIG. 35 is a diagram illustrating input/output of the integrator 4306 according to the fourth embodiment.

Furthermore, the thinning-out circuit 4301 is comprised of flip flops 455, 456, 467, 461, 462, 463 which hold the data in CLK, selectors 458, 459, 460 which perform switching in the signal SEL, and flop flops 464, 465, 460, which hold the data in CLK'. Consequently, in the thinning-out circuit 4301, the signal R (G, or B) transferred at CLK is thinned out at a rate of ¼ and is synchronized with CLK' to obtain a signal R' (G', or B') as shown in FIG. 35.

[Integrator]

The construction of the integrator 4306 according to the fourth embodiment is similar to that of the integrator according to the third embodiment shown in FIG. 22. The same signal according to the third embodiment is inputted to the integrator 4306 and the signal shown in FIG. 35 is outputted from the integrator 4306. The input signal is processed by the integrator 4306 and an appropriate threshold value such as values 4704-1 (R1), 4704-2 (R2), and 4704-3 (R3) in the registers 4307 shown in FIG. 35 is set, and the output yi of the integrator 4306 is binarized based upon this threshold value, thereby making it possible to eliminate the noise.

[Comparator Module]

Figure 36:
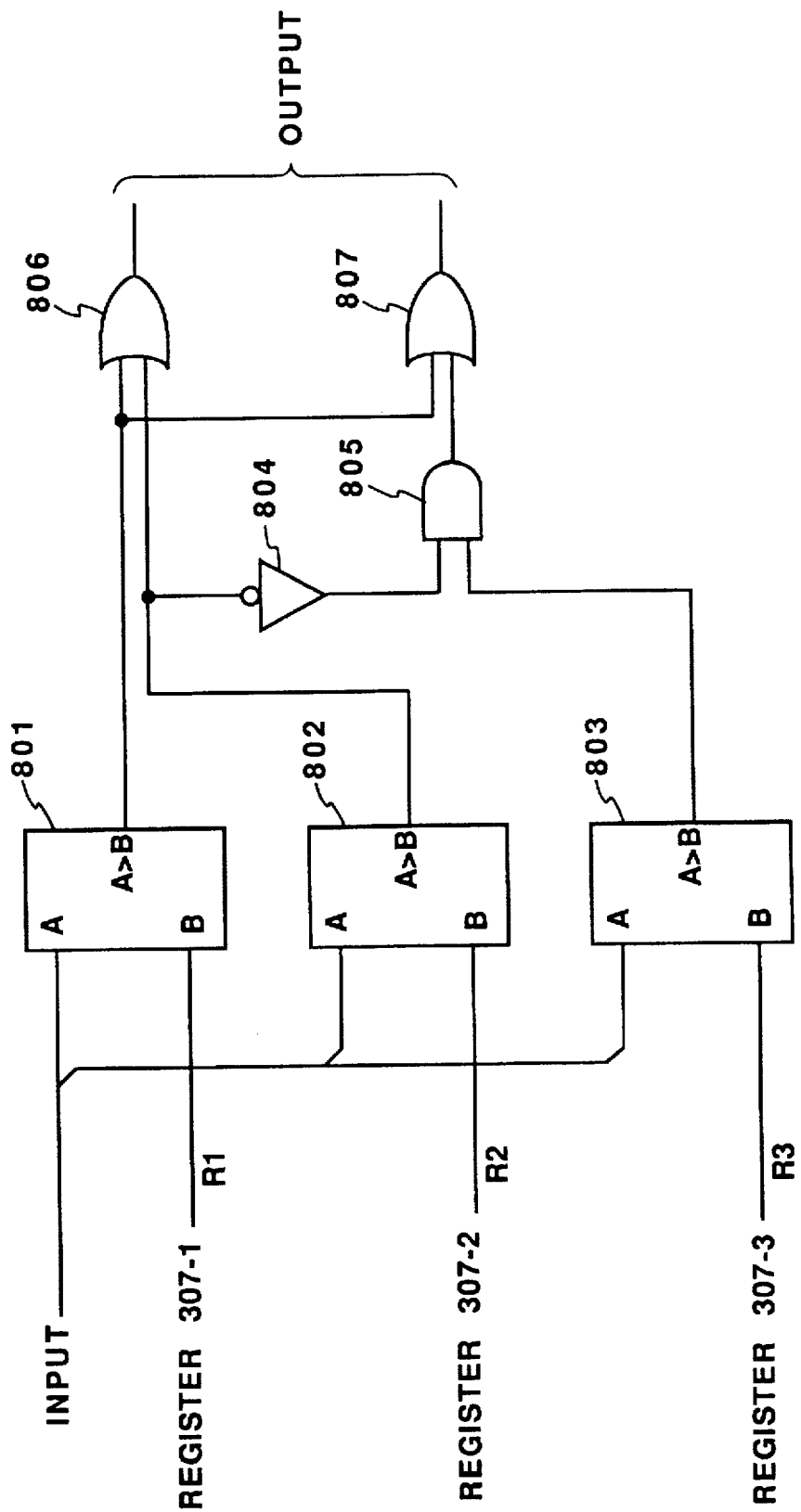
FIG. 36 is a block diagram illustrating the construction of a comparator module 4308 according to the fourth embodiment.

FIG. 36 is a block diagram of the construction of the comparator module 4308 according to the fourth embodiment. In FIG. 36, numerals 801, 802, and 803 denote comparators, numeral 804 denotes an inverter, numeral 805 denotes an AND gate, and numerals 806 and 807 denote OR gates. Threshold values R1, R2, and R3 mentioned are previously set in the registers 4307-1, 4307-2, and 4307-3, respectively. The relation such as R1>R2>R3 is established.

Accordingly, the determination result is quantized into two bits and outputted. That is:

OUTPUT=11 (binary) is outputted if R1<(input),

OUTPUT=10 (binary) is outputted if R2<(input)≦R1,

OUTPUT=01 (binary) is outputted if R3<(input)≦R2, and

OUTPUT=00 (binary) is outputted if (input)≦R3.

[Output Control]

Figure 37:
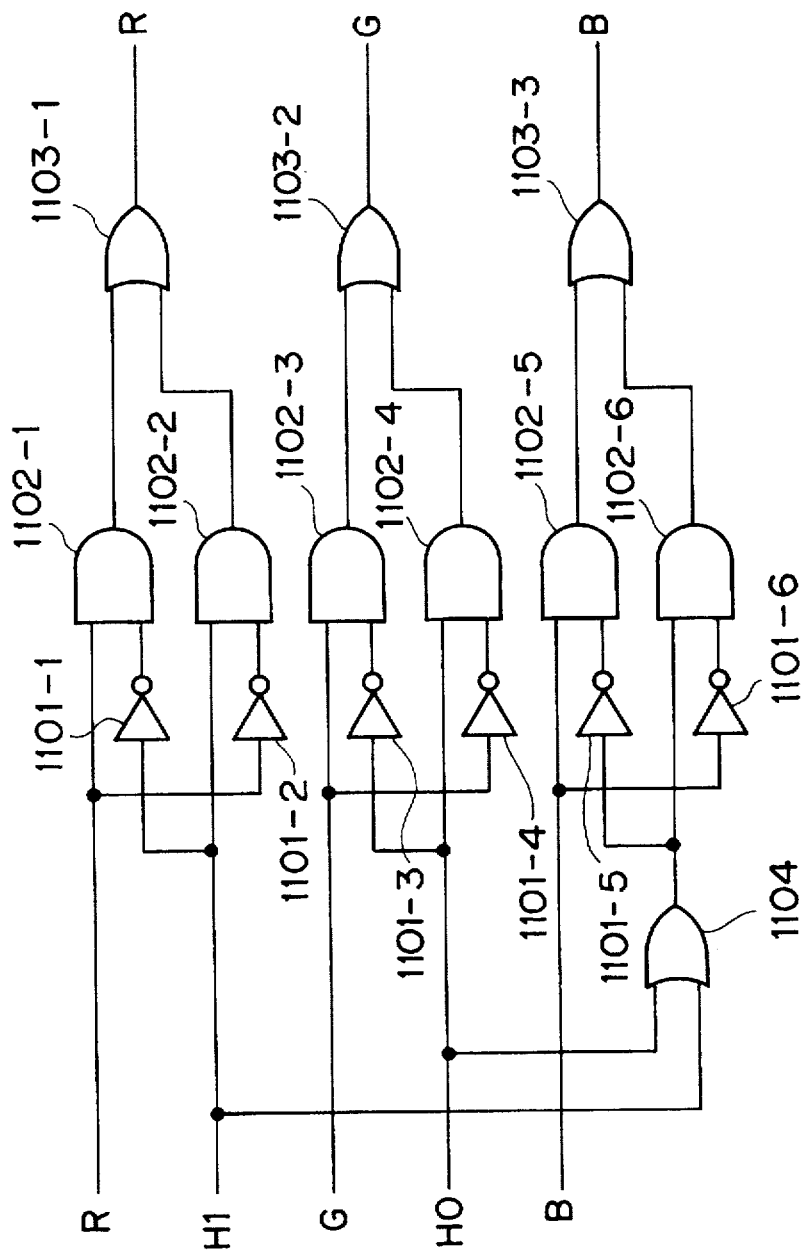
FIG. 37 is a block diagram illustrating the construction of an output controller 408 according to the fourth embodiment.

FIG. 37 is a block diagram illustrating the construction of the output controller 408 according to the fourth embodiment. In the figure, numerals 1101-1~1106-6 are inverters, numerals 1102-1~1102-6 are AND gates, numerals 1103-1~1103-3 and 1104 are OR gates.

With the above construction, the output controller 408 controls signals RGB outputted based on the 8-bit RGB signals from the log converter 403–405 and the 2-bit determination signal H from the determination circuit 409.

In the embodiment, when the determination signal H is "0", the signals RGB are outputted as is. When the determination signal H is "1", the logical states of the signal G and signal B are inverted. When the determination signal H is "2", the logical states of the signal R and the signal B are inverted. When the determination signal H is "3", the logical states of the signals RGB are all inverted and outputted, respectively.

As described above, according to the fourth embodiment, in the image processing apparatus which outputs a full-color image signal in a single scanning operation, the read signal is compared with the specific original signal during the original scanning operation. Subsequently, the following processing is controlled according to the result, thus, preventing duplication of the specific original and further misuse of the duplication.

(Modification 1)

In the fourth embodiment, the RGB signals (image signal) are outputted before the first determination (determination of the specific original). However, it can arranged such that the RGB signals are outputted after the first determination by the function which stores the RGB signals required for determination.

Figure 38:
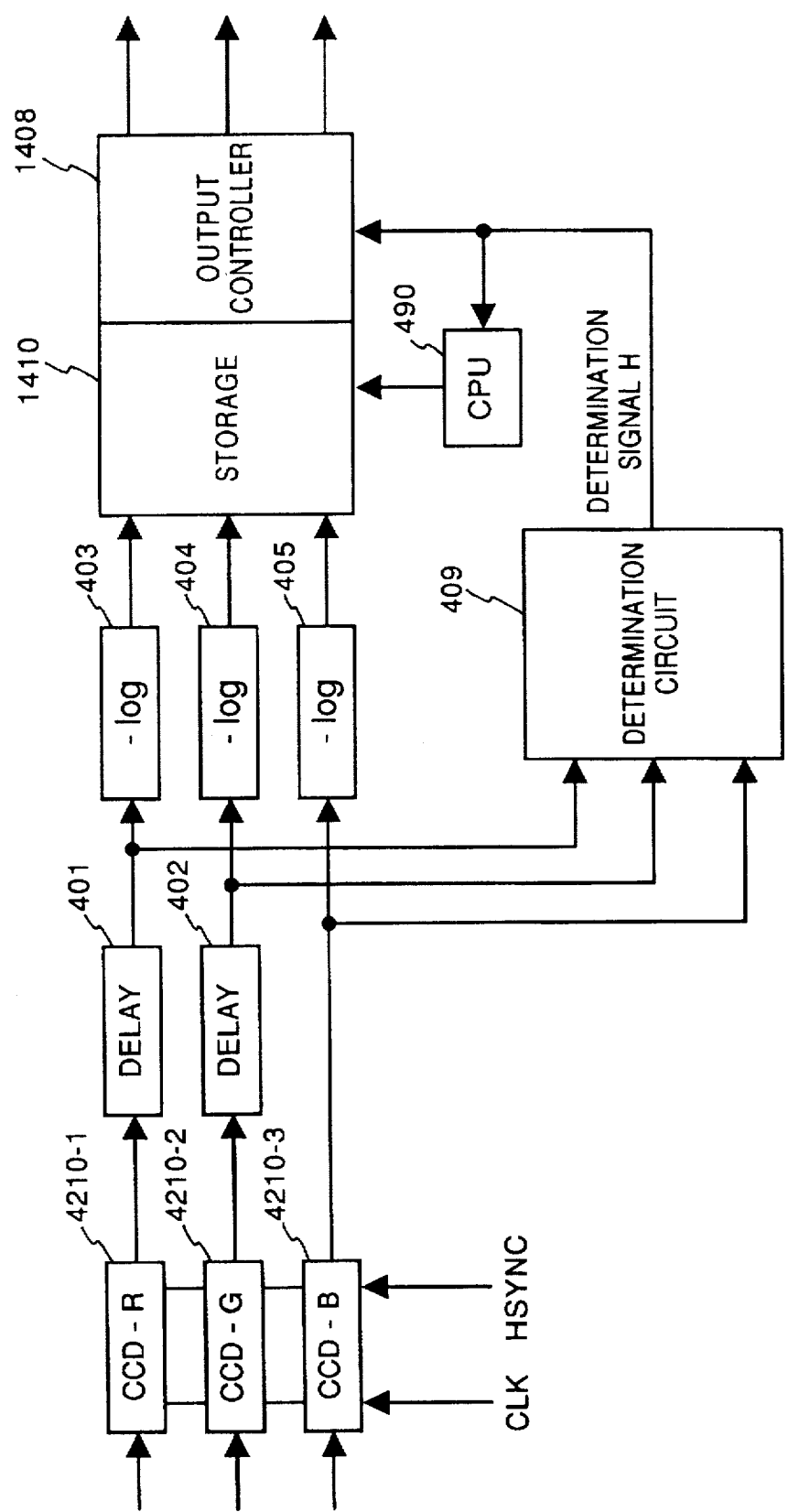
FIG. 38 is a block diagram illustrating the construction of the image scanner according to the modification 1 of the fourth embodiment.

FIG. 38 is a block diagram illustrating the construction of the scanner according to the modification 1 of the fourth embodiment. The circuits which are identical to those of FIG. 30 described in the fourth embodiment have the same reference numerals respectively and the description is omitted. In FIG. 38, numeral 1410 is a storage which stores the 8-bit RGB signals from the log converters 403–405, and numeral 1408 is an output controller having the similar construction to the output controller 408 shown in FIG. 37. The output controller 1408 controls the RGB signals based on the RGB signals stored in the storage 1410 and the 2-bit determination signal H from the determination circuit 409.

The RGB signals which are subject to the log conversion are sequentially set in the memory of the storage 1410. When the CPU 490 receives the determination signal, data is transferred to the output controller 1408. The storage 1410 serves as a dual port RAM.

In this modified embodiment, when the determination signal H is "0", the RGB signals are outputted as it is. When the signal H is "1", the logical states of the G signal and B signal are reversed. When it is "2", the logical states of the R signal and B signal are reversed. When it is "3", the logical states of the R signal and B signal are reversed.

(Modification 2)

In the fourth embodiment and the modification 1, the logical states of the output image signal is reversed in accordance with the determination signal H. However, the output RGB signals are unchanged and the comparison result, that is, a signal indicating the determination result can be outputted as a control signal. The determination signal H is a 2-bit signal indicating the similarity between the original document and the specific original and outputted from the comparator module, as shown in FIG. 36.

Figure 39:
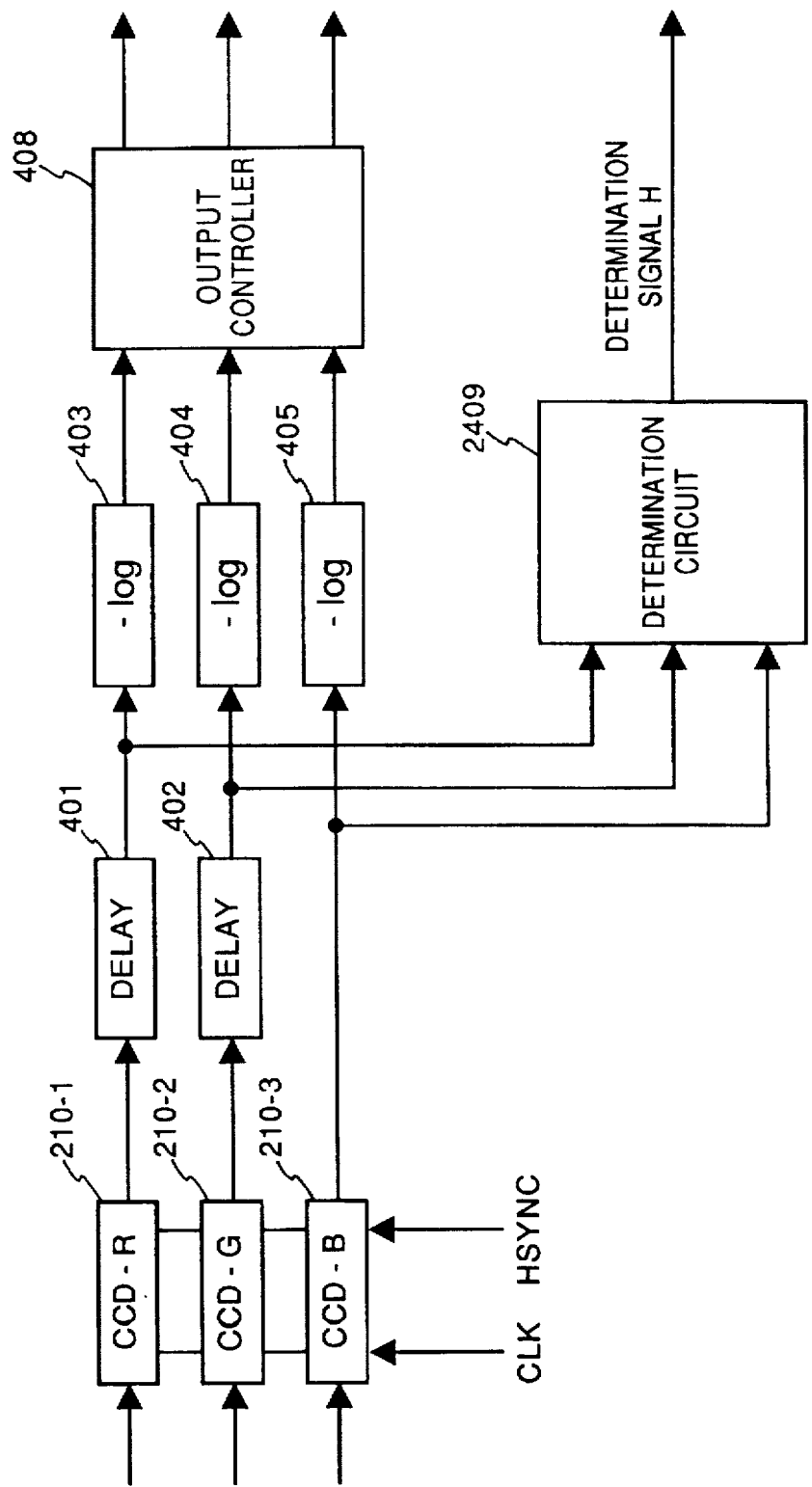
FIG. 39 is a block diagram illustrating the construction of the image scanner according to the modification 2 of the fourth embodiment.

FIG. 39 is a block diagram illustrating the construction of the image scanner according to the modification 2. The circuits which are identical to those of FIG. 30 have the same reference numerals and the description is omitted.

The image scanner according to the modified embodiment, as shown in FIG. 39, outputs the determination signal H outputted from the determination circuit 2409 as it is. Accordingly, the RGB signals outputted from the output controller 408 without effect of the determination result.

(Modification 3)

In the forth embodiment and the modifications 1 and 2, whenever an image is outputted, determination is performed on each image. However, when the image processing is performed on an original document for a plurality of times or there is no change in the original document, the output of the RGB signal can be controlled in accordance with the first determination result.

Figure 40:
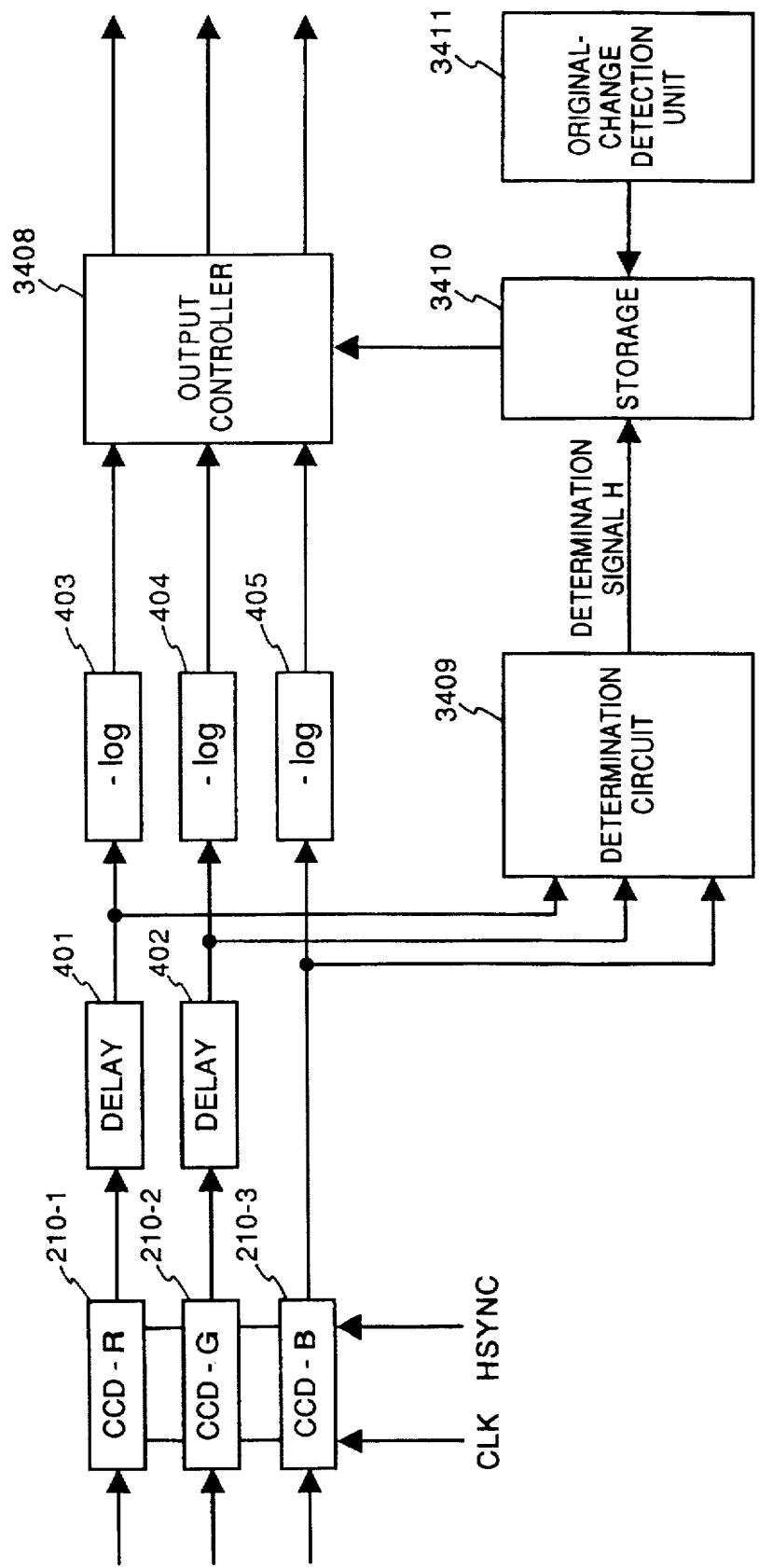
FIG. 40 is a block diagram illustrating the construction of the image scanner according to the modification 3 of the fourth embodiment.

FIG. 40 is a block diagram illustrating the construction of the image scanner according to the modification 3. The circuits which are identical to those of FIG. 30 have the same reference numerals and the description is omitted. Numeral 3408 is an output controller, numeral 3409 is a determination circuit, numeral 3410 is a storage, and numeral 3411 is an original change detection unit.

The storage 3410 stores the determination result (determination signal H) according to the previous scanning which is received from the determination circuit 3409. The original change detection unit 3411 detects whether or not the original has been changed. If it has not changed, the output is controlled in accordance with the previous determination result.

(Modification 4)

In this modified embodiment, the image signal is not changed in accordance with the determination result in the determination circuit. Instead of it, a control signal such as a clock which is necessary for transferring the image signal is changed, and thus, making it possible that a designation station cannot receive the RGB signals (image signal). In this embodiment, a video enable signal is changed as a control signal.

Figure 41:
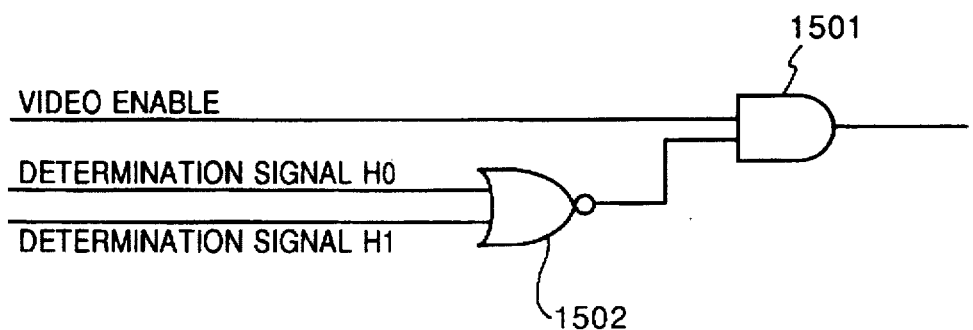
FIG. 41 is a diagram illustrating the construction of the control signal forming circuit according to the modification 4 of the fourth embodiment.

FIG. 41 is a diagram illustrating the construction of a control signal forming circuit according to the fourth embodiment. In the figure, numeral 1501 is an AND gate and numeral 1502 is a NOR gate.

The control signal forming circuit shown in FIG. 41 is provided with the following stage of the determinate circuit 2409 in the circuit construction of FIG. 39 and a desired function can be realized.

(Modification 5)

In the embodiment, it can be arranged to invalidate the specific original image which has already been outputted by including reception/transmission of the determination signal H indicating the result of comparison between the output RGB signal (image signal) and specific image signal to the protocol which transfers the image signal.

Figure 42:
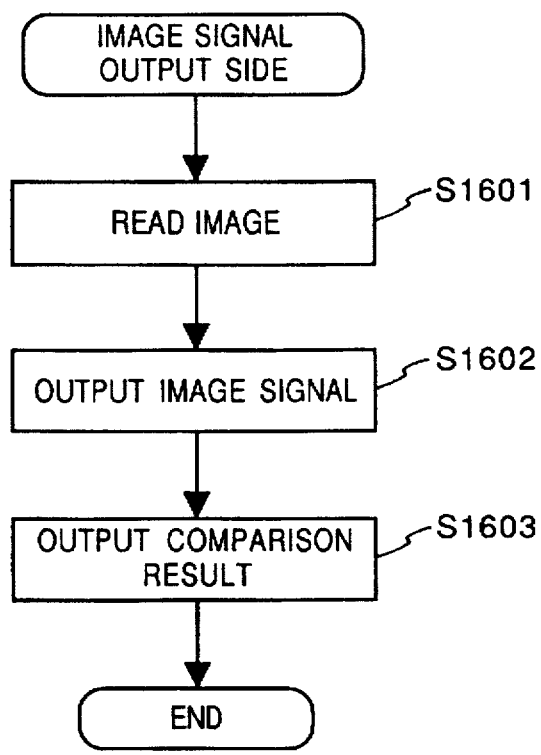
FIG. 42 is a flowchart for explaining the operation at the image signal output side according to the modification 5 of the fourth embodiment.
Figure 43:
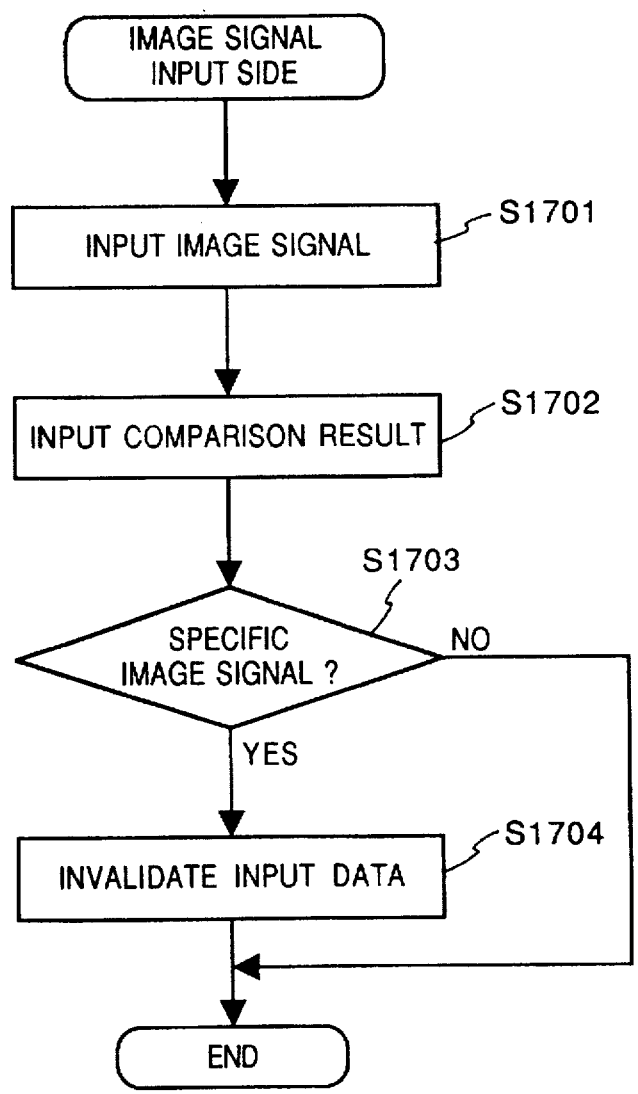
FIG. 43 is a flowchart for explaining the operation at the image signal input side according to the modification 5 of the fourth embodiment.

FIG. 42 is a flowchart for explaining the operation of an image signal output side according to the modification 5. FIG. 43 is a flowchart for explaining the operation of the image signal input side according to the embodiment.

In the output side, an image is read, the read image signal (RGB signal) is outputted (transmitted), and the comparison result of the output image signal and specific image signal is outputted (steps S1601–S1603).

On the other hand, in the input side, the image signal is inputted (received) at step S1701, the comparison result is inputted (received) at step S1702, and the existence of the specific image signal is determined at step S1703. When it is determined that the signal includes the specific image signal, the input specific image signal is invalidated at step S1704, and the duplication of the specific original can be prevented.

(Modification 6)

In the embodiment, when the comparison result shown that the read image signal is a specific image signal, the transfer protocol is suspended and the communication with the designation station is not enabled.

Figure 44:
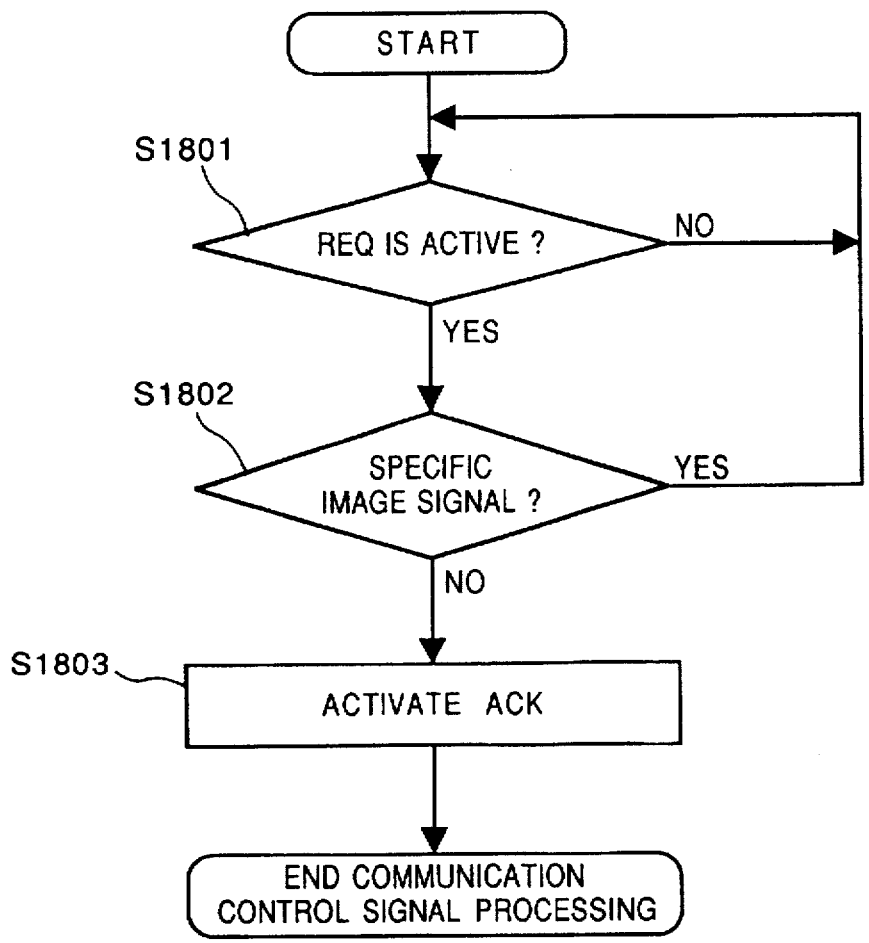
FIG. 44 is a flowchart for explaining the processing procedure of a communication control signal according to the modification 6 of the fourth embodiment.

FIG. 44 is a flowchart for explaining the processing procedure of a communication control signal according to the embodiment.

When the REQ signal is active at step S1801, whether or not the input signal is a specific image signal is determined at step S1802. If not, an ACK signal is activated and the processing is completed at step S1803. While if existed, the process returns to step S1801 and the above processing is repeated.

In the fourth embodiment and the modified embodiments, as an output apparatus of the image processing apparatus, a laser beam printer is preferable. However, this does not impose a limitation upon the present invention. For example, the present invention is applicable to ink-jet printer and thermal transfer printer, particularly, to a bubble-jet type printer having a head of the type for discharging a liquid droplet by utilizing film boiling taken place by heat energy.

Furthermore, in the fourth embodiment, the original image is inputted by the image scanner (reader), however, this does not impose a limitation upon the present invention. For example, the present invention is applicable to the image inputted through a still-video camera and video camera, or the image formed by a computer graphics.

<Fifth Embodiment>

Figure 45:
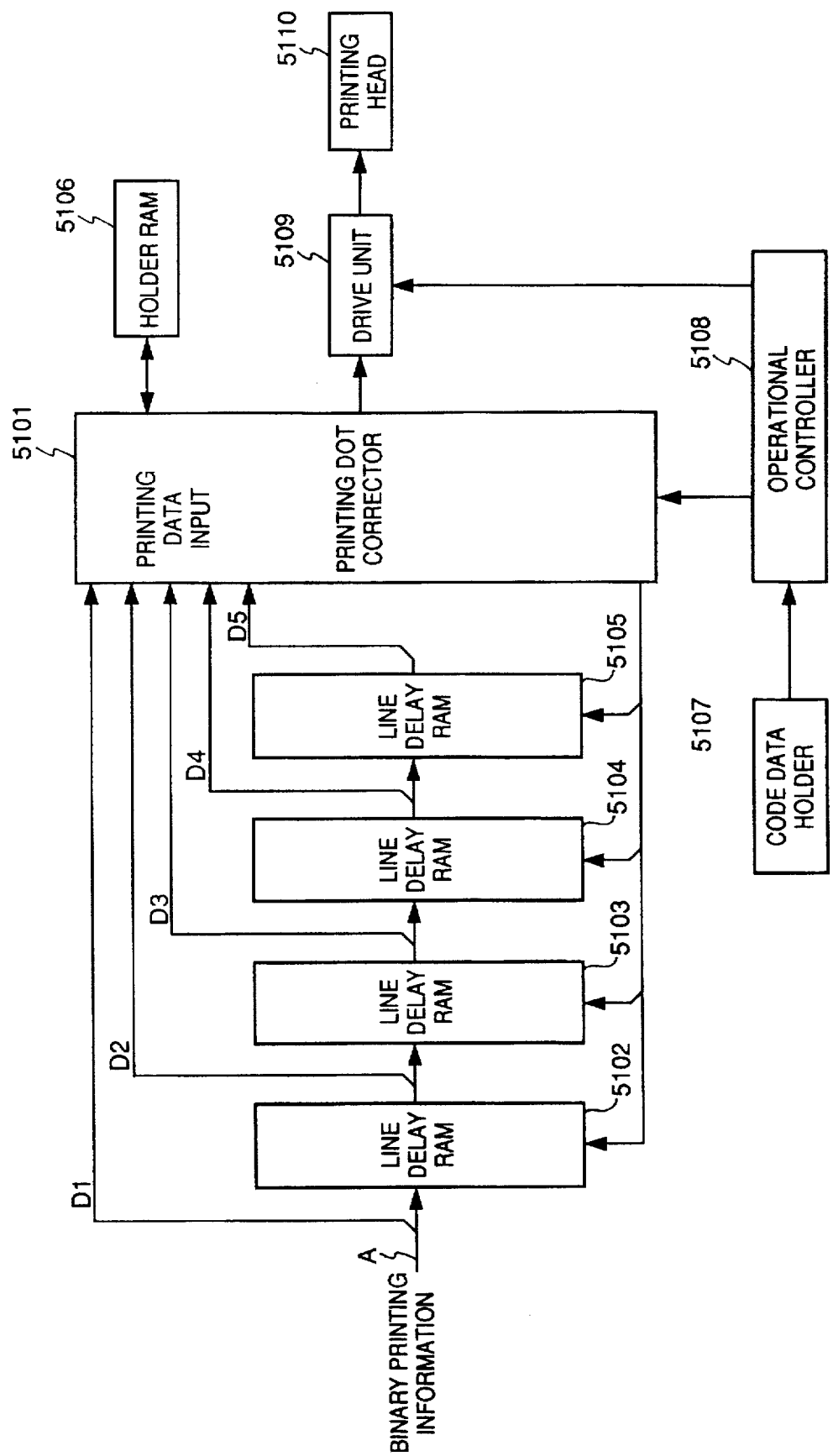
FIG. 45 is a block diagram illustrating the internal construction of the image processing apparatus according to the fifth embodiment of the present invention.

FIG. 45 is a block diagram illustrating the internal construction of the image processing apparatus according to the fifth embodiment of the present invention. The image processing apparatus inputs printing image information from a signal line A and the image signal is synchronized with the nozzles of a printing head 5110 and inputted into the drive unit 5109 in accordance with the timing shown in FIG. 46.

In FIG. 45, numerals 5102–5105 are line delay RAMs for subjecting the input image data to line delay. Assume that the image information from the signal line A is D1, the image information which is subject to a one-line delay is D2, a two-line delay, D3, a three-line delay, D4, and a four-line delay, D5. The image information is inputted into a printing dot corrector 5101. The printing dot corrector 5101 is described later with reference to FIGS. 48A and 48B.

Numeral 5106 is a holder RAM which holds the information of correction dot between printing scanning operations and matrix information, numeral 5107 is a code data retainer which generates code data to be printed (padded with the printing data), numeral 5108 is an operational controller 5108 which controls the image forming apparatus, and numeral 5109 is a printing head drive unit.

Figure 46:
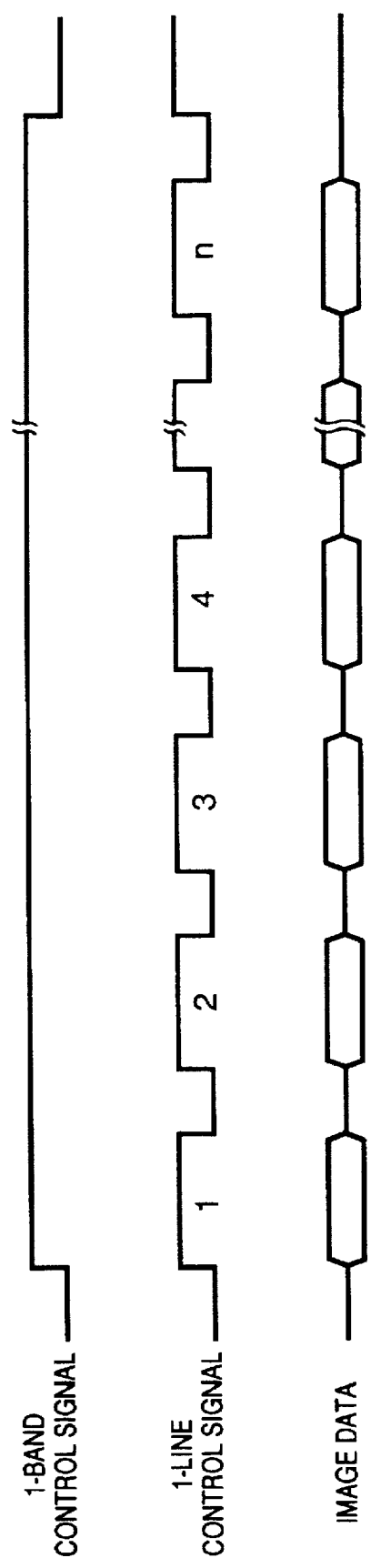
FIG. 46 is a timing chart of a part of the control signal in printing of the fifth embodiment.

FIG. 46 is an operational timing chart of a part of the printing control signal in the embodiment. In FIG. 46, a one-band control signal is "H" (high) while the printing head performs one scanning operation. Furthermore, a one-line control signal is duration of data transfer to the plurality of nozzles in the head. When the one-band control signal is "H", the image is valid. Accordingly, the RAM 106 controls to read the border data at the leading portion of the line and stores the data at the end of the line in the one band. Note that one band is consisted of n lines.

Figure 47:
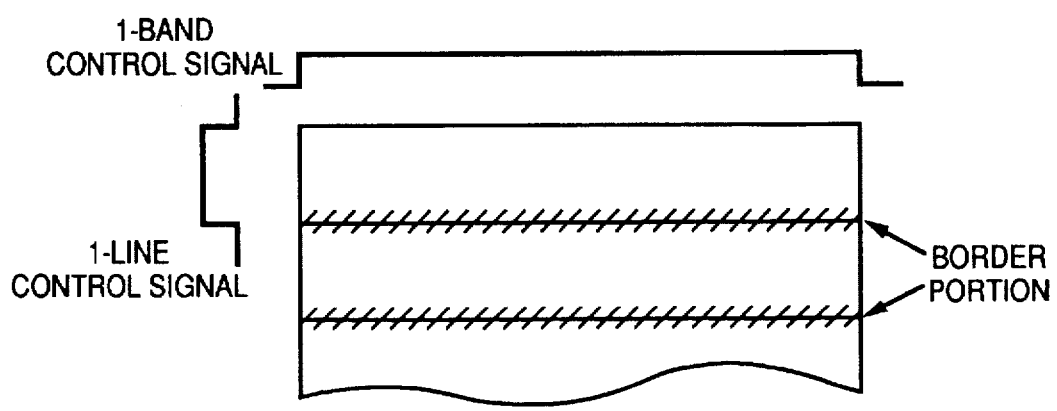
FIG. 47 is a diagram illustrating a model of the timing of FIG. 46.

FIG. 47 is a diagram illustrating the timing shown in FIG. 46 and a portion indicated by a slant line is a border portion.

Figure 48A:
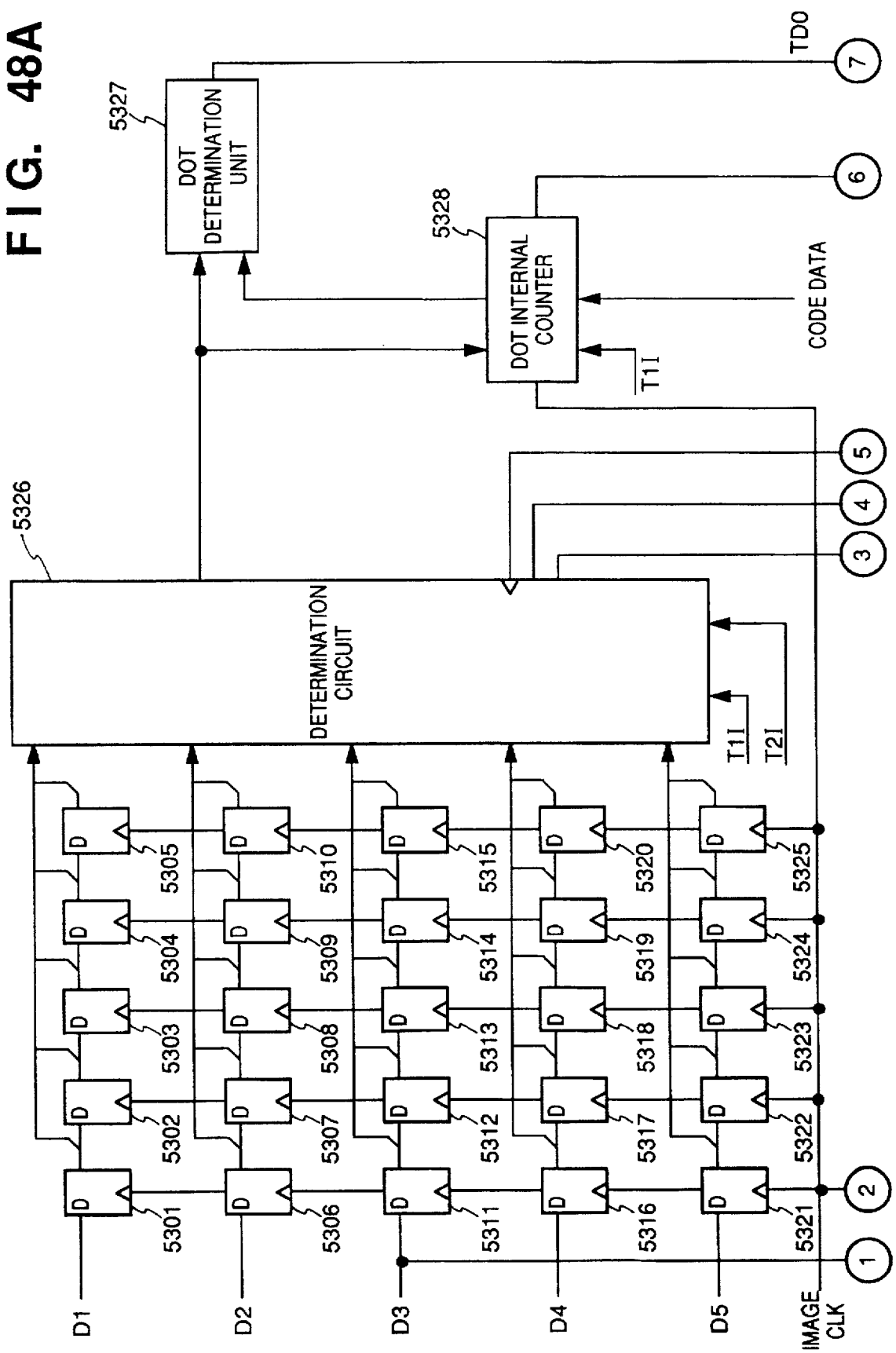
FIGS. 48A and 48B are block diagrams illustrating the detailed construction of a print-dot corrector 5101 according to the fifth embodiment.
Figure 48B:
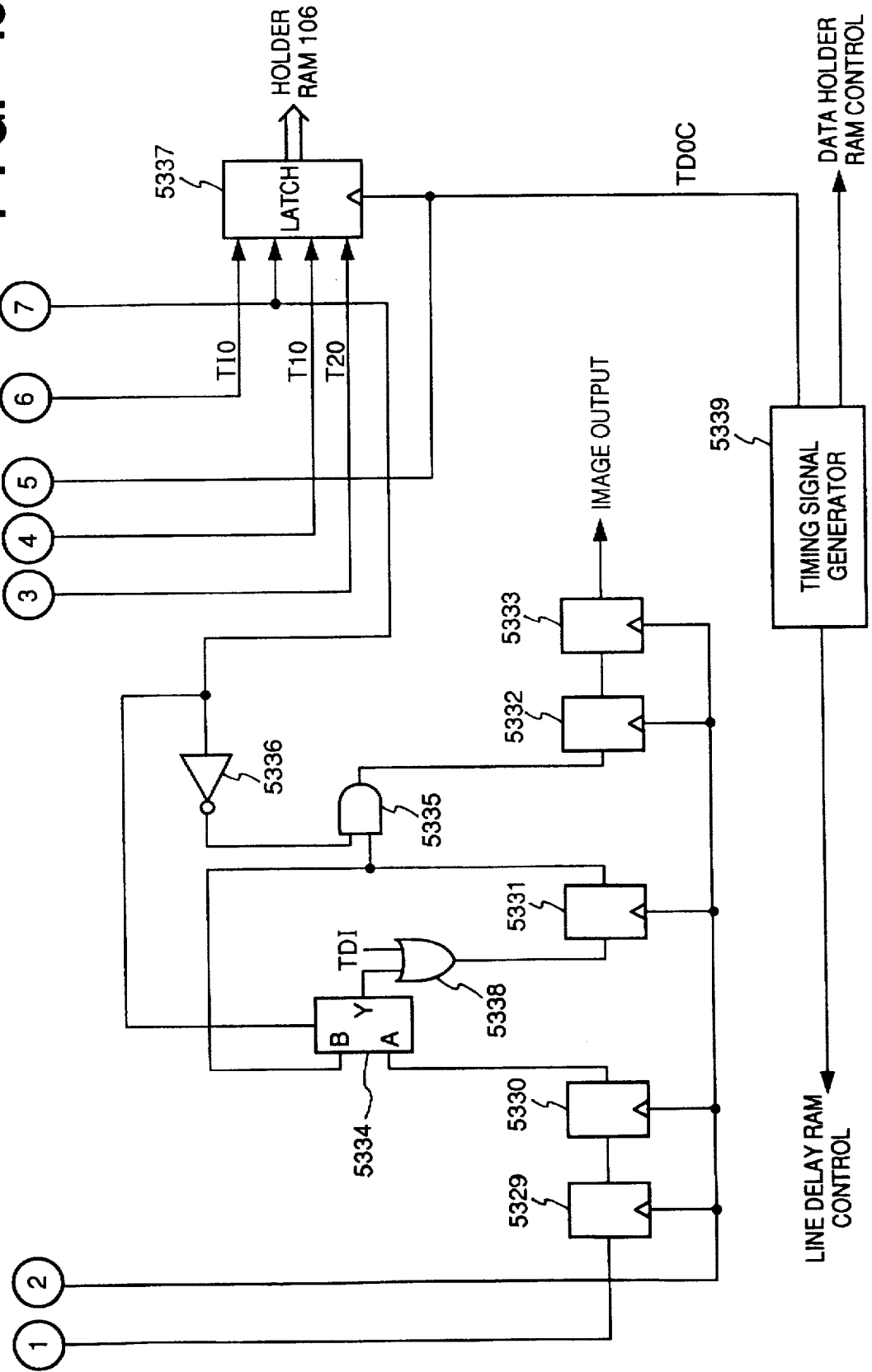

FIGS. 48A and 48B are block diagrams illustrating the detailed construction of the printing dot corrector 5101.

In FIGS. 48A and 48B, numerals 5301–5325 are D-flip flops (hereinafter referred to as a "D–F/F"), and thus, area data of 5×5 dot matrix can be obtained. In this case, the D–F/F is set as a center of the area and a density can be determined from the data of D–F/Fs 5301–5312, 5314–5325. Numeral 5326 is a determination circuit, numeral 5327 is a dot determination unit which determines if a dot should be shifted, and numeral 5328 is a dot interval counter which counts an interval of dots. Numerals 5329–5333 are D–F/Fs, numeral 5334 is a selector, numeral 5335 is an AND circuit, numeral 5336 is an inverter, numeral 5337 is a latch, numeral 5338 is an OR circuit, and numeral 5339 is a timing signal generator.

Figure 49:
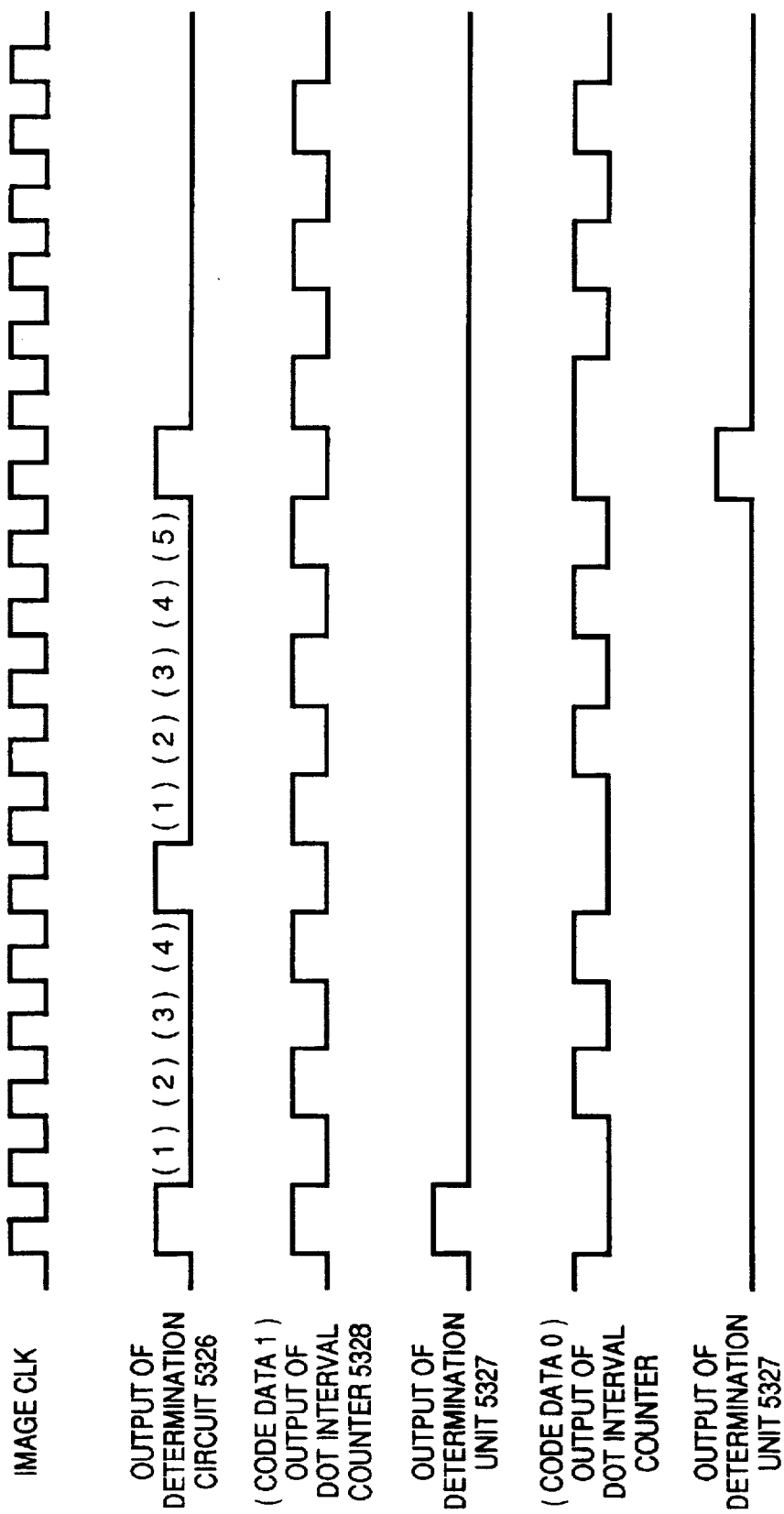
FIG. 49 is a timing chart of code data and determination signal.

In the embodiment, when the data for the D–F/F 5301–5312, 5314–5325 do not exist, but data of a pertinent pixel exists, a signal "H" is outputted from the determination circuit 5326. The dot determination unit 5327 generates a signal which shifts the image signal, that is, a signal which shifts a dot based on the signal of the dot interval counter 5328. The relationship of the above is shown in FIG. 49. A printing dot correction is performed based on the signal which shifts a dot. In the printing dot corrector 5101, the image information D3 is latched by the D–F/F 5329 (See FIG. 53) and the D–F/F 5330 from the printing image data. This is because the timing that the determination signal which moves a dot will meet the timing of the image data to be corrected. The image information D3 is inputted into a terminal A of the selector 5334. As a control signal of the selector 5334, the output of the determination unit 5327 which determines whether or not a dot is shifted is connected, and an input A is selected at "L" (low). Accordingly, the input image is normally inputted into the D–F/F 5331. Furthermore, when the determination signal is "L", the gate 5335 is opened and the signal is flown to the next D-F/F 5332, 5333, and the image is outputted.

Then, the operation when the output of the determination unit 5327 is "H" is described. When the determination signal is "H", the selector 5334 selects an input B, the data of a pertinent pixel is held in the D-F/F 5331 again, and the data is delayed for one pixel. The gate 5335 is closed by the determination signal from the inverter 5336 so that the held data of the pertinent pixel will not be transmitted to the next D-F/F 5332. Accordingly, the data is delayed for one pixels.

FIG. 49 shows an example of the output of the determination signal from the code data and the inverter 5336. A cycle of the image CLK represents one pixel. The output signal of the determination circuit 5326 has three dots and their intervals respectively correspond to the four image CLKs and five image CLKs. If this output signal operates such that when the code data is "1", each of the intervals contains the odd number of image CLK and when the code data is "0", each of the intervals contains the even number of image CLK, the output of the code data and the dot interval counter is as shown in FIG. 49.

Figure 50:
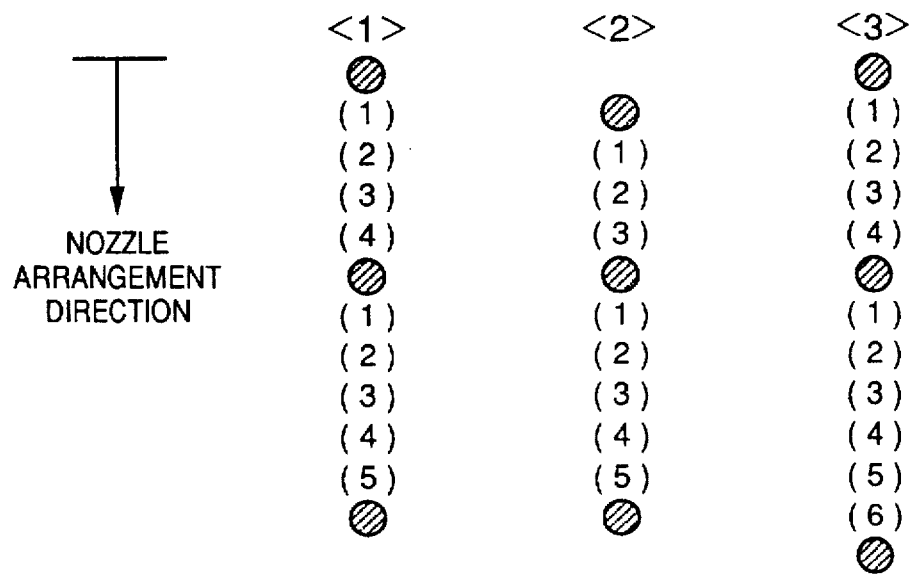
FIG. 50 is a diagram illustrating the dot arrangement according to the fifth embodiment.

The state where the result obtained in the way is reflected to the dot arrangement is shown in FIG. 50.

In the figure, <1> corresponds to the case where dots are not shifted, <2> corresponds to the case where the code data is "1" in FIG. 49, and <3> corresponds to the case where the code data is "0" in FIG. 49.

Figure 51:
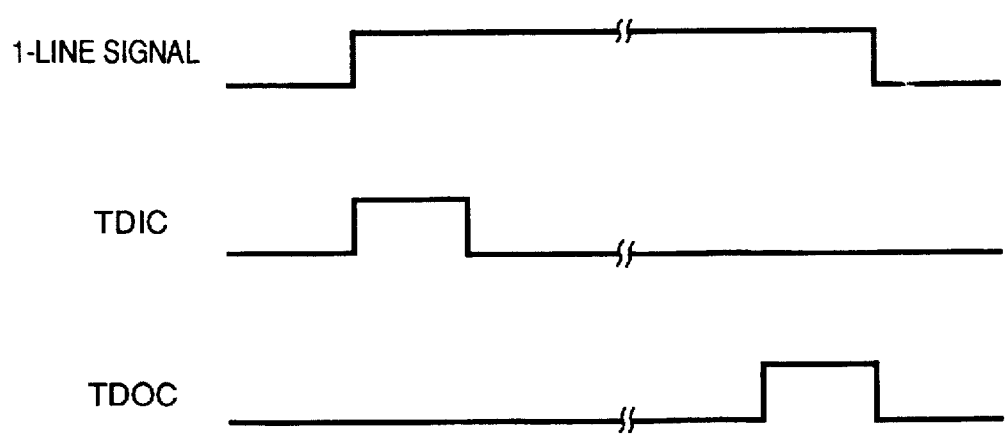
FIG. 51 is a timing chart of the signal according to a dot interval counter 5328 according to the fifth embodiment.

FIG. 51 is a timing chart in the dot interval counter 5328 according to the fifth embodiment.

In the operation, the processing in the leading pixel and end pixel in one line (nozzle width) is important. The control signal is shown in FIG. 51 and the area information which is written in the holder RAM 5106 is shown in FIG. 52.

First, writing to the holder RAM 5106 of border data is described.

The data written in the RAM 5106 is matrix data of T2 (D-F/F 5303, 5308, 5313, 5318, 5323) and T1 (D-F/F 5304, 5309, 5319, 5324) of FIG. 52. The determination signal TDO which takes a timing of TDOC of FIG. 51 and the signal TIO of the dot interval counter 5328 are latched by the latch 5337 at the timing of TDOC from the timing signal generator 5339 and these data (TDO, TIO) are written in the holder RAM 5106 at the next timing TDOC. These data (TDO, TIO) are held in one band and address of the holder RAM 5106 is increased as a one-line control signal is increased as 1, 2, . . . , n, as shown in FIG. 46.

In the second band, the address of the holder RAM 5106 is controlled that the data for one line of the first band is synchronized with the data for one line of this band, and the stored border data in the processing of the first band is taken in at the timing of TDIC of FIG. 51.

The matrix data is inputted into the determination circuit 5326 as T1I, T2I and to the dot interval counter 5328 as TII. The determination signal which shifts dots is inputted into the gate 5338 as TDI in order to indicate printing the leading pixel of one line when a dot is shifted. This timing can be adjusted to a predetermined timing.

As described above, according to the fifth embodiment, the information relating to addition of a code number is stored between bands (at the border) and reflected to the border in next band. Accordingly, a continued image at the border can be obtained and a generation of seam at the border can be prevented.

<Modification 1>

In the fifth embodiment, a border processing is performed, however, this does not impose a limitation upon the present invention. For example, the dot can be shifted forward or backward in each line or each pixel.

Figure 53:
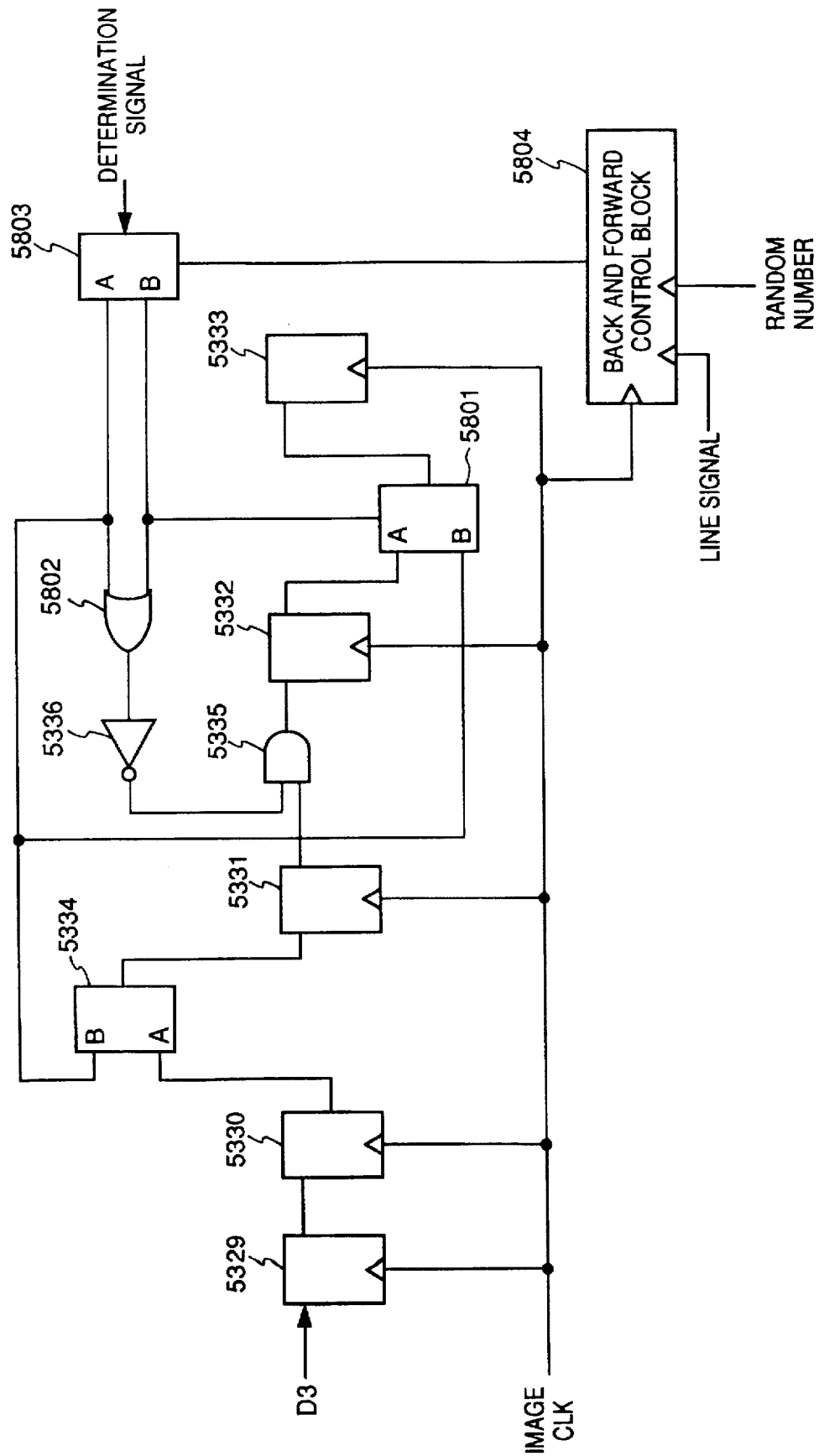
FIG. 53 is a block diagram illustrating the construction according to the image shifting according to the modification 1 of the fifth embodiment.
Figure 54B:
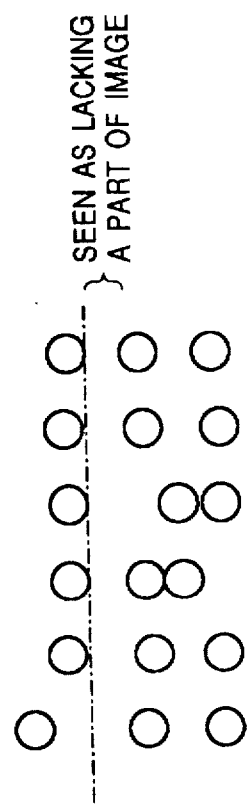
FIGS. 54A and 54B are diagrams illustrating a conventional dot state where a code number is added.
Figure 54A:
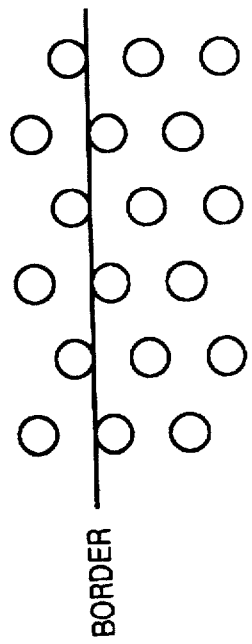

FIG. 53 is a block diagram illustrating the construction in accordance with the shift of the image data by the modification 1 of the fifth embodiment. The construction of the determination unit (not shown) and the dot interval counter is the same as that of the fifth embodiment.

Determination of shifting the pixel to the forward or backward can be changed every line or every pixel. Furthermore, a random number generator is provided and the shifting direction can be determined based on a signal from the random number generator.

In FIG. 53, numeral 5801 is a selector which is added to shift the dots forward, and numeral 5802 is an OR circuit which is added to gate the data of the pertinent pixel when the dots are shifted forward. Numeral 5803 is a selector to which the determination signal is inputted from the determination unit 5327. When a signal from the back-and-forward control block 5804 is "L", it is switched to the output A, while "H", to the output B. In the back-forward control block 5804, when the direction of dot shift is changed every one line, a line signal is counted and the signals "L" and "H" are alternatively supplied. Furthermore, when the direction is changed every one pixel, an image clock is counted and its lower bit is outputted as a control signal of the selector 5803. Furthermore, when the random number is used, the selector 5803 is controlled based on the random number.

Accordingly, the seam between the scanning operations can be suppressed by controlling the direction where the dots are shifted in order to adding a code number in each line, each pixel, or a random number.

<Modification 2>

It can be arranged that a determination size of the matrix determination unit is increased as coming close to the border. More particularly, as close to the first and end of one-line control signal, the matrix size is increased so as 3×3, 5×5, 7×7, 9×9.

In the addition of code number in vicinity of the border, a size of density determination matrix can be variable. The seam which appears at the border can be reduced by not adding the code number only when the density is low.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for controlling an image recording apparatus, comprising:

input means for inputting image data corresponding to an image, where the image is divided by the image recording apparatus into a plurality of blocks with a border portion between each two adjacent ones of the blocks, each block being a recording unit of the image recording apparatus that records the image block by block, and where the input image data includes respective image data corresponding to each border portion;

providing means for providing specific information to the input image data;

detection means for detecting a border portion existing between two blocks of the image; and control means for controlling said providing means to provide the specific information into the image data corresponding to the border portion detected by said detection means.

2. The image processing apparatus according to claim 1, wherein said providing means provides the specific information by correction of the image data.

3. The image processing apparatus according to claim 2, wherein said providing means performs the correction by shifting a black dot which is generated based on the image data.

4. The image processing apparatus according to claim 2, wherein said providing means provides the specific information by controlling a space between two black dots generated based on the image data.

5. The image processing apparatus according to claim 4, further comprising counting means for counting the space between the two black dots.

6. The image processing apparatus according to claim 2, wherein said control means includes storage means for storing control data for controlling a space between two black dots generated based on the image data in the border portion.

7. The image processing apparatus according to claim 1, wherein said image recording apparatus further comprises a recording head having a plurality of nozzles for recording the image data.

8. The image processing apparatus according to claim 7, wherein said recording head records an image by scanning in a predetermined direction.

9. The image processing apparatus according to claim 1, wherein the specific information is a code number.

10. An image processing method for controlling an image recording apparatus, comprising the steps of:

inputting image data corresponding to image, where the image is divided by the image recording apparatus into a plurality of blocks with a border portion between each two adjacent ones of the blocks, each block being a recording unit of the image recording apparatus that records the image block by block, and where the input image data includes respective image data corresponding to each border portion;

providing specific information to the input image data;

detecting a border portion existing between two blocks of the image; and controlling said providing step to provide specific information into the image data corresponding to the border portion detected at said detection step.

* * * * *

UNITED STATES PATENT AND TRADEMARK OFFICE
CERTIFICATE OF CORRECTION

PATENT NO. : 5,790,165

DATED : August 4, 1998

INVENTOR(S) : KEIJU KUBOKI ET AL.

It is certified that error appears in the above-identified patent and that said Letters Patent is hereby corrected as shown below:

On the title page,:

Item [54] Title, "AND" should read --FOR--.

COLUMN 1

Line 1, "AND" should read --FOR--.

COLUMN 32

Line 9, "image" should read --an image--.

Signed and Sealed this

Twentieth Day of July, 1999

Attest:

Attesting Officer

Q. TODD DICKINSON

Acting Commissioner of Patents and Trademarks